United States Patent
Isobe et al.

(10) Patent No.: US 9,979,658 B2
(45) Date of Patent: May 22, 2018

(54) COMMUNICATION DEVICE AND COMMUNICATION SYSTEM

(71) Applicant: HITACHI, LTD., Chiyoda-ku, Tokyo (JP)

(72) Inventors: Takashi Isobe, Yokohama (JP); Takeki Yazaki, Kawasaki (JP); Takuro Mori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 377 days.

(21) Appl. No.: 14/715,805

(22) Filed: May 19, 2015

(65) Prior Publication Data

US 2015/0341272 A1    Nov. 26, 2015

Related U.S. Application Data

(63) Continuation of application No. 13/820,012, filed as application No. PCT/JP2011/067282 on Jul. 28, 2011, now Pat. No. 9,124,518.

(30) Foreign Application Priority Data

Nov. 16, 2010 (JP) ................................. 2010-255521

(51) Int. Cl.
*H04L 1/00* (2006.01)
*H04L 12/801* (2013.01)
(Continued)

(52) U.S. Cl.
CPC ............ *H04L 47/16* (2013.01); *H04L 1/1642* (2013.01); *H04L 1/1835* (2013.01);
(Continued)

(58) Field of Classification Search
None
See application file for complete search history.

(56) References Cited

U.S. PATENT DOCUMENTS 7,317,685 B1    1/2008    Flott et al.
7,952,999 B1    5/2011    Jiang et al.
(Continued)

FOREIGN PATENT DOCUMENTS

JP    2004-080070 A    3/2004
JP    2005-064648 A    3/2005
(Continued)

OTHER PUBLICATIONS

ATM Forum, Traffic Management Specification Version 4.0, af-tm-0056.00, pp. 7 to 10 Apr. 1996.
(Continued)

*Primary Examiner* — Jutai Kao
(74) *Attorney, Agent, or Firm* — Mattingly & Malur, PC

(57) ABSTRACT

When a proxy device is used between a transmission terminal and a reception terminal, receives final data from the transmission terminal, and fails immediately thereafter, a situation is avoided where transmission is completed in the transmission terminal, but reception is not completed in the reception terminal. There is provided a means for not returning ACK when a data packet is received in a state in which there is no data which waits for ACK and transmission of which is in progress, and there is no data which waits for arrangement and reception of which is in progress in the proxy device, for returning ACK for data received one step before when a data packet is received in a state in which there is data which waits for ACK and transmission of which is in progress, or there is data which waits for arrangement and reception of which is in progress.

20 Claims, 53 Drawing Sheets

(51) Int. Cl.
*H04L 1/18* (2006.01)
*H04L 12/879* (2013.01)
*H04L 1/16* (2006.01)
*H04L 12/825* (2013.01)
*H04L 12/893* (2013.01)

(52) U.S. Cl.
CPC ............ *H04L 1/1854* (2013.01); *H04L 47/10* (2013.01); *H04L 47/193* (2013.01); *H04L 47/25* (2013.01); *H04L 47/34* (2013.01); *H04L 47/40* (2013.01); *H04L 49/901* (2013.01)

(56) References Cited

U.S. PATENT DOCUMENTS

| | | |
|---|---|---|
| 2006/0029037 A1 | 2/2006 | Chen et al. |
| 2007/0171909 A1* | 7/2007 | Pignatelli .............. H04L 45/125 370/392 |
| 2007/0223379 A1* | 9/2007 | Sivakumar ............. H04L 47/10 370/235 |
| 2008/0049640 A1 | 2/2008 | Heinz et al. |
| 2008/0091868 A1* | 4/2008 | Mizrachi ................ G06F 13/24 710/263 |
| 2008/0107036 A1 | 5/2008 | Toyozumi et al. |
| 2009/0268747 A1 | 10/2009 | Kurata et al. |
| 2011/0158100 A1 | 6/2011 | Ye |

FOREIGN PATENT DOCUMENTS

| | | |
|---|---|---|
| JP | 2006-074104 A | 3/2006 |
| JP | 2008-141736 A | 6/2008 |
| JP | 2010-519868 A | 6/2010 |
| WO | 2007/043373 A1 | 4/2007 |
| WO | 2009096743 A2 | 8/2009 |

OTHER PUBLICATIONS

Fanglei Sun et al.; Design of SNACK Mechanism for Wireless TCP with New Snoop, WCNC2004/I333 Communications Society, 2004, pp. 1051-1056.

* cited by examiner

3202
CONNECTION AND SHAPER TABLE

| CONNECTION INFORMATION ||||  SHAPER |
|---|---|---|---|---|
| TRANSMISSION SOURCE IP/SUBNET | DESTINATION IP/SUBNET | TRANSMISSION SOURCE PORT | DESTINATION PORT | |
| 1.2.3.4 | 5.6.7.8 | 4200 | 25 | A |
| 1.2.3.4 | 5.6.7.8 | any | any | B |
| 1.2.3.0/24 | 5.6.7.0/24 | any | any | C |

TRANSMISSION AND RETRANSMISSION BANDWIDTH TABLE FOR EACH SHAPER

| SHAPER | BEFORE OLD REFERENCE TIME POINT | | BEFORE REFERENCE TIME POINT | | | CURRENT TIME POINT | AFTER REFERENCE TIME POINT | | |
|---|---|---|---|---|---|---|---|---|---|
| | TRANS-MISSION BAND-WIDTH | CONTROL BAND-WIDTH | TRANS-MISSION BAND-WIDTH | RETRANS-MISSION BAND-WIDTH | CONTROL BAND-WIDTH | | TRANS-MISSION BIT INTEGR-ATED VALUE | RETRANS-MISSION BIT INTE-GRATED VALUE | CONTROL BAND-WIDTH |
| A | 80 | 80 | 100 | 0 | 100 | 100 | 5216 | 0 | 120 |
| B | 180 | 180 | 200 | 20 | 180 | 160 | 7608 | 0 | 190 |
| C | 200 | 200 | 220 | 0 | 220 | 220 | 11080 | 512 | 210 |

Fig. 34

COMMUNICATION DEVICE AND COMMUNICATION SYSTEM

This application is a continuation of U.S. patent application Ser. No. 13/820,012, filed Mar. 13, 2013, which is a 371 of international patent application No. PCT/JP2011/067282, filed Jul. 28, 2011, which claims priority to Japanese patent application No. 2010-255521, filed Nov. 16, 2010.

TECHNICAL FIELD

The present invention relates to a communication device and a communication system, and, particularly to a communication device and a communication system which relay communication between terminals.

BACKGROUND ART

A Wide Area Network (WAN) which employs an Internet Protocol-Virtual Private Network (IP-VPN) technique or the like is generally used as a communication network between global bases.

In a case where a terminal present in a certain base communicates with a terminal present in another foreign base, the communication is performed via a line which connects a self base Local Area Network (LAN) to a domestic WAN, a line which connects the domestic WAN to a foreign WAN, and a line which connects the foreign WAN to another base LAN. In these lines, an available bandwidth is limited depending on contract bandwidths.

A Transport Communication Protocol (TCP) is generally used in communication between terminals. In the TCP communication, with respect to data which is transmitted by a transmission terminal, a reception terminal notifies the transmission terminal of an amount of the received data in a feedback manner. When the amount of the received data the notification of which is sent in a feedback manner does not increase, the transmission terminal determines that discarding is detected.

In addition, the transmission terminal manages a parameter called a window size (a size of data which can be transmitted even if a notification of reception thereof is not sent from the reception terminal) and varies the window size depending on a Round Trip Time (RTT) or whether or not discarding is detected.

The transmission terminal determines that a network is congested when the RTT increases or discarding is detected, and reduces a window size so as to indirectly reduce a transmission bandwidth, thereby preventing the network from being congested. In addition, it is determined that the network is vacant when the RTT decreases or there is no discarding, and the window size is increased so as to indirectly increase the transmission bandwidth, thereby effectively using a line bandwidth of the network. As above, the transmission bandwidth is greatly dependent on the RTT and a discarding rate in the communication using the TCP.

As a transmission bandwidth control technique such as the TCP communication, there is Available Bit Rate (ABR) of Asynchronous Transfer Mode (ATM) disclosed in NPL 1 or communication using a technique disclosed in PTL 1. In this communication, a reception terminal notifies a transmission terminal of information of a reception bandwidth or whether or not there is congestion in a feedback manner, and the transmission terminal controls a transmission bandwidth on the basis of the information the notification of which is sent in a feedback manner.

In addition, there is a technique disclosed in PTL 2 as the transmission bandwidth control technique such as the TCP communication. In communication using this technique, control is performed such that a sum total of a transmission bandwidth of data body, a transmission bandwidth of error encoding data, and a retransmission bandwidth of discarded data becomes a constant value. When the retransmission bandwidth increases, the transmission bandwidth of the error encoding data decreases.

Further, there is a technique disclosed in PTL 3 as the transmission bandwidth control technique such as the TCP communication. In this technique, a bandwidth before being input to and a bandwidth after being output from a communication device which performs bandwidth limitation are compared, and a bandwidth limitation value is varied when a packet discarding bandwidth related to packet discarding due to a bandwidth limitation exceeds a specific value.

CITATION LIST

Patent Literature

[PTL 1] JP-A-2004-080070
[PTL 2] JP-A-2005-064648
[PTL 3] JP-A-2008-141736

Non Patent Literature

[NPL 1] ATM Forum, Traffic Management Specification Version 4.0, af-tm-0056.00, pp. 7 to 10 Apr. 1996.

SUMMARY OF INVENTION

Technical Problem

Since a transmission bandwidth is controlled depending on the RTT or whether or not discarding is detected in the communication using the TCP, the transmission bandwidth is greatly dependent on the RTT and the discarding rate. For this reason, there is a problem in that only a transmission bandwidth which is greatly lower than a contract bandwidth is obtained in circumstances such as a WAN in which the RTT is large, the number of hoppings is large, and thus there are many locations where discarding occurs.

In addition, in the technique disclosed in NPL 1 or PTL 1, the transmission bandwidth is controlled using information of a reception bandwidth or whether or not there is congestion a notification of which is sent from a reception side. Since a notification of whether or not there is congestion is sent, but the size of the congestion is not known, there is a problem in that it cannot be known that to what extent the transmission bandwidth should increase or decrease.

In addition, in the technique disclosed in PTL 2, control is performed such that a sum total of a transmission bandwidth of data body, a transmission bandwidth of error encoding data, and a retransmission bandwidth of discarded data becomes a constant value. Since the sum total of a control bandwidth is constant, there is a problem in that, when an available bandwidth is reduced due to competition with other communications such as a case where a plurality of communications share a single line, a retransmission bandwidth exceeds the control bandwidth and thus data cannot be transmitted at all.

Further, in the technique disclosed in PTL 3, when a packet discarding bandwidth which is a difference between an input bandwidth and an output bandwidth of a device exceeds a specific value, a bandwidth limitation value can be varied; however, there is a problem in that a bandwidth limitation cannot be performed in consideration of a congestion state and a discarding bandwidth on a communication path from the device to a reception terminal.

However, when a communication device receives final data from a transmission terminal and returns an ACK packet for acknowledgement thereto on the basis of a TCP protocol, and fails immediately thereafter, there may be occurrence of a case where transmission is completed in the transmission terminal, and, on the other hand, reception is not completed in the reception terminal. In this case, there is a problem in that an application of the transmission terminal side finishes in a state in which data of the reception terminal side is not updated, and thus data to be written in the reception terminal is not written and disappears.

The present invention has been made in light of these problems, and an object thereof is to prevent occurrence of a case where transmission is completed in a transmission terminal, and, on the other hand, reception is not completed in a reception terminal. In addition, one of objects of the present invention is to make a communication state with a transmission terminal match a communication state with a reception terminal even in a case where a communication device receives final data from the transmission terminal and fails immediately thereafter.

Solution to Problem

In order to solve the above-described problems, according to an aspect of the present invention, there is provided a communication device which relays transmission and reception of a packet between a transmission terminal and a reception terminal, and transmits an ACK packet for a second data packet which is transmitted from the transmission terminal later than a first data packet to the transmission terminal depending on ACK packet awaiting circumstances for the first data packet from the reception terminal side. Particularly, there is provided means for not returning ACK when a data packet is received in a state in which there is no data which waits for ACK and transmission of which is in progress, and there is no data which waits for arrangement and reception of which is in progress in the communication device, for returning ACK for data packet received one step before when a data packet is received in a state in which there is data which waits for ACK and transmission of which is in progress, or there is data which waits for arrangement and reception of which is in progress in the communication device, and for returning normal ACK at a timing when ACK is received from the reception terminal side, thus there is no data which waits for ACK and transmission of which is in progress, and there is no data which waits for arrangement and reception of which is in progress.

According to another feature of the present invention, it is provided a communication system comprising:

a first communication device and a second communication device that are located between two terminals and relay TCP communication between the terminals, wherein the second communication device notifies the first communication device of an acknowledgement packet including identification information of an unreceived location in a feedback manner when a data location which cannot be received during communication is detected, the first communication device transmits a retransmitted packet including data of the unreceived location which is included in the acknowledgement packet, the notification of which is sent in a feedback manner, and the second communication device periodically notifies the first communication device of an acknowledgement packet including the identification information of the unreceived location in a feedback manner until the retransmitted packet including the data of the unreceived location is received.

In addition, according to another feature of the present invention, it is provided a communication device which relays two data communications including first data communication and second data communication, which returns an acknowledgement for a packet with data received at least one step before or an acknowledgement for data before final data, when a packet with data is received in the second data communication; and returns an acknowledgement for final data received in the second data communication at a timing when an acknowledgement is received and thus there is no data which waits for an acknowledgement and transmission of which is in progress in the first data communication, in a state in which there is data which waits for an acknowledgement and transmission of which is in progress in the first data communication and there is no data which waits for arrangement and reception of which is in progress in the second data communication.

According to a first solving means of the present invention, there is provided a communication device which relays two TCP communications including first TCP communication and second TCP communication, returns an acknowledgement for a packet with data received at least one step before or an acknowledgement for data before final data when a packet with data is received in the second TCP communication; and returns an acknowledgement for final data received in the second TCP communication at a timing when an acknowledgement is received and thus there is no data which waits for an acknowledgement and transmission of which is in progress in the first TCP communication, in a state in which there is data which waits for an acknowledgement and transmission of which is in progress in the first TCP communication and there is no data which waits for arrangement and reception of which is in progress in the second TCP communication.

According to the communication device, there is an effect of preventing occurrence of a case where transmission is completed in a transmission terminal, and, on the other hand, reception is not completed in a reception terminal, even if the communication device fails.

According to a second solving means of the present invention, there is provided a communication system including a first communication device and a second communication device which are located between two terminals and divide TCP communication between the terminals into three TCP communications which are relayed, wherein the first communication device performs first TCP communication with a data transmission terminal, the second communication device performs second TCP communication with a data reception terminal, third TCP communication is performed between the first communication device and the second communication device, and each TCP communication independently performs retransmission of transmitted data and arrangement of received data, wherein the second communication device notifies the first communication device of an acknowledgement packet including identification information of an unreceived location in a feedback manner when a data location which cannot be received during communication is detected, wherein the first communication device transmits a retransmitted packet including data of the unreceived location which is included in the acknowledgement packet the notification of which is sent in a feedback manner, and wherein the second communication device periodically notifies the first communication device of an acknowledgement packet including the identification information of the unreceived location in a feedback manner until the retransmitted packet including the data of the unreceived location is received.

According to this communication system, by controlling a window size 2605 for defining a transmission amount for each RTT, it is possible to realize communication which is not dependent on an RTT or a discarding rate even between terminals which can perform only TCP communication for performing bandwidth control.

Advantageous Effects of Invention

According to the present invention, even if the communication device receives final data from the transmission terminal and fails immediately thereafter, since a communication state with the transmission terminal matches a communication state with the reception terminal, there is no occurrence of a case where transmission is completed in the transmission terminal, and, on the other hand, reception is not completed in the reception terminal.

BRIEF DESCRIPTION OF DRAWINGS

FIG. 32 is a diagram illustrating a format of a TX path shaper table.

FIG. 34 is a diagram illustrating a format of a transmission and retransmission bandwidth table for each shaper.

DESCRIPTION OF EMBODIMENTS

Figure 1:
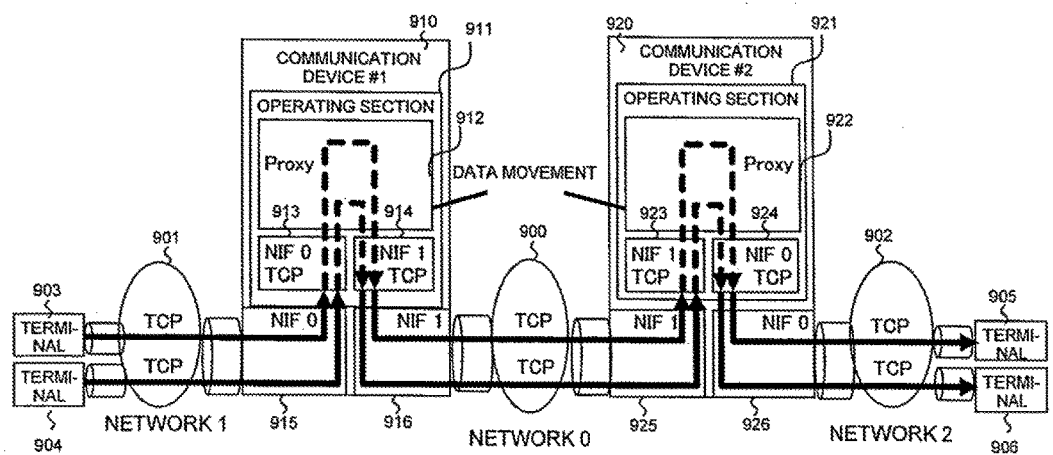
FIG. 1 is a diagram illustrating a system in which communication devices 910 and 920 are installed in boundaries between a WAN and LANs.

Representative forms for implementing the present invention are as follows.

First, according to an aspect, a communication device which relays two TCP communications including first TCP communication and second TCP communication, and includes a transmission buffer and a reception buffer for each TCP communication, and means (1) for not returning ACK when a data packet is received in the second TCP communication in a state in which there is no data which waits for ACK and transmission of which is in progress in the transmission buffer for the first TCP communication, and there is no data which waits for arrangement and reception of which is in progress in the reception buffer for the second TCP communication, (2) for returning ACK for a data packet received at least one step before when a data packet is received in the second TCP communication in a state in which there is data which waits for ACK and transmission of which is in progress in the transmission buffer for the first TCP communication, or there is data which waits for arrangement and reception of which is in progress in the reception buffer for the second TCP communication, and (3) for returning ACK for a data packet located at the end among data packets received in the second TCP communication at a timing when ACK is received in the first TCP communication and thus there is no data which waits for ACK and transmission of which is in progress, in a state in which there is data which waits for ACK and transmission of which is in progress in the transmission buffer for the first TCP communication, and there is no data which waits for arrangement and reception of which is in progress in the reception buffer for the second TCP communication. According to this aspect, since a transmission terminal cannot receive ACK for final data until a reception terminal receives the final data transmitted from the transmission terminal, there is an effect of preventing occurrence of a case where transmission is completed in the transmission terminal, and, on the other hand, reception is not completed in the reception terminal, even if the communication device fails. Details of this aspect will be described later mainly based on Embodiment 1.

As another aspect, the method of returning ACK, described in Embodiment 1, is performed only when a data packet with a PSH flag which is a TCP flag is received. According to this aspect, in a case where the transmission terminal adds the PSH flag when final data is transmitted, an effect equivalent to Embodiment 1 can be achieved. Details of this aspect will be described later mainly based on Embodiment 2.

As still another aspect, two communication devices are installed between terminals, TCP communication between the terminals is divided into three TCP communications, a standard TCP is used in the TCP communication between the terminal and the communication device, and a technique disclosed in Patent Application 1 is used in the TCP communication between the communication devices, of the two TCP communications relayed by each communication device. According to this aspect, it is possible to realize communication which is not dependent on an RTT or a discarding rate even between terminals which can perform only the standard TCP communication. Details of this aspect will be described later mainly based on Embodiment 3.

As still further aspect, two communication devices are installed between terminals, TCP communication between the terminals is divided into three TCP communications, and the ACK returning method disclosed in Embodiment 1 is employed while using a standard TCP (refer to FIG. 27) by controlling a transmission amount for each RTT in the TCP communication between the terminal and the communication device and using a technique disclosed in Patent Application 1 (Japanese Patent Application No 2009-214015, PCT/JP2010/063973) in the TCP communication between the communication devices, of the two TCP communications relayed by each communication device. According to this aspect, it is possible to realize communication which is not dependent on an RTT or a discarding rate even between terminals which can perform only the TCP communication, and, there is an effect of preventing occurrence of a case where transmission is completed in a transmission terminal, and, on the other hand, reception is not completed in a reception terminal, even if either one of the communication devices fails. Details of this aspect will be described later mainly based on Embodiment 4.

Other aspects of the present invention will be described using various embodiments described below.

Hereinafter, in order to describe the aspects of the present invention in detail, details of a configuration of a communication device relaying communication, a process sequence, a system in which the device is configured to be connected via a network, or the like will be described using embodiments.

Embodiment 1

With reference to FIGS. 1 to 22, a description will be made of an embodiment of a communication device which prevents an occurrence of a case where transmission is completed in a transmission terminal, and, on the other hand, reception is not completed in a reception terminal even when the communication device fails during relay of two TCP communications.

FIG. 1 shows a state in which a communication device #1 (910) and a communication device #2 (920) are installed in boundaries between a network 0 (900) and networks 1 and 2 (901 and 902), and communication is performed via three TCP communications between terminals (903 and 904) connected to the network 1 (901) and terminals (905 and 906) connected to the network 2 (902). The communication device #1 (910) includes network interfaces NIF0 and NIF1 (915 and 916) and an operating section 911. The operating section 911 executes TCP modules 913 and 914 which perform TCP communication and a proxy module 912 which replaces data. In addition, in the present embodiment, the number of the communication devices 910 and 920 may be one. In addition, the communication devices 910 and 920 may be, for example, proxy devices.

Figure 2:
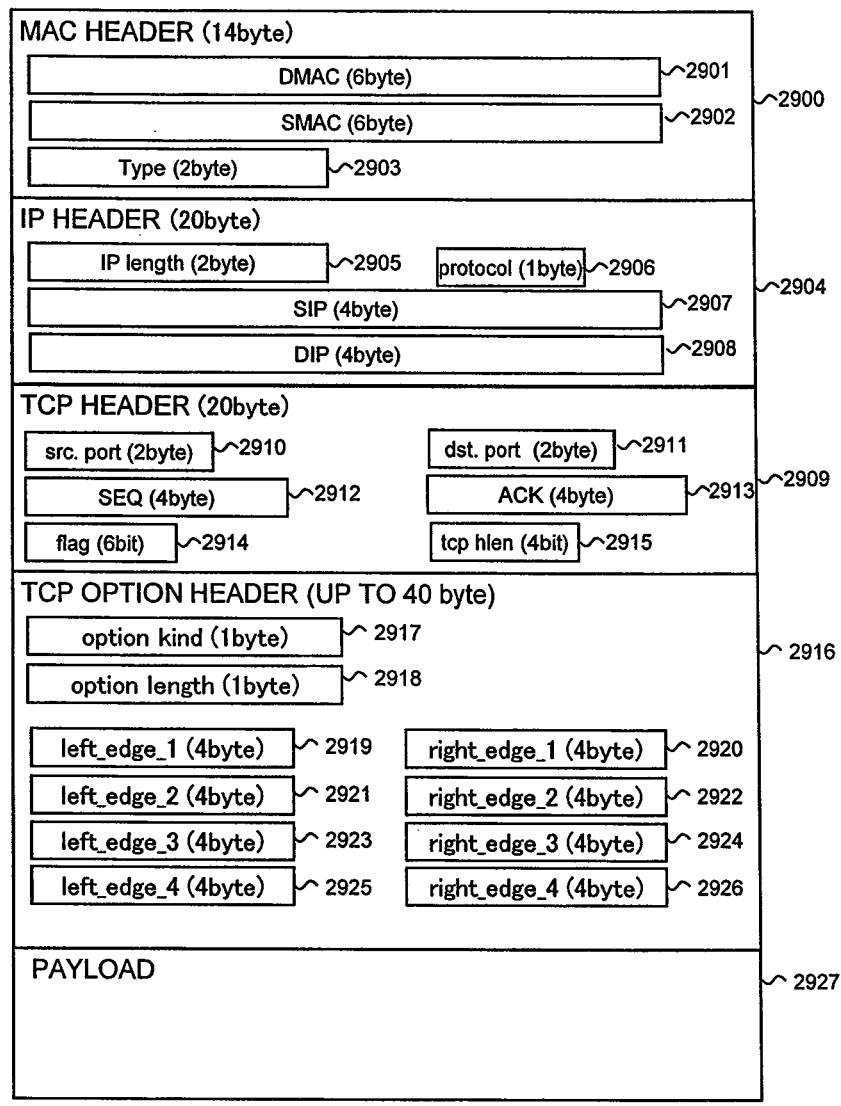
FIG. 2 is a diagram illustrating a format of a packet.

FIG. 2 is a diagram illustrating a format of a packet which is sent and received in the present embodiment. The packet has a MAC header 2900, an IP header 2904, a TCP header 2909, a TCP option header 2916, and a payload 2927. The MAC header 2900 includes DMAC 2901 indicating a destination MAC address, SMAC 2902 indicating a transmission source MAC address, and Type 2903 indicating a MAC frame type. In addition, the IP header 2904 includes IP length 2905 indicating a packet length excluding the MAC header, protocol 2906 indicating a protocol number, SIP 2907 indicating a transmission source IP address, and DIP 2908 indicating a destination IP address. The TCP header 2909 includes src.port 2910 indicating a transmission source port number, dst.port 2911 indicating a destination port number, SEQ 2912 indicating a transmission sequence number, ACK 2913 indicating a reception sequence number, flag 2914 indicating a TCP flag number, and tcp hlen 2915 indicating a header length of a TCP. The TCP option header 2916 includes option kind 2917 indicating the kind of option, option length 2918 indicating an option length, and left_edge_1 to 4 (2919, 2921, 2923, and 2925) and right_edge_1 to 4 (2920, 2922, 2924, and 2926) describing which location can be partially received.

Figure 41:
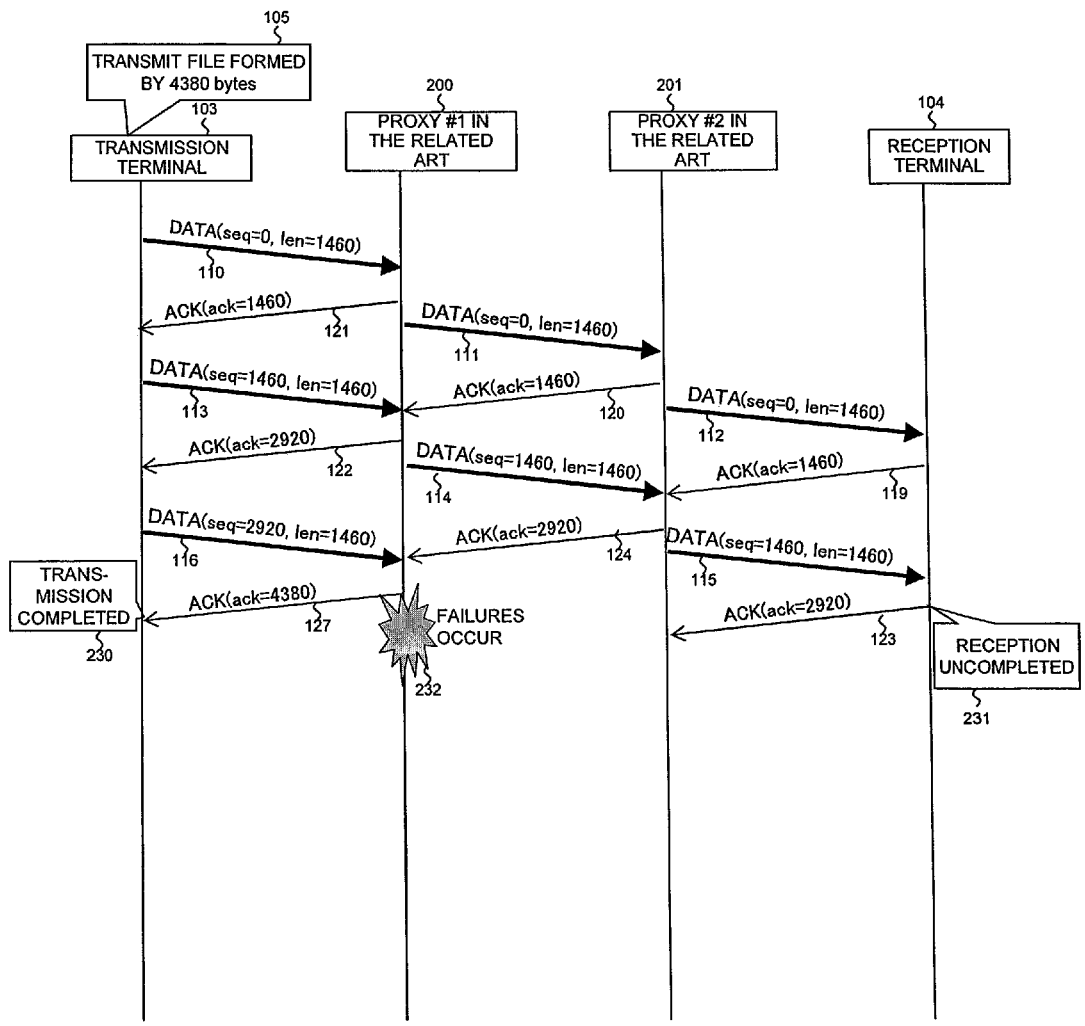
FIG. 41 is a sequence diagram illustrating problems of proxy devices 200 and 201 in the related art.

FIG. 41 is a sequence diagram illustrating problems of a proxy device in the related art. The figure shows a packet which is sent and received in a case where file data formed by 4380 bytes is divided into three packets (110, 113, and 116) including data of 1460 bytes and is transmitted (105) from a transmission terminal 103 to a reception terminal 104 via a proxy #1 (200) in the related art and a proxy #2 (201) in the related art.

The values 0, 1460 and 2920 are described in the three packets (110, 113, and 116) of the transmission terminal 103 of FIG. 41 as transmission sequence numbers. When the packets (110, 113, and 116) are received, the proxy #1 (200) adds a payload length 1460 to the transmission sequence numbers described in the received packets, and returns ACK packets (121, 122, and 127) for acknowledgement having the addition result values as reception sequence numbers ACK to the transmission terminal 103. When the ACK packet (127) for the final data is received, the transmission terminal 103 determines that transmission is completed (230). Thereafter, it is assumed that failures occur in the proxy #1 (200) (232). In this case, the data described in the packets (110 and 113) is transmitted to the proxy #2 as packets (111 and 114), and is sent to the reception terminal 104 as packets (112 and 115) via the proxy #2. ACK packets (120, 124, 119, and 123) for the respective packets are also returned. On the other hand, the data described in the packet (116) disappears with the occurrence (232) of the failures and thus is not transmitted from the proxy #1 (200). For this reason, the reception terminal 104 does not complete reception yet (231). Therefore, state mismatch occurs in which it is determined that the reception is not completed in the reception terminal 104 despite it being determined that transmission is completed in the transmission terminal 103 (230). This may be also the same for occurrence of failures in the proxy #2 (201).

In a case where, for example, the transmission terminal 103 completes transmission of data which is edited using an application to the reception terminal 104 and finishes the application in a state in which the state mismatch occurs, a situation happens in which the application of the transmission terminal is finished in a state in which the reception terminal 104 does not receive the edited data, and thereby the edited date disappears.

Hereinafter, a configuration and a process for preventing the above-described state mismatch will be described in detail.

(Device Configuration)

Figure 3:
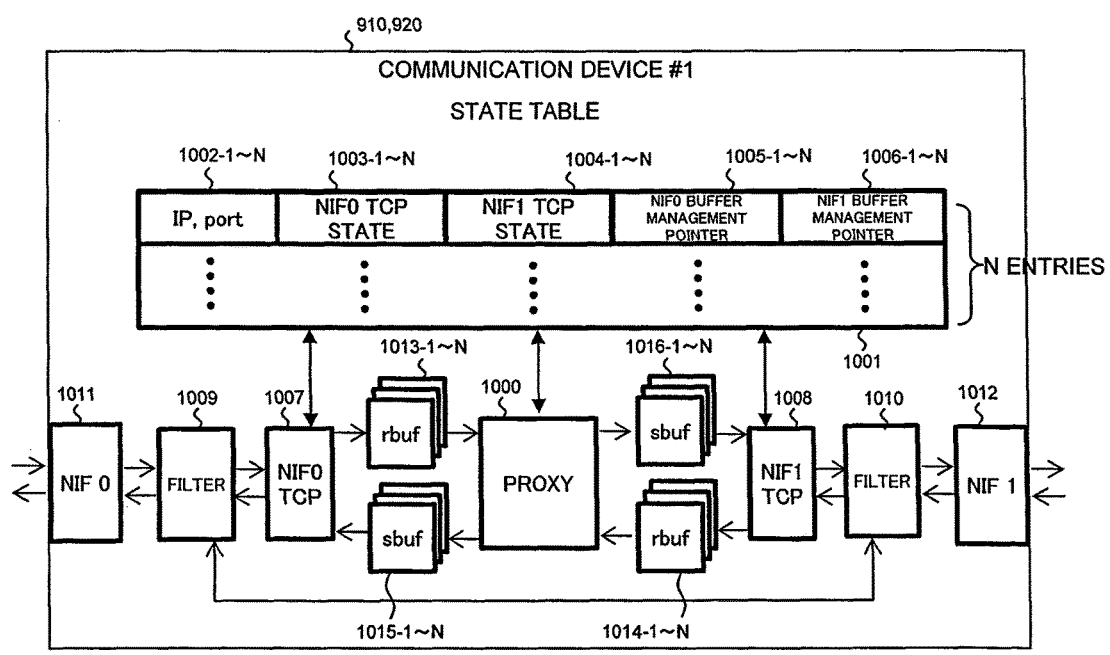
FIG. 3 is a block diagram of a communication device.

FIG. 3 is a block diagram of the communication device 910 according to the present embodiment, mounted in hardware. The communication device 920 also has the same configuration. The communication device 910 includes network interfaces NIF0 and NIF1 (1011 and 1012) which transmit and receive a packet to and from external networks, filters (1009 and 1010) for passing a UDP packet or the like other than a TCP packet, NIF0 and NIF1 dedicated TCP modules 1007 and 1008 which perform control for TCP communication, N (where N is an integer equal to or more than 1) transmission buffers 1013 and N reception buffers 1015 managed by the NIF0 dedicated TCP module 1007, N transmission buffers 1016 and N reception buffers 1014 managed by the NIF1 dedicated TCP module 1008, a proxy module 1000 which replaces data between the transmission and reception buffers, and a state table 1001 having N entries. When being mounted in software, the state table 1001 and the transmission and reception buffers (1013 to 1016) are provided as a storage section, and the filters (1009 and 1010), the TCP modules 1007 and 1008, and the proxy module 1000 parts are provided as an operating section (corresponding to the operating section 912 of FIG. 1).

The state table 1001 has N entries, and each entry registers therein information 1002 for specifying a connection including an IP address, a TCP port number, and the like, state information 1003 such as OPEN/CLOSE of a TCP of the NIF0 side, state information 1004 such as OPEN/CLOSE of a TCP of the NIF1 side, information 1005 of transmission and reception buffer management pointers of the NIF0 side, and information 1006 of transmission and reception buffer management pointers of the NIF1 side.

Figure 4:
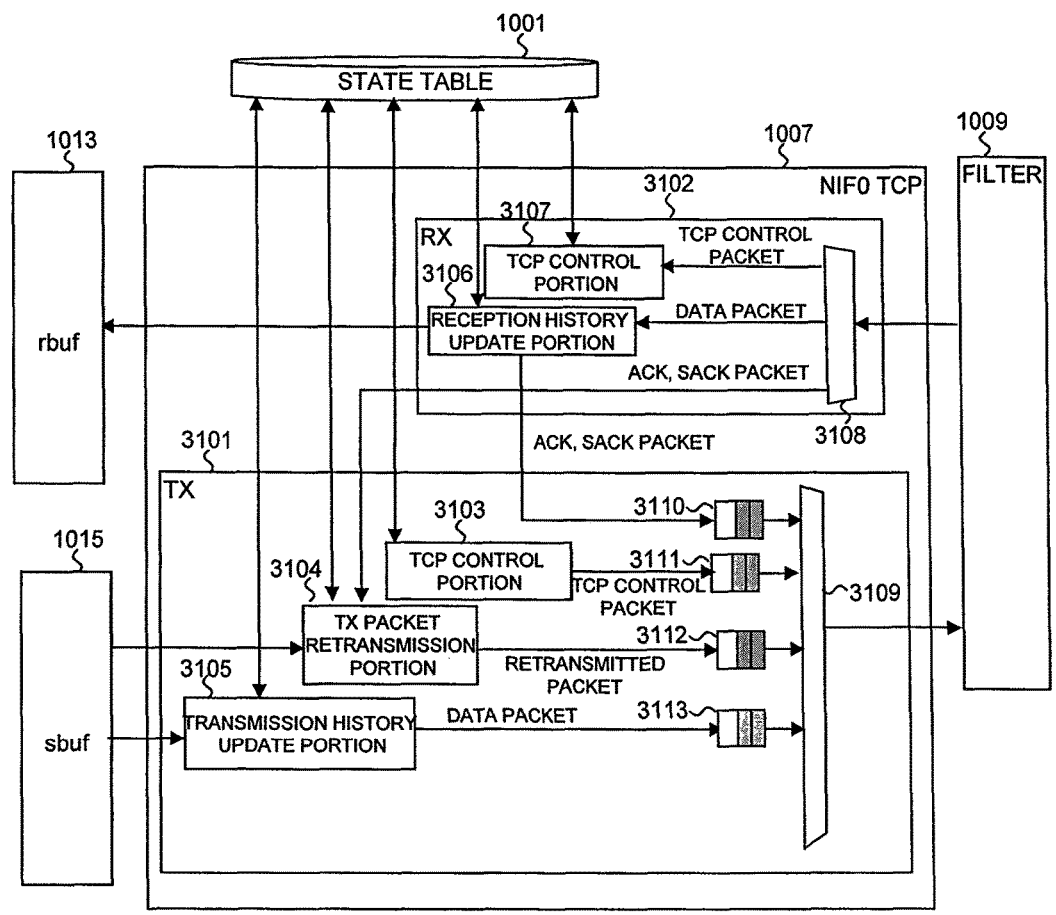
FIG. 4 is a block diagram of a standard TCP unit 1007 in the communication device.

FIG. 4 is a block diagram illustrating the TCP modules 1007 and 1008.

The TCP block 1007 which realizes a standard TCP includes an RX unit (reception processing unit) 3102 which performs a reception process and a TX unit (transmission processing unit) 3101 which performs a transmission process. The RX unit 3102 includes a packet analysis portion 3108 which divides a received packet into a TCP control packet, a packet with data, and an ACK/SACK packet for partial acknowledgement, a TCP control portion 3107 which changes the TCP state 1003 of the state table 1001 on the basis of a received TCP control packet, and a reception history update portion 3106 which changes the buffer management pointer 1005 of the state table 1001 and returns an ACK packet or an ACK packet with partial acknowledgement SACK on the basis of the transmission sequence number SEQ 2912 and the reception sequence number ACK 2913 of a received data packet. The change of the buffer management pointer 1005 by the reception history update portion 3106 will be described later. The TX unit 3101 includes a TCP control portion 3103 which transmits a TCP control packet by using the TCP state 1004 of the state table 1001, a TX packet retransmission portion 3104 which changes the buffer management pointer 1005 of the state table 1001 on the basis of a received ACK packet, reads data from the transmission buffer 1015 by using the received ACK packet with partial acknowledgement SACK, and retransmits a packet, the transmission history update portion 3105 which transmits a packet of data read from the transmission buffer 1015 and changes the buffer management pointer 1005 of the state table 1001, and a multiplexer (aggregation portion) 3109 and buffers 3110 to 3113 which aggregate and output an ACK/SACK packet, a TCP control packet, a retransmitted packet, and a data packet in a FIFO manner. In addition, in Embodiments 1 and 2, the TCPs 1007 and 1008 may have the same configuration.

(Description of Pointer)

Figure 5:
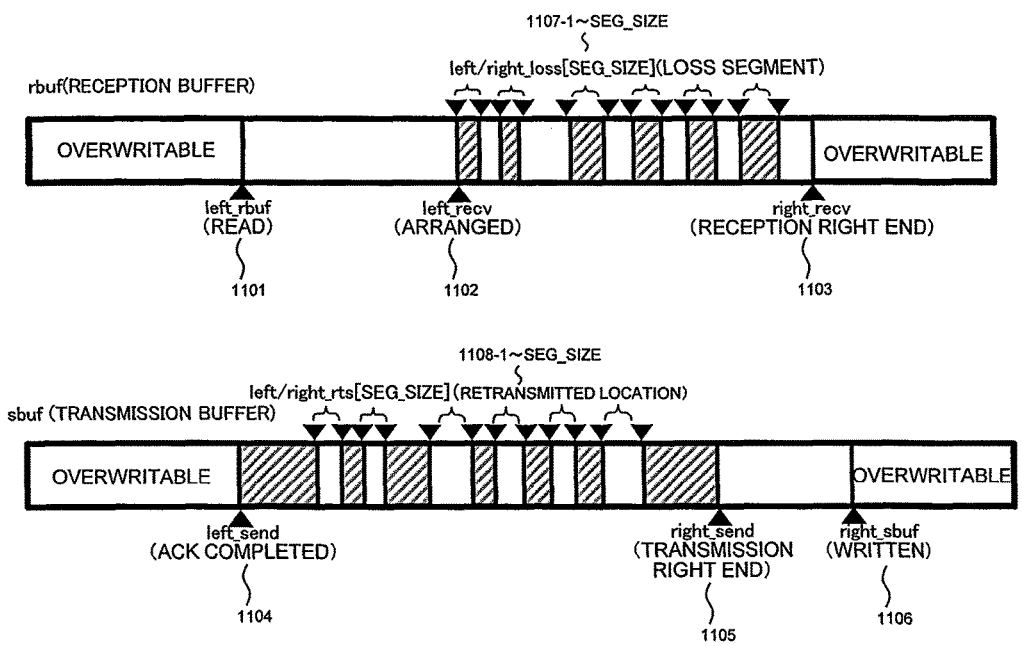
FIG. 5 is a diagram illustrating pointers for managing a transmission buffer and a reception buffer.

FIG. 5 is a diagram illustrating pointers for managing the transmission and reception buffers. In this figure, it is assumed that data is written from the left to the right, and is read from the left to the right.

The reception buffers 1013 and 1014 manage a pointer right_recv 1103 indicating a head (reception right end, and a leading position in which data is written) of received data, a pointer left_recv 1102 indicating a boundary between arranged data and unarranged data, left_rbuf 1101 indicating a boundary between data which has been read by the proxy module 1000 and data which has not been read, and pointers left/right_loss 1107-1 to SEG_SIZE (up to SEG_SIZE) indicating a left end and a right end of a data location (loss segment) which is not received and is omitted.

The pointer right_recv 1103 indicating a head of received data increases by the size of the received data and moves to the right when data is sequentially received in sequence from before without a loss. If a retransmitted packet is received in a state in which there is a location (loss segment) of data which is not received and is omitted, and the loss segment disappears, the pointer left_recv 1102 indicating a boundary between arranged data and unarranged data moves to the left end of the smallest loss segment. The proxy module sequentially reads data from left_rbuf 1101 indicating a boundary between data which has been read and data which has not been read, and moves left_rbuf 1101 to the right by the size of the read data. The maximum value of the size of the read data is a value corresponding to a difference between left_recv 1102 and the left_rbuf 1101.

The transmission buffers 1015 and 1016 manage a pointer right_sbuf 1106 indicating a head (transmission right end) of data which can be transmitted in a state of being written by the proxy module 1000, a pointer right_send 1105 indicating a head of transmitted data, a pointer left_send 1104 indicating a head of data for which an acknowledgement has been received from a reception side, and pointers left/right_rts 1108-1 to SEG_SIZE (up to SEG_SIZE) indicating a left end and a right end of a location of data retransmission of which is in progress.

The pointer right_sbuf 1106 indicating a head of data which can be transmitted in a state of being written by the proxy module increases by the size of written data and moves to the right each time the proxy module writes data. When new data is transmitted using the pointer right_send 1105 indicating a head of transmitted data as a start point, right_send 1105 increases by the size of the transmitted data and moves to the right. When an acknowledgement packet having a reception sequence number larger than left_send 1104 is received from the reception side, left_send 1104 increases to the reception sequence number described in the acknowledgement packet and moves to the right. In a case where retransmission occurs such as acknowledgement packets with the same reception sequence number being received in an overlapping manner, a location to be retransmitted is described in left/right_rts 1108, and if actually retransmitted, 0 is assigned to left/right_rts 1108, and then retransmission is completed.

Figure 6:
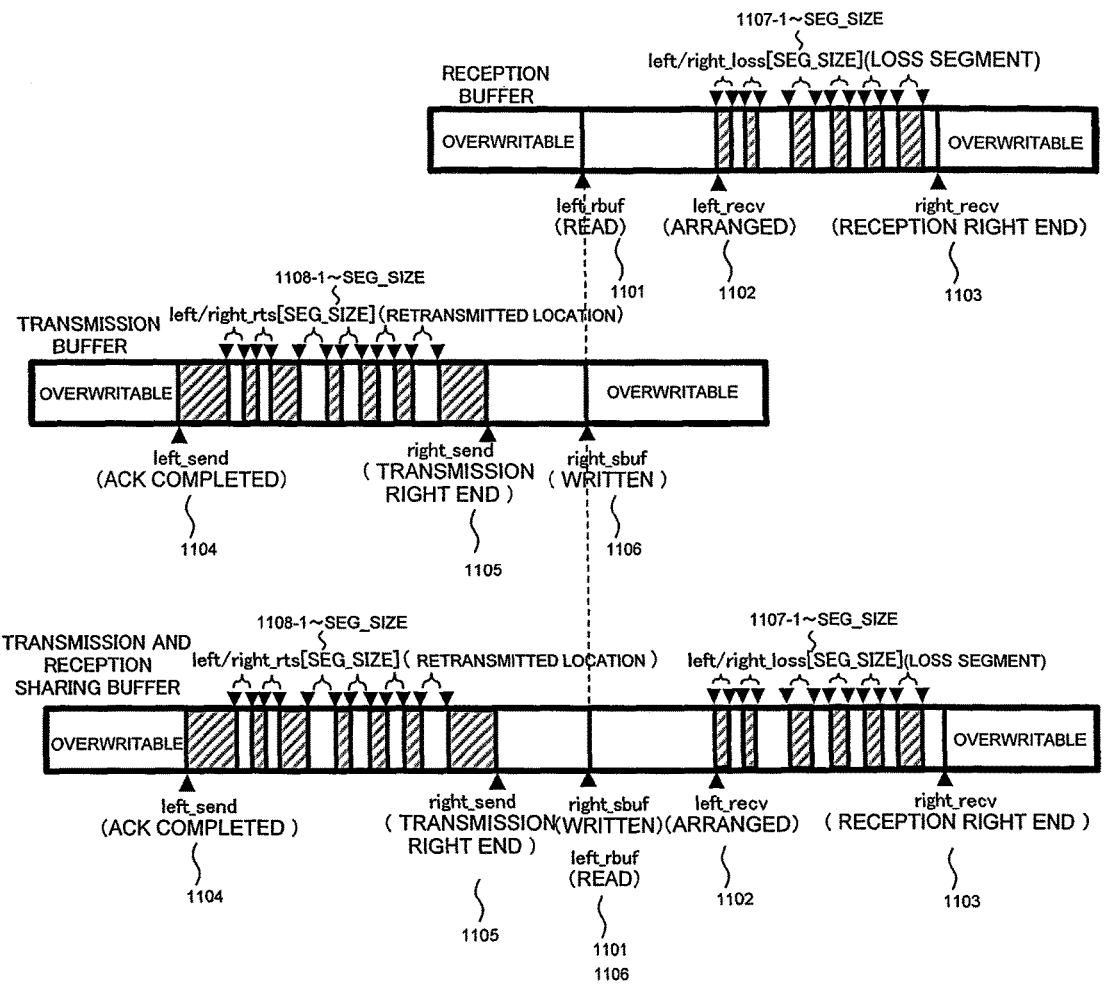
FIG. 6 is a diagram illustrating pointers for managing a transmission and reception sharing buffer.

FIG. 6 shows a case where sharing is allowed between the transmission buffer 1015 of the NIF0 dedicated TCP module 1007 and the reception buffer 1014 of the NIF1 dedicated TCP module 1008, or a case where sharing is allowed between the transmission buffer 1016 of the NIF1 dedicated TCP and the reception buffer 1013 of the NIF0 dedicated TCP. This case corresponds to a case where, in order to share data between the transmission buffer 1016 and the reception buffer 1013, the proxy module 1000 moves received data from the reception buffer region to the transmission buffer region. Two buffers including the transmission buffer and the reception buffer are used as a transmission and reception sharing buffer, and the pointer right_sbuf 1106 for the transmission buffer and the pointer left_rbuf 1101 for the reception buffer have the same value. The transmission buffer region and the reception buffer region are differentiated from each other using the same value.

Figure 7:
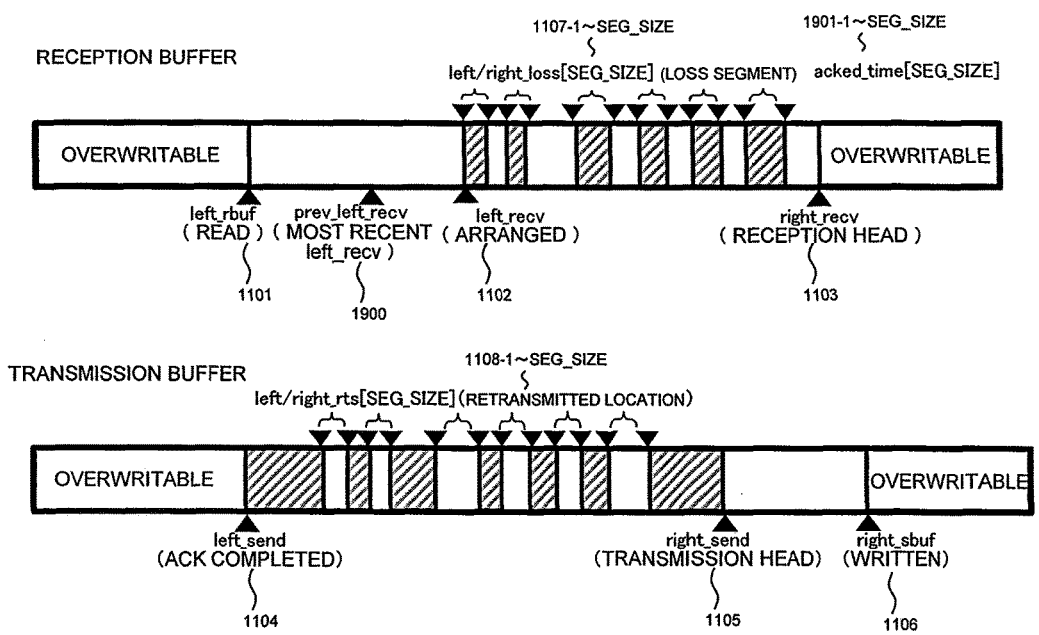
FIG. 7 is a diagram illustrating management pointers added to a transmission buffer and a reception buffer.

FIG. 7 is a diagram illustrating buffer management pointers which are additionally necessary for realizing a method in which communication devices (100 and 101) shown in FIG. 8 described later return ACK in order to prevent state mismatch. In addition to the pointers shown in FIG. 5, a pointer prev_left_recv 1900 for recording a value of latest (most recent) left_recv 1102 is further provided. This is also the same for a case where the buffer is configured as in FIG. 6.

(Basic Sequence)

Figure 8:
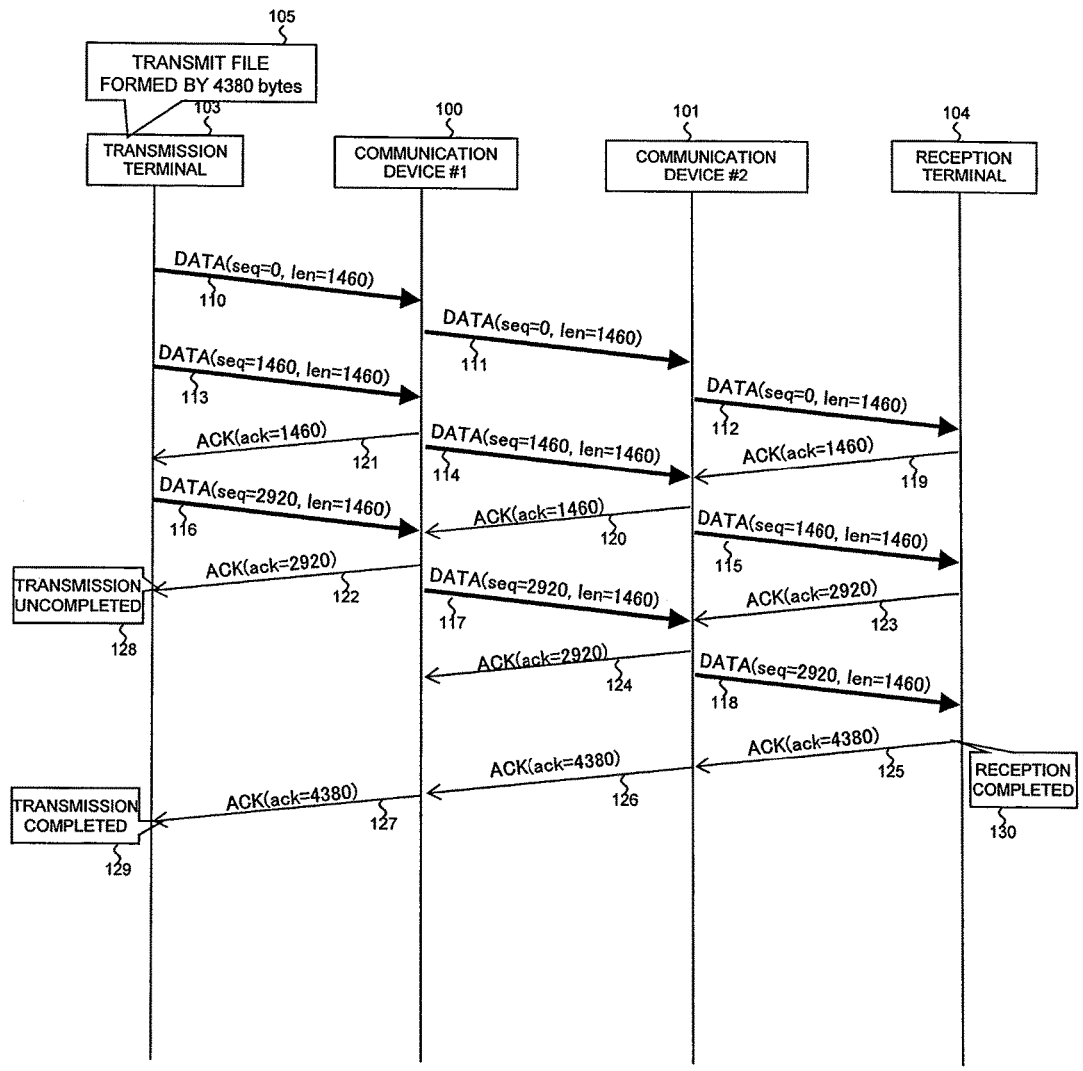
FIG. 8 is a sequence diagram illustrating that communication devices 100 and 101 return ACK one packet later.

FIG. 8 is a sequence diagram illustrating a method in which the communication devices (100 and 101) according to the present embodiment return ACK.

The figure shows an example in which file data formed by 4380 bytes is divided into three packets (110, 113, and 116) including data of 1460 bytes and is transmitted from a transmission terminal 103 to a reception terminal 104 in the same manner as in FIG. 41. In the first packets (110 to 112) from the transmission terminal 103, 0 is described as a transmission sequence number, and 1460 is described as a packet length (transmission is performed from the 0-th byte to the 1459-th byte). In the second packets (113 to 115), 1460 indicating leading data is described as a transmission sequence number, and 1460 is described as a packet length (transmission is performed from the 1460-th byte to the 2919-th byte). Similarly, in the third packets (116 to 118), 2920 indicating leading data is described as a transmission sequence number, and 1460 is described as a packet length (transmission is performed from the 2920-th byte to the 4379-th byte). The communication device #1 (100) and the communication device #2 (101) (corresponding to the communication devices 910 and 920 of FIG. 1) receive the leading packets (110 and 111) but do not return ACK. The communication device #1 (100) and the communication device #2 (101) return ACK packets (121 and 120) for the first packets after receiving the second packets (113 and 114). In addition, when the third packets (116 and 117) are received, ACK packets (122 and 124) for the second packets are returned. The transmission terminal 103 receives only the ACK packet (122) for the second packet even if the third packet (116) is transmitted, and still determines that transmission is not completed (128). When the third packet (118) arrives at the reception terminal 104 from the communication device #2 (101), the final ACK packet (125) for the third packet is returned from the reception terminal 104 for the first time, and the reception terminal 130 determines that reception is completed (130). The communication device #2 (101) and the communication device #1 (100) transmit the final ACK packets (126 and 127) for the third packets when the final ACK packets (125 and 126) are received. The transmission terminal 103 receives the final ACK packet 127 and determines that transmission is completed (129). As long as it is not determined that reception is completed in the reception terminal 130 (130), the final ACK packets (125, 126, and 127) are not returned to the transmission terminal 103, and thus the transmission terminal 129 does not determine that transmission is completed. Therefore, it is possible to prevent a situation in which an application of the transmission terminal finishes and thereby edited data disappears in a state in which the reception terminal 104 does not receive the edited data. In addition, as described above, not only ACK for a data packet received one step before may be transmitted, but also ACK for a data packet received at least one step before such as two or three steps before may be transmitted. In addition, ACK for the leading packet 110 may not be transmitted, and ACK which does not include (for example, 0 to 1459) a reception sequence number corresponding to end data of the leading packet may be returned and ACK including the reception sequence number corresponding to the end data of the leading packet may not be returned.

(Countermeasure for Retransmission)

Figure 9:
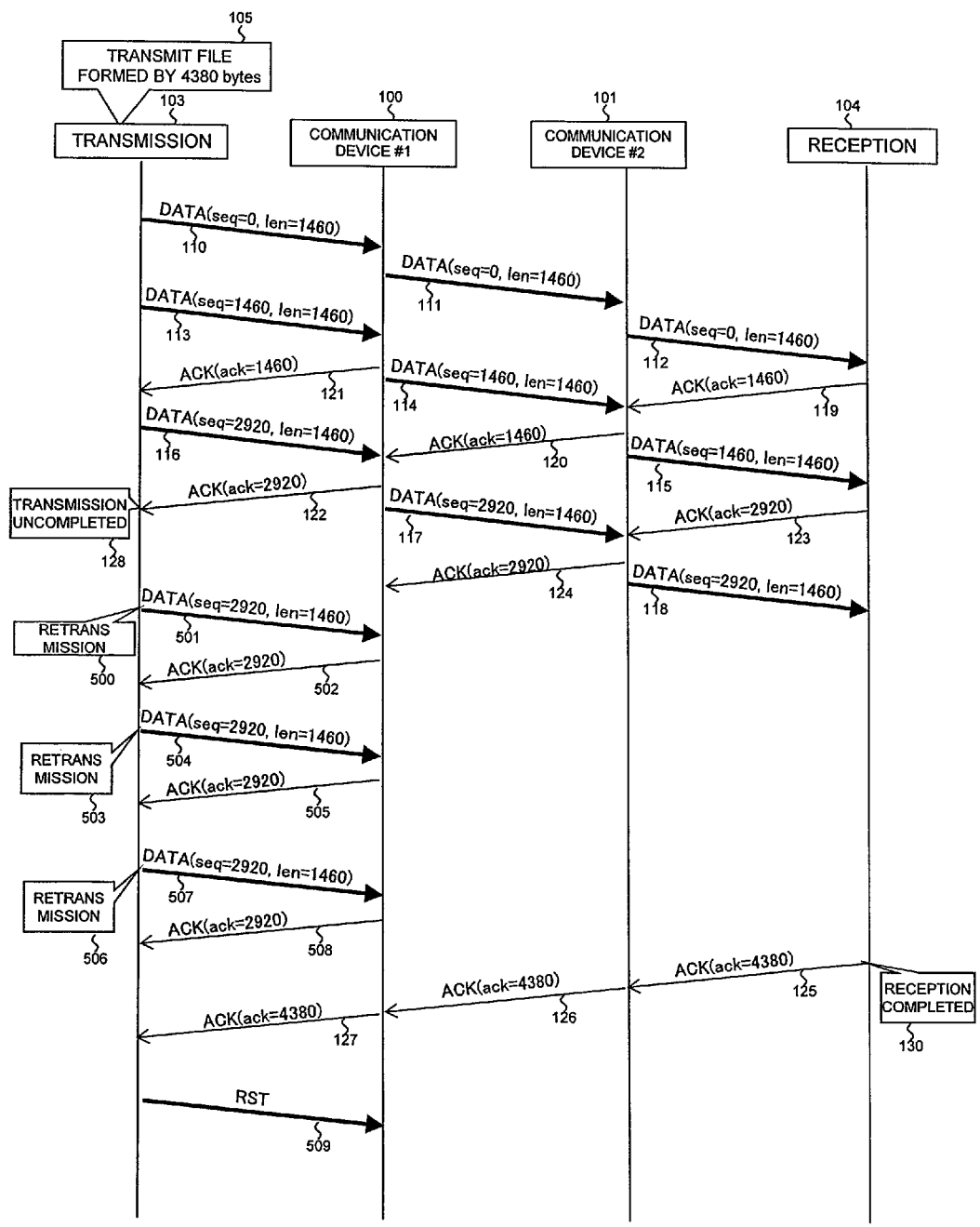
FIG. 9 is a sequence diagram illustrating a problem when retransmission occurs between a transmission terminal 103 and the communication device 100.

FIG. 9 is a sequence diagram illustrating a case where return of the final ACK packet (125) from the reception terminal 104 is late due to a narrow line bandwidth between the communication devices or the like. In this case, the transmission terminal 103 determines that the third packet (116) is discarded in the middle and retransmits a packet (500). When the retransmitted packet (501) is received, the communication device #1 (100) returns an ACK packet (502) for the second packet (113) in an overlapping manner. Then, the transmission terminal 103 determines that a discarded packet occurs again and performs transmission again (503). When the retransmitted packet (504) is received, the communication device #1 (100) returns an ACK packet (505) for the second packet in an overlapping manner. Then, the transmission terminal 103 determines that a discarded packet occurs again and performs transmission again (506). When the retransmitted packet (507) is received, the communication device #1 (100) returns an ACK packet (508) for the second packet in an overlapping manner.

As such, when an ACK packet (127) for the third packet (116) is received after retransmission is performed several times, the transmission terminal 103 transmits a packet (509) in which a TCP flag number is set to RST (reset), and thus the TCP connection is forced to be cancelled in the reception side.

Figure 10:
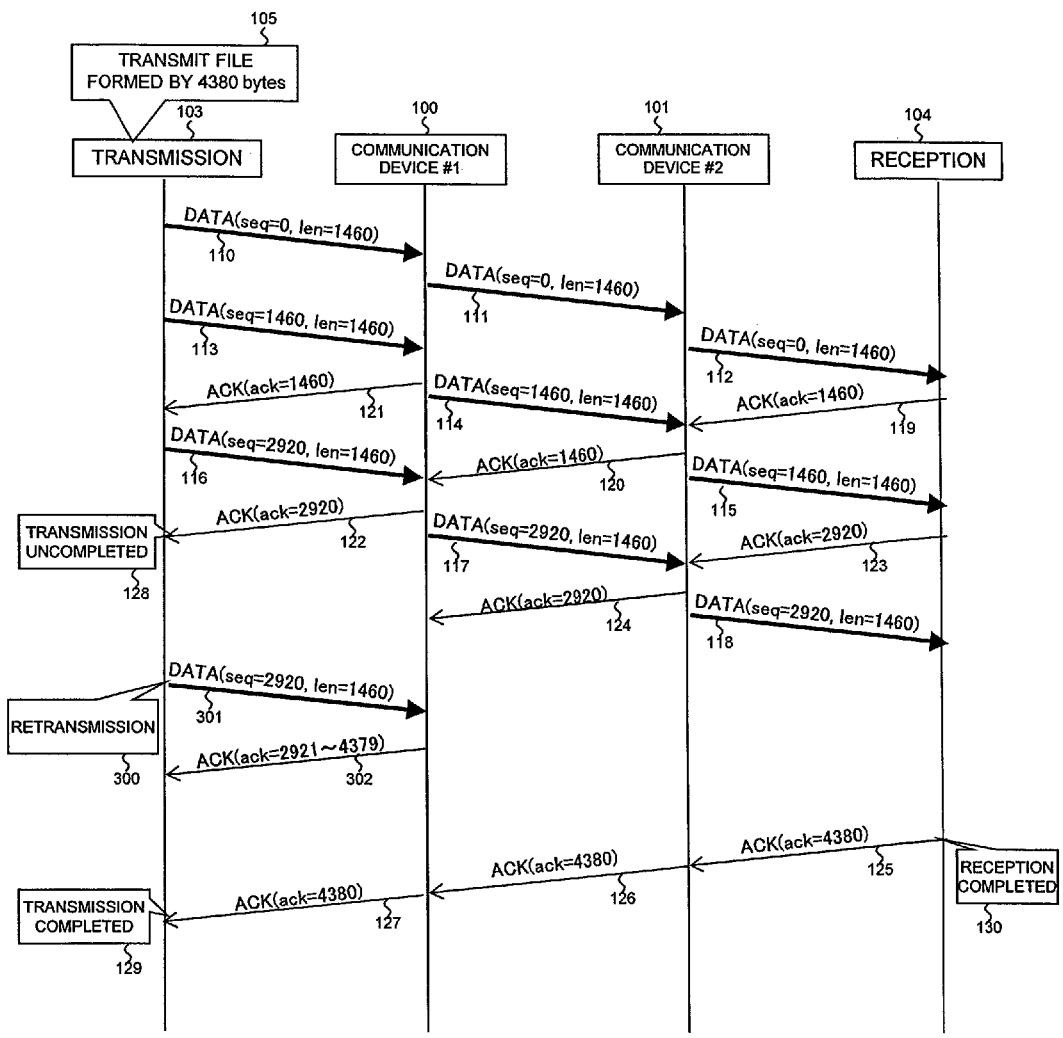
FIG. 10 is a sequence diagram illustrating a method of returning ACK when retransmission occurs between the transmission terminal 103 and the communication device 100.

FIG. 10 is a sequence diagram illustrating an ACK returning method of the communication devices (100 and 101) for preventing the RST packet from being transmitted. In a case where return of the final ACK packet (125) from the reception terminal 104 is late, the transmission terminal 103 determines that the third packet (116) is discarded in the middle, and retransmits a packet as described above (300). When the retransmitted packet (301) is received, the communication device #1 (100) returns a ACK packet (302) in which a reception sequence number is set to be larger than that of the ACK packet (122) for the second packet and smaller than that of the ACK packet (127) for the third packet.

Since some data of the transmitted packet 301 arrives at the reception terminal and thus the transmission terminal 103 determines that the communication line is still connected whilst the reception sequence number of the returning ACK packet is incremented, the transmission terminal does not transmit RST. The communication device is not required to perform control for forcing to cancel the TCP connection.

Figure 11:
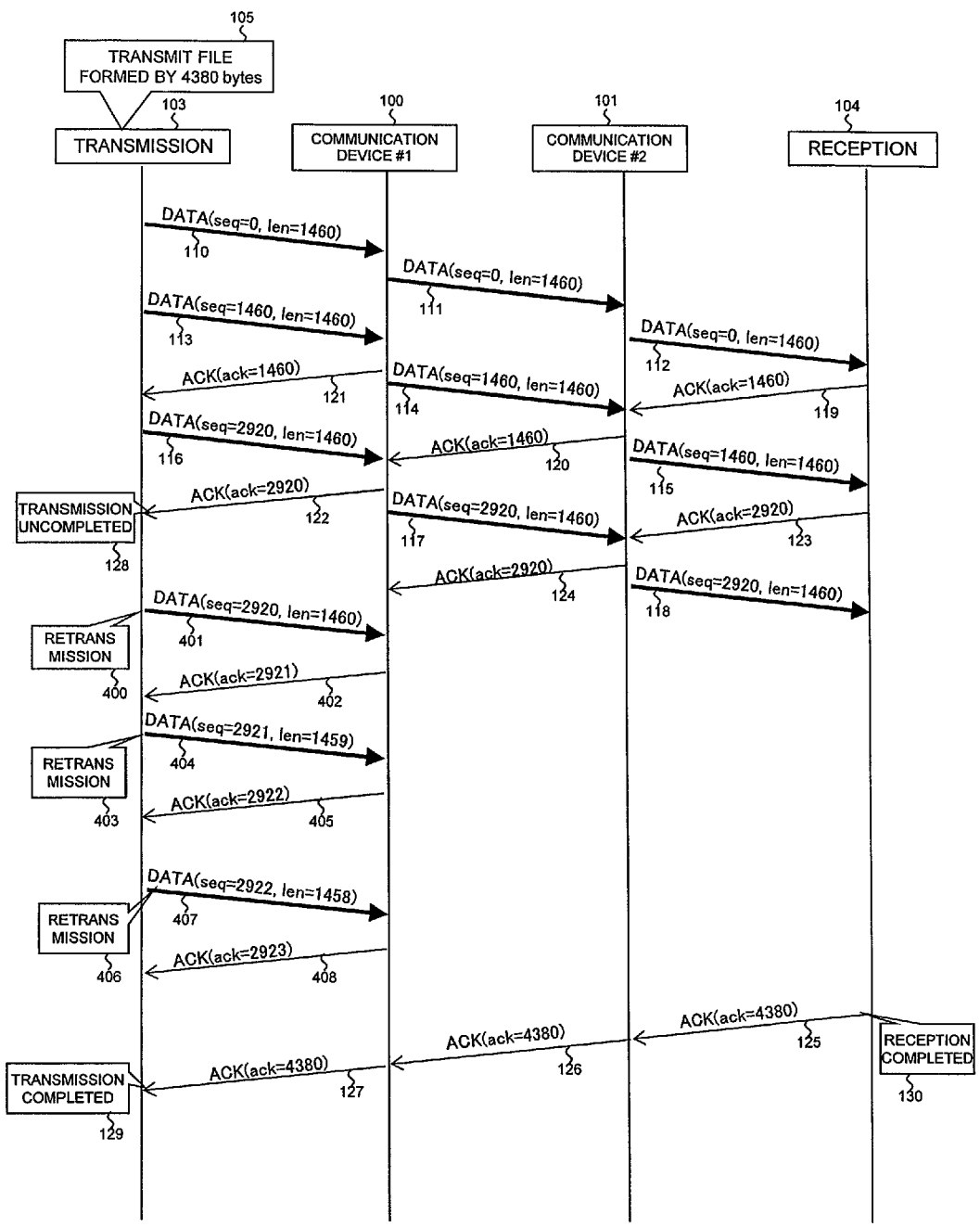
FIG. 11 is a sequence diagram illustrating a method of returning ACK when retransmission occurs between the transmission terminal 103 and the communication device 100.

As shown in FIG. 11, when there are many cases (400, 403, and 406) where the transmission terminal 103 determines that the third packet (116) is discarded in the middle and retransmits a packet, an ACK packet may be returned by increasing a reception sequence number by 1 (402, 405, and 408). In these cases, a transmission sequence number of retransmitted packets (401, 402, and 403) increases by 1, and a payload length decreases by 1.

(Countermeasure for Predicted Command)

Figure 12:
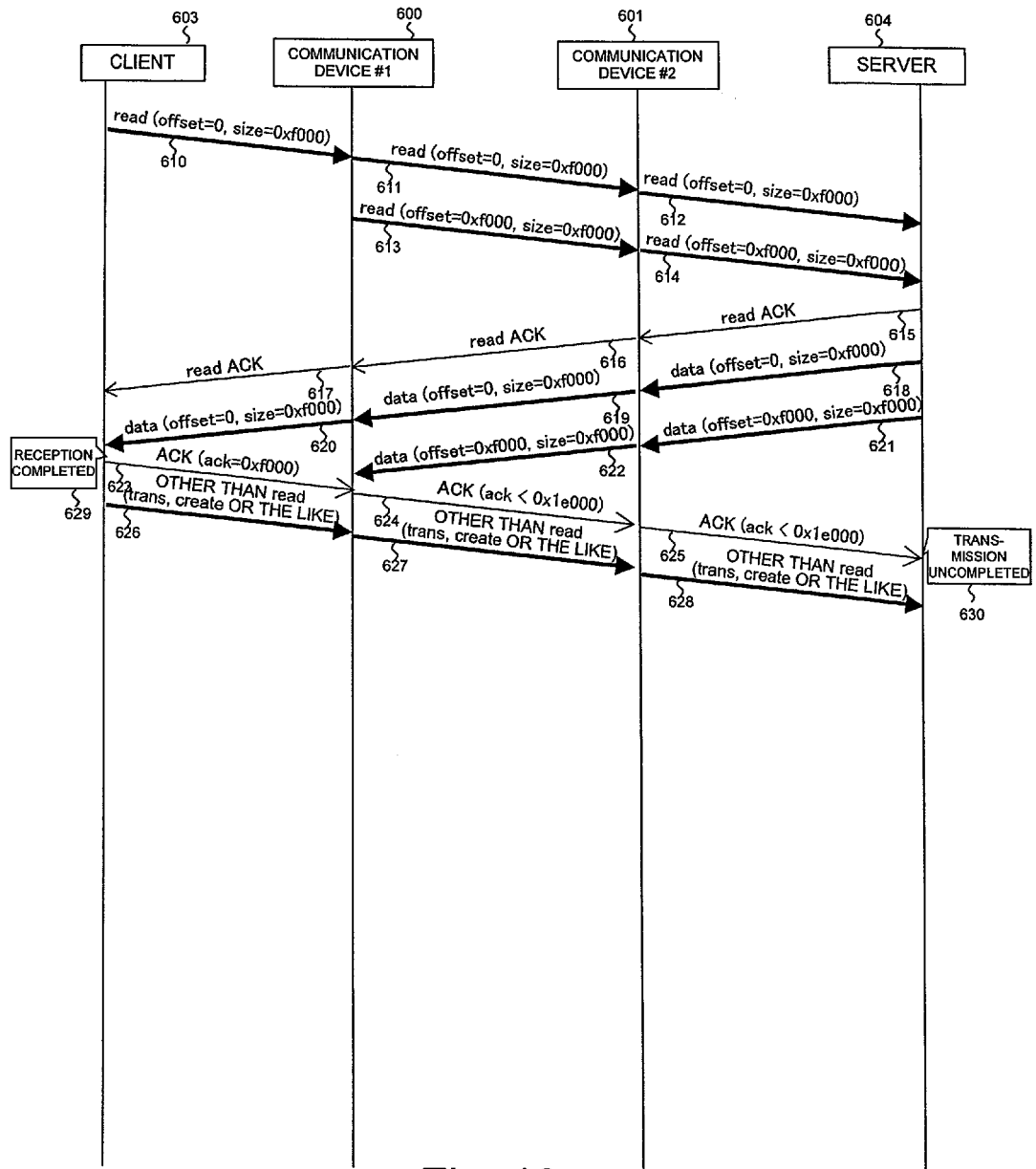
FIG. 12 is a sequence diagram illustrating a method of returning ACK when a communication device 600 predicts and transmits a subsequent command to a server side in advance.

FIG. 12 is a sequence diagram illustrating that defects are caused by the process of the present embodiment in a case where a communication device #1 (600) which performs the same ACK return as the communication device #1 (100) has a function to predict and transmit a subsequent command in order to accelerate an application such as a Common Internet File System (CIFS) which has a window size therein. It is assumed that a client (client device) 603 transmits a packet 610 in which a read command for reading a file by 0xf000 (61440) bytes from 0-th byte is described, to a server 604. The communication device #1 (600) relays the packet 610 which is transmitted to the server 604 as a packet 611, and, also predicts that a read command for reading the file by 0xf000 (61440) bytes from the 0xf000-th byte is described in a subsequent packet, and transmits a packet 613 in which the read command which is predicted in advance is described to the server. The packet 611 in which the command issued by the client is described and the packet 613 in which the predicted command is described arrive at the server 604 as packets (612 and 614) via a communication device #2 (601). The server 604 returns an ACK packet 615 for the packets in which the commands are described, and transmits data (618) of 0xf000 (61440) from the 0-th byte of the file and data (621) of 0xf000 (61440) from the 0xf000-th byte of the file as described in the commands, to the client (603). The data (618 and 621) is sent to the communication device #1 (700) as data (619 and 622) via the communication device #2 (701). The communication device #1 (700) transmits the data (619) requested by the client to the reception terminal 603 (620), and returns an ACK packet 624 in which a size smaller than the received data size 0x1e000 is described in a reception sequence number to the server side since transmission to the reception terminal 603 and reception of ACK for the final data are not completed in relation to the subsequent data (622). When the data (623) requested with the command is received, the client 603 determines that reception is completed (629) and issues a command again. Here, it is assumed that the client 603 transmits a packet 626 in which a command (for example, trans, or create) different from the command 613 predicted by the communication device #1 (600) is described. In this case, since the server 604 receives the packet 628 in which the next command is described and thus does not finish a process for the previous command in a state (630) in which the ACK packet 625 having the reception sequence number smaller than the transmitted data size arrives and the server 604 determines that transmission is not completed, a process for the next command is not performed and the application stops.

Figure 13:
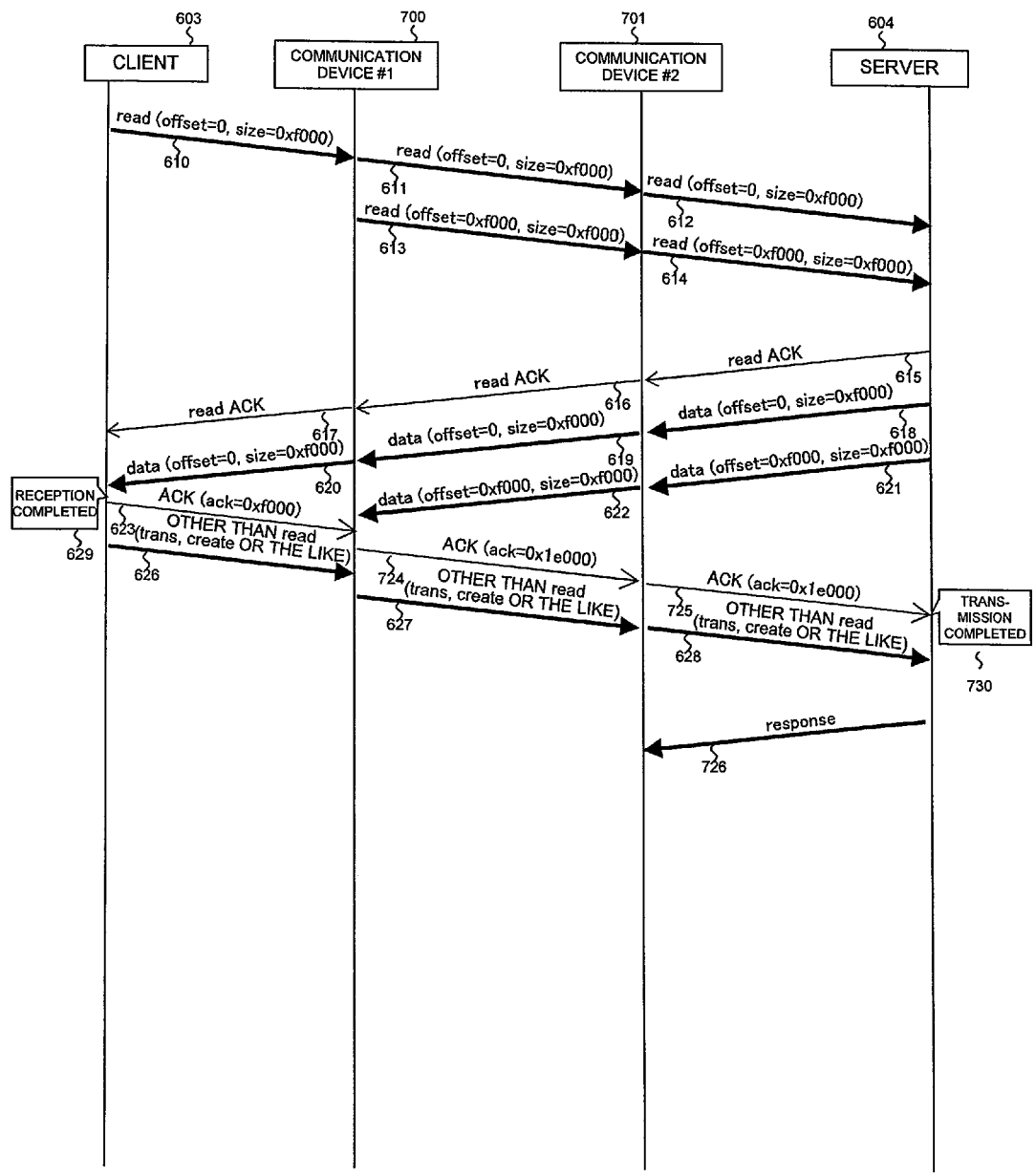
FIG. 13 is a sequence diagram illustrating a method of returning ACK when the communication device 600 predicts and transmits a subsequent command to the server side in advance.

FIG. 13 is a sequence diagram illustrating that the application is prevented from stopping. In a state in which the predicted command is issued, the communication device #1 (700) returns an ACK packet 724 in which the same size as the received data size 0x1e000 is described in a reception sequence number to the server side. The communication device returns ACK normally in a state of issuing the predicted command, and thereby the server 604 can determine that transmission is completed (730) by receiving the ACK packet (725) having the same reception sequence number as the transmitted data size, and can continuously perform a process for a next command when the next command (628) arrives. The application does not stop without performing a process for the next command. Whether or not a predicted command is issued may be determined using appropriate methods by setting issuing of a predicted command in the device in advance or by setting a flag when issuing a predicted command and referring to the flag.

The operation sequence of the communication device shown in FIGS. 8, 10, 11 and 13 is realized by the system shown in FIG. 1 and the devices having the blocks shown in FIGS. 3 and 4.

Figure 14:
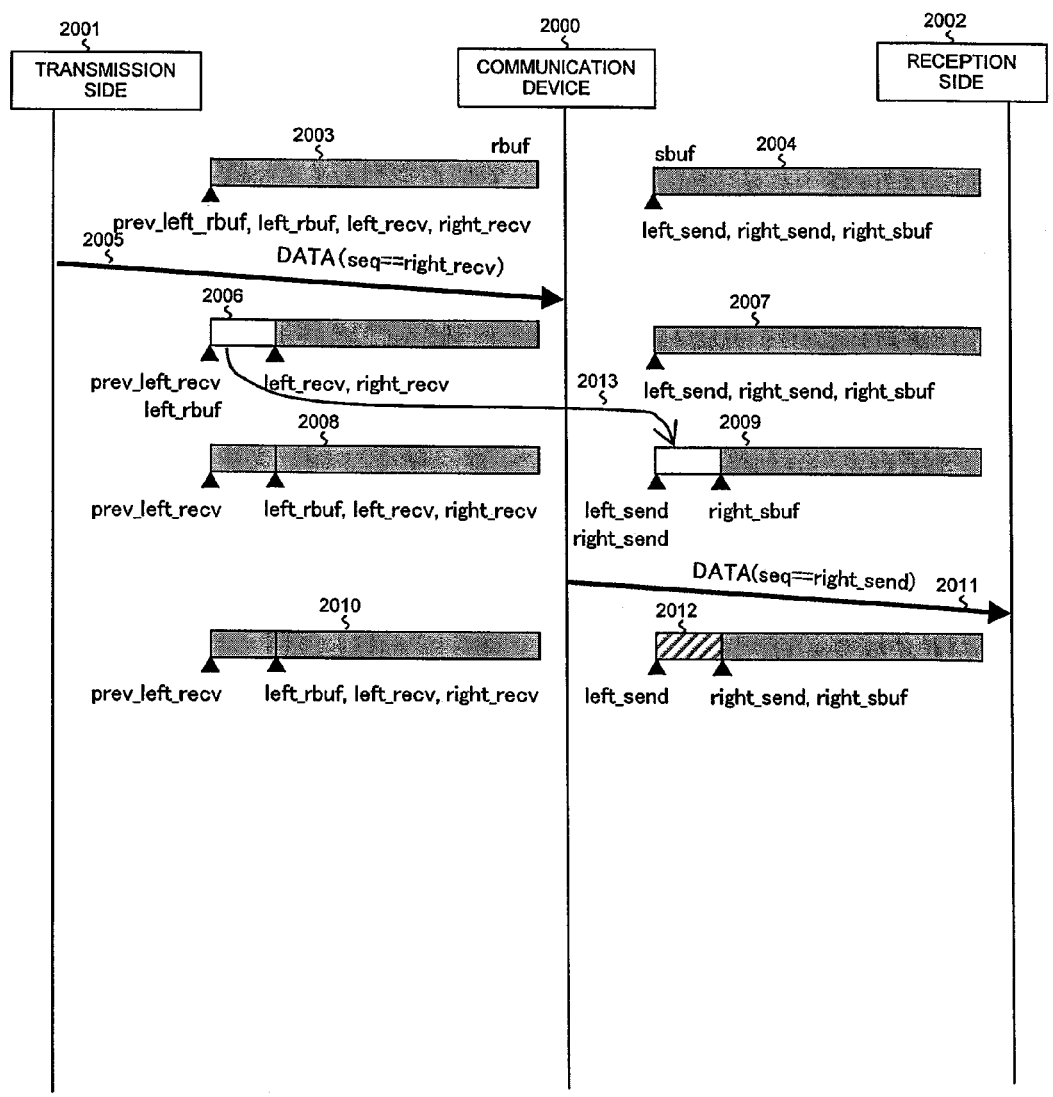
FIG. 14 is a sequence diagram illustrating updating of a buffer management pointer and transmission and reception packets of the communication device.

FIG. 14 is a sequence diagram illustrating how a pointer moves in order to prevent state mismatch when a communication device 2000 which returns ACK one packet/one byte later receives leading data 2005. Here, the communication device 2000 is the communication device 910 or 920. The figure shows a movement of a pointer of a reception buffer 2003 used for TCP communication between the communication device 2000 and a transmission terminal 2001 and a movement of a pointer of a transmission buffer 2004 used for TCP communication between the communication device 2000 and a reception terminal 2002.

When a packet 2005 with leading data a transmission sequence number of which is the same as right_recv 1103 is received from the transmission terminal 2001, the communication device 2000 moves left_recv 1102 and right_recv 1103 to the right by the size of the received data (2006). prev_left_recv 1900 does not vary. An ACK packet 1309 for acknowledgement in which a reception sequence number is set to left_recv 1102 is sent to the transmission terminal 1301. If left_recv 1102 is larger than left_rbuf 1101, data written from left_rbuf 1101 to left_recv 1102 is moved to the transmission buffer 2007 using right_sbuf 1106 as ahead (2013), and left_rbuf 1101 and right_sbuf 1106 are moved to the right by the size of the moved data (2008 and 2009). If right_sbuf 1106 is larger than right_send 1105, data from right_send 1105 to right_sbuf 1106 is transmitted to the reception terminal 2002 (2011), and right_send 1105 is moved to the right by the size of the transmitted data (2012).

The above-described sequence realizes means for not returning ACK when a data packet is received in a state in which there is no data which waits for ACK and transmission of which is in progress or data which waits for arrangement and reception of which is in progress.

Figure 15:
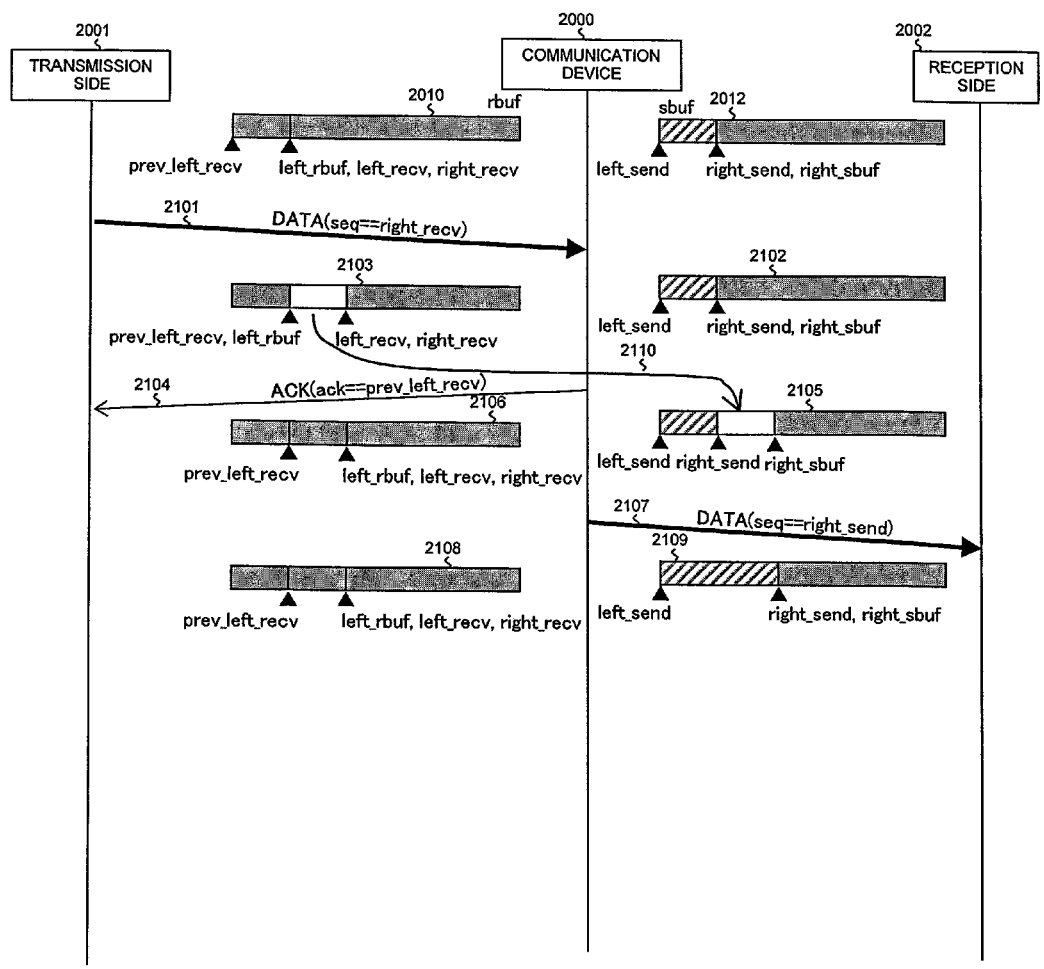
FIG. 15 is a sequence diagram illustrating updating of a buffer management pointer and transmission and reception packets of the communication device.

FIG. 15 is a sequence diagram illustrating a case where the communication device 2000 further receives a packet 2101 with leading data a transmission sequence number of which is the same as right_recv 1103 from the transmission terminal 2001 in this state.

When the packet 2101 is received, the communication device 2000 assigns a value of left_recv 1102 to prev_left_recv 1900, then moves left_recv 1102 and right_recv 1103 to the right by the size of the received data (2103), and sends an ACK packet 2104 for acknowledgement in which the reception sequence number ACK 2913 is set to prev_left_recv 1900 to the transmission terminal 2001. In addition, when ACK is returned for the received packet, an ACK packet 1318 for acknowledgement in which a reception sequence number is set to left_recv 1102 is sent to the transmission terminal 1301, but, in the present embodiment, ACK for a packet received one step before is transmitted. If left_recv 1102 is larger than left_rbuf 1101, data written from left_rbuf 1101 to left_recv 1102 is moved to the transmission buffer 2102 using right_sbuf 1106 as a head (2110), and left_rbuf 1101 and right_sbuf 1106 are moved to the right by the size of the moved data (2106 and 2105). If right_sbuf 1106 is larger than right_send 1105, data from right_send 1105 to right_sbuf 1106 is transmitted to the reception terminal 2002 (2107), and right_send 1105 is moved to the right by the size of the transmitted data (2109). In addition, left_send 1104 is not moved since an ACK packet for acknowledgement is not received from the reception terminal.

The above-described sequence realizes a means for returning ACK for a data packet which is received one step before when a data packet is received in a state in which there is data which waits for ACK and transmission of which is in progress or data which waits for arrangement and reception of which is in progress.

Figure 16:
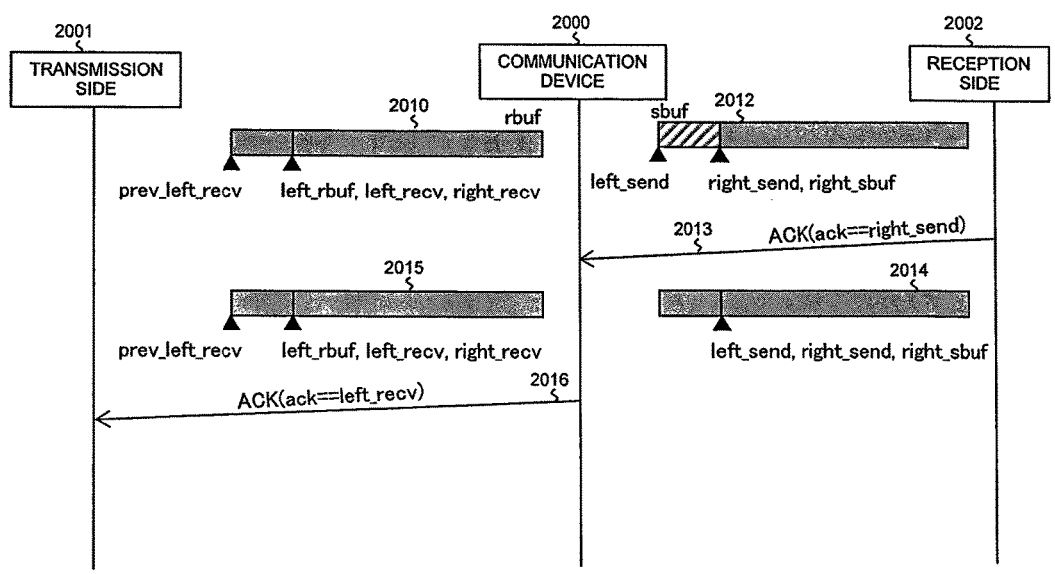
FIG. 16 is a sequence diagram illustrating updating of a buffer management pointer and transmission and reception packets of the communication device.

FIG. 16 is a sequence diagram illustrating how a pointer moves in order to prevent state mismatch when the communication device 2000 which returns ACK one packet/one byte later receives final data 2013. The figure shows a movement of a pointer of a reception buffer 2010 used for TCP communication between the communication device 2000 and a transmission terminal 2001 and a movement of a pointer of a transmission buffer 2012 used for TCP communication between the communication device 2000 and the reception terminal 2002.

After the communication device 2000 transmits the final data to the reception terminal 2002, right_send 1105 have the same value as right_sbuf 1106 and thus right_send 1105 is larger than left_send 1104 by the size of the final data in the transmission buffer 2012. In the reception buffer 2010, left_recv 1102 has the same value as right_recv 1103, there is no unarranged data reception of which is in progress, and prev_left_recv 1900 has a smaller value than left_recv 1102. When an ACK packet 2013 for the final data a reception sequence number of which is the same as right_send 1105 is received, the left_send 1104 has the same value as the right_send 1105 (2014), and thus there is no data waiting for acknowledgement in the transmission buffer 2012 in a state in which there is no unarranged data reception of which is in progress in the reception buffer 2010. At this timing, the communication device 2000 returns an ACK packet 2016 a reception sequence number of which is set to left_recv 1102 to the reception terminal 2001.

The above-described sequence realizes a means for returning normal ACK at a timing when ACK is received from a reception terminal side and thus there is no data which waits for acknowledgement and transmission of which is in progress in a transmission buffer in a state in which there is no data which waits for arrangement and reception of which is in progress in a reception buffer.

Figure 17:
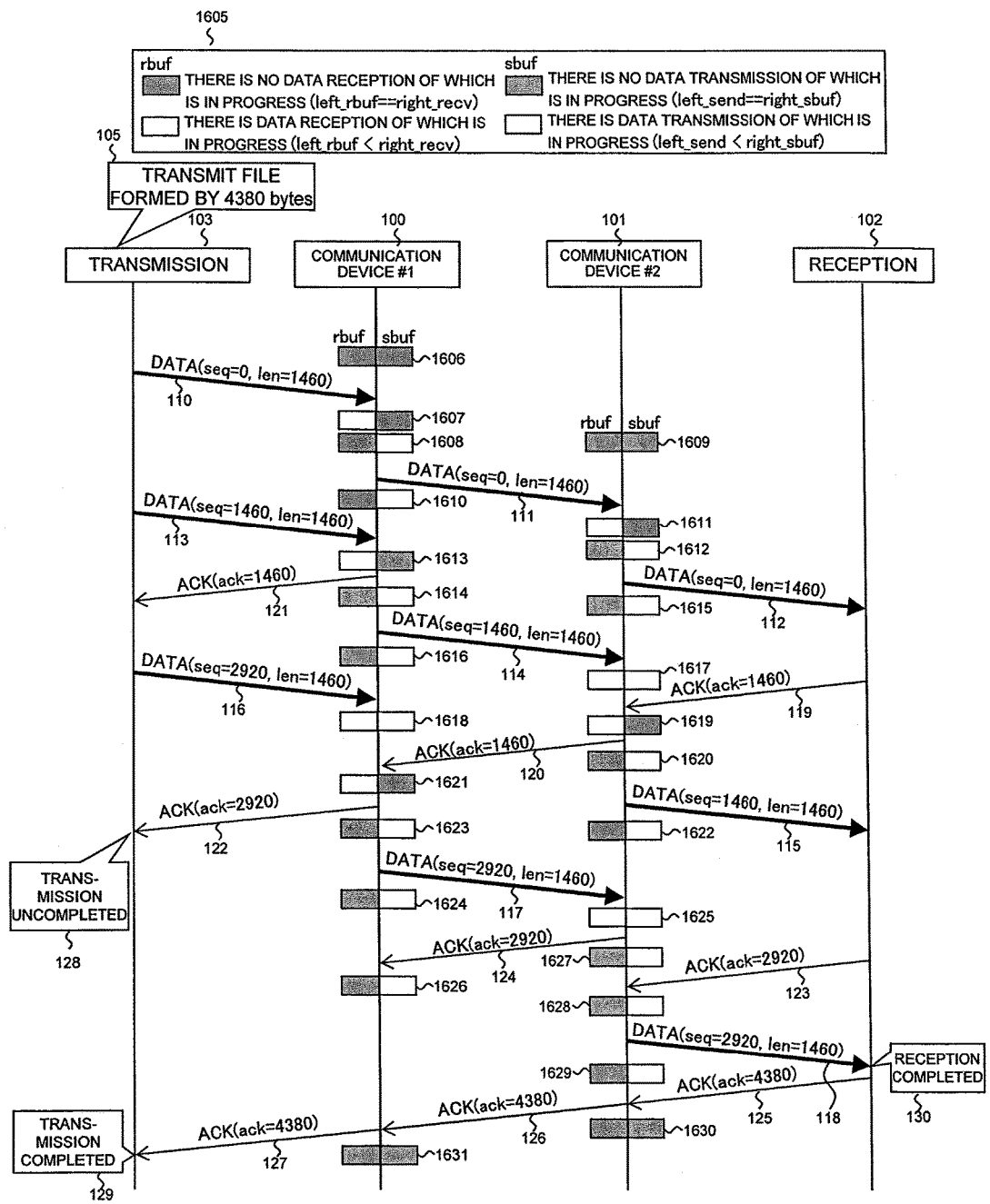
FIG. 17 is a sequence diagram illustrating transmission and reception packets of the communication device and whether or not there is data in the buffer.

FIG. 17 is a sequence diagram to which information of whether or not there is data reception of which is in progress in a reception buffer used for transmission side TCP communication and whether or not there is data transmission of which is in progress in a transmission buffer used for reception side TCP communication is added to the sequence diagram of FIG. 8.

Since packets 110 and 111 with data are received in states 1606 and 1609 in which there is no data reception of which is in progress or data transmission of which is in progress, the communication devices 100 and 101 determine that the packets are leading data and thus do not return ACK. In addition, when ACK packets 125 and 126 with a reception sequence number 4380 are received, the communication devices 100 and 101 vary to states 1630 and 1631 in which there is no data reception of which is in progress or data transmission of which is in progress, and thus return ACK packets 126 and 127 for the final data. When the data packets (113, 114, 116, and 117) are received, there is data reception of which is in progress or data transmission of which is in progress, and thus an ACK packet for a data packet received one step before is returned. In addition, when the ACK packets (119, 120, 123, and 124) are received, in a state in which there is data reception of which is in progress or data transmission of which is in progress, an ACK packet for received data is not returned to the transmission side.

Figure 18:
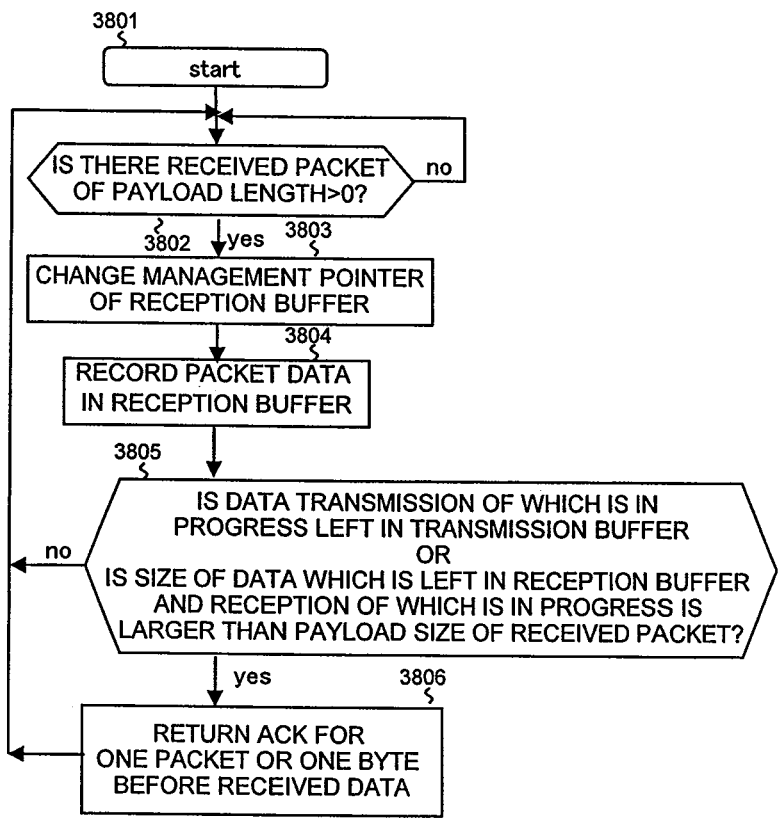
FIG. 18 is a flowchart illustrating a process performed by a reception history update portion 3106 of a NIF0 TCP module 1007.

FIG. 18 is a flowchart illustrating a process performed by the reception history update portion 3106 of the NIF0 TCP module 1007.

When the process starts (step 3801), the reception history update portion 3106 waits for a packet a payload length of which is larger than 0 to be received (step 3802). When a packet is received, the reception history update portion 3106 changes the management pointer 1005 of the reception buffer of NIF0 (step 3803), and records the packet data in the reception buffer 1013 of NIF0 (step 3804). In addition, the reception history update portion 3106 determines whether or not data transmission of which is in progress is left in the transmission buffer 1016 of NIF1 or whether or not the size of data which is left in the reception buffer of NIF0 and reception of which is in progress is larger than the payload size of the received packet (step 3805). If negative, the reception history update portion 3106 returns to step 3802. If true, the reception history update portion 3106 returns ACK for one packet or one byte before the received data (step 3806). Step 3805 realizes a sequence process in which ACK for the initially arriving data shown in FIG. 14 is not returned. In addition, step 3806 following step 3805 realizes a sequence process in which ACK for one packet or one byte before the received data shown in FIG. 15 is returned.

Figure 19:
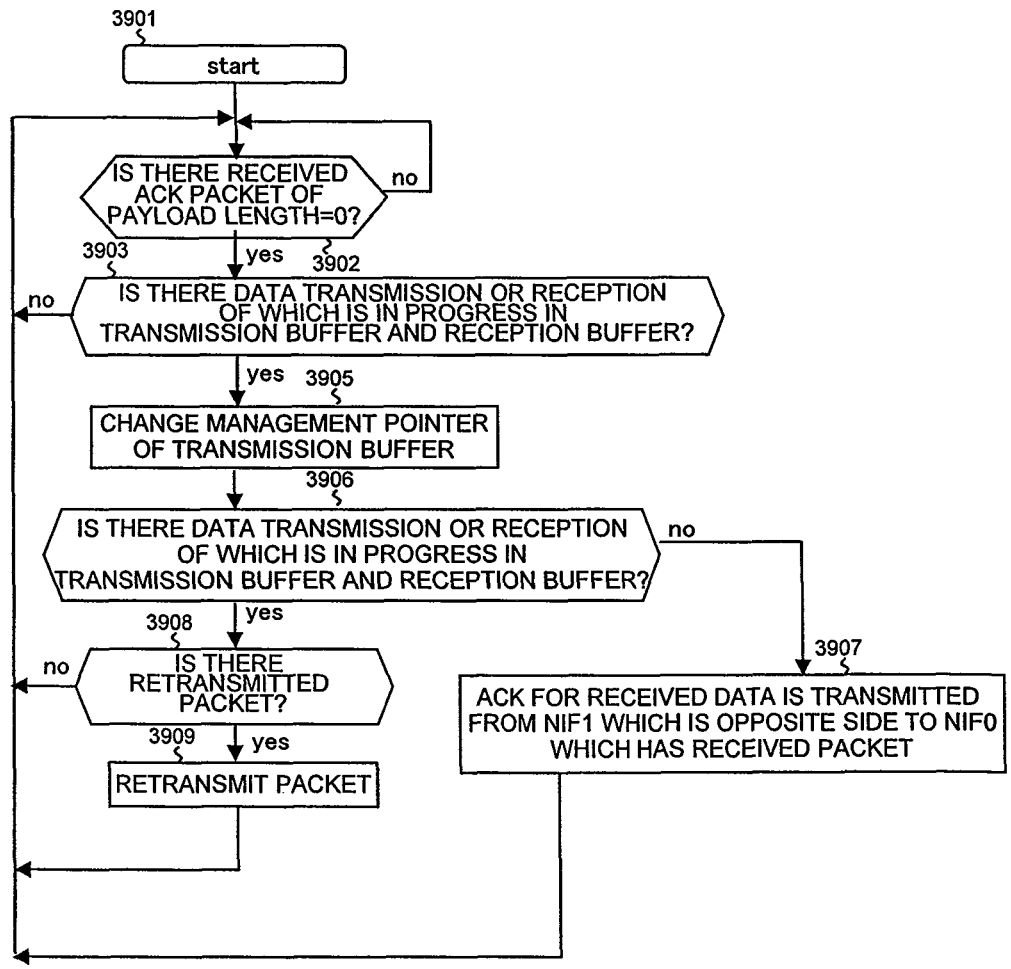
FIG. 19 is a flowchart illustrating a process performed by a TX packet retransmission portion 3104 of the NIF0 TCP module 1007.

FIG. 19 is a flowchart illustrating a process performed by the TX packet retransmission portion 3104 of the NIF0 TCP module 1007.

When the process starts (step 3901), the TX packet retransmission portion 3104 waits for an ACK packet a payload length of which is 0 to be received (step 3902). When an ACK packet is received, the TX packet retransmission portion 3104 determines whether or not there is data in the transmission buffer of NIF0 and the reception buffer of NIF1 (step 3903). If there is no data, the flow returns to step 3902. If there is data, the TX packet retransmission portion 3104 changes the management pointer of the transmission buffer of NIF0 on the basis of the reception sequence number ACK 2913 described in the received ACK packet, or left_edge_1 to 4 (2919, 2921, 2923, and 2925) or right_edge_1 to 4 (2920, 2922, 2924, and 2926) (step 3905). In step 3905, if the reception sequence number ACK 2913 described in the received ACK packet is larger than left_s-end 1104, left_send 1104 is changed to a value of the reception sequence number ACK 2913. For example, in a case of final ACK, there is no data waiting for ACK in the transmission buffer. In addition, in the same manner as in step 3903, the TX packet retransmission portion 3104 determines again whether or not there is data in the transmission buffer of NIF0 and the reception buffer of NIF1 (step 3906).

If there is data in the reception buffer of NIF1 in step 3906, the TX packet retransmission portion 3104 checks values of the pointers left/right_rts 1108-1 to SEG_SIZE indicating the left and the right end of a data location retransmission of which is in progress, and determines whether or not there is a retransmitted packet (step 3908). If there is no retransmitted packet, the flow returns to step 3902. If there is a retransmitted packet, a packet is retransmitted (step 3909), and the flow returns to step 3902. If it is determined that there is no data in the reception buffer of NIF1 in step 3906, ACK for the received data is transmitted from NIF1 which is an opposite side to NIF0 which has received the ACK packet (step 3907). When a state in which there is data transmission and reception of which are in progress in the transmission buffer of NIF0 and the reception buffer of NIF1 varies to a state in which there is no data before and after the management pointer changing process of the transmission buffer of NIF0 (step 3905), ACK for received data is returned, thereby realizing a sequence process in which final ACK is not returned until final ACK is received from the reception side shown in FIG. 16.

Figure 20:
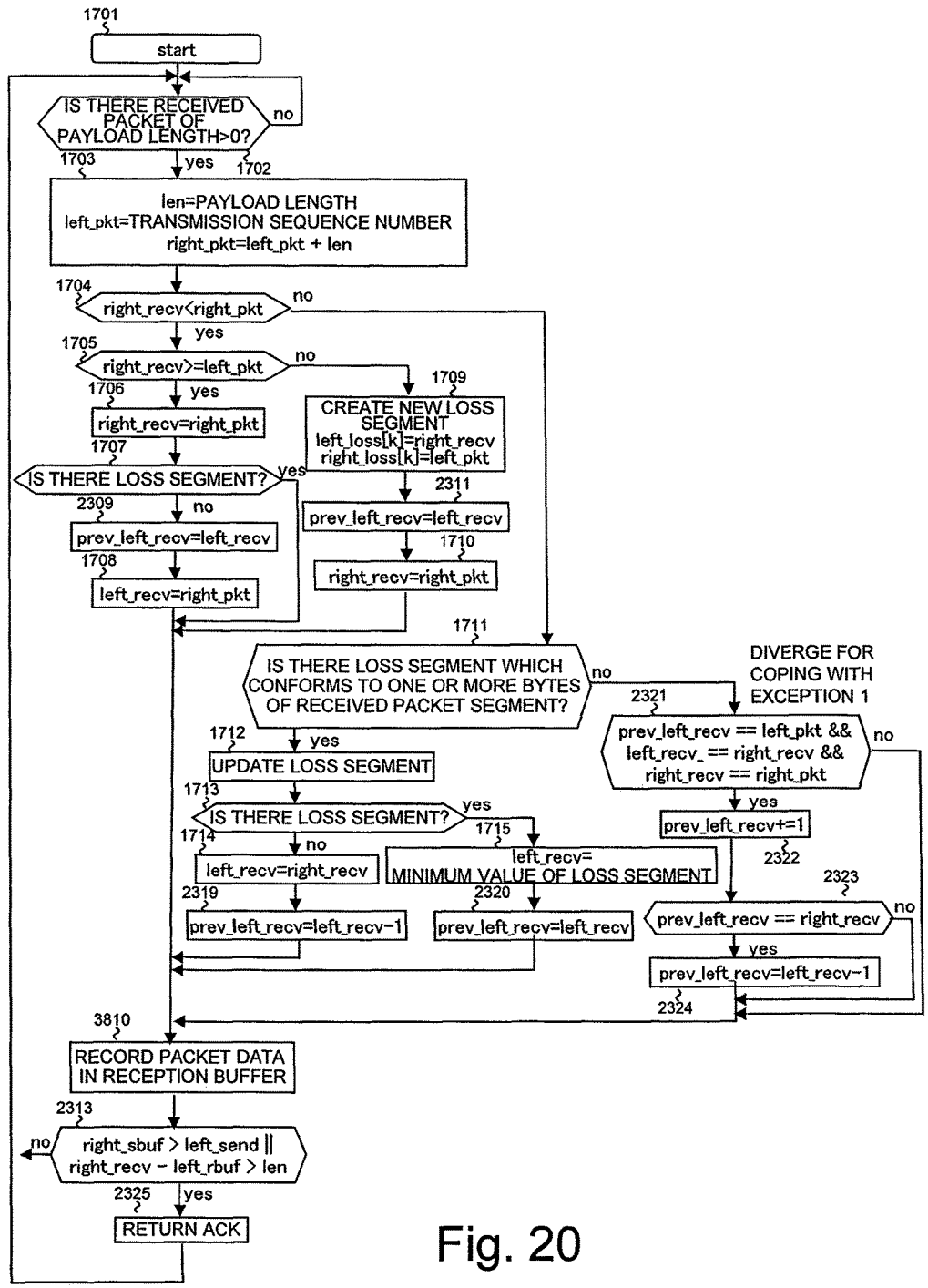
FIG. 20 is a flowchart diagram illustrating updating of a buffer management pointer.

FIG. 20 is a flowchart diagram specifically illustrating the changing process (step 3803) of the reception buffer management pointers (prev_left_recv 1900, left_recv 1102, and right_recv 1103) of FIG. 18 and illustrating step 3805 by using the reception buffer management pointers. Each step of this flowchart is performed by, for example, the TCP modules 1007 and 1008 of the communication device.

When the process starts (step 1701), reception of a packet with data is awaited (step 1702). When a packet with data is received, len is set to a length of payload 2927, left_pkt is set to a transmission sequence number of the received packet, and, right_pkt is set to left_pkt+len (step 1703). Successively, it is determined whether or not right_pkt is larger than right_recv 1103 (step 1704). If larger, it is further determined whether or not right_recv 1103 is equal to or more than left_pkt (step 1705). If the determination result of step 1705 is true, right_pkt is assigned to right_recv 1103 (step 1706). In addition, it is determined whether or not there is a loss segment (step 1707), and, if there is no loss segment, left_recv 1102 is assigned to prev_left_recv 1900 (step 2309), and right_pkt is assigned to left_recv 1102 (step 1708). If there is a loss segment, no process is performed. If the determination result of step 1705 is false, new loss segments left_loss[k] and right_loss[k] are created, a value of right_recv 1103 is assigned to left_loss[k], a value of left_pkt is assigned to right_loss[k] (1709), then, a value of left_recv 1102 is assigned to prev_left_recv 1900 (step 2311), and a value of right_pkt is assigned to right_recv 1103 (1710). If the determination result of step 1704 is false, it is determined whether or not there is a loss segment (left_loss[k] to right_loss[k]) which conforms to one or more bytes of the packet segment (left_pkt to right_pkt) (step 1711), and, if there is no loss segment, no process is performed. If there is a loss segment, the loss segment is updated (step 1712), and then it is determined whether or not there is a loss segment (step 1713). If there is no loss segment, a value of right_recv 1103 is assigned to left_recv 1102 (step 1714). Successively, a value of left_recv 1102-1 is assigned to prev_left_recv 1900 (step 2319). If there is a loss segment, a value of the left end of the minimum loss segment is assigned to left_recv 1102 (step 1715). In addition, left_recv 1102 is assigned to prev_left_recv 1900 (step 2320). When the change of left_recv 1102 and right_recv 1103 is completed, left_recv 1102 is described in the reception sequence ACK 2913 and an ACK packet is returned (step 1716).

In addition, after step 1708, and after it is determined as being false in step 1707, the packet data is recorded in the reception buffer (step 3810), and it is determined whether or not right_sbuf 1106 is larger than left_send 1104, or a difference between right_recv 1103 and left_rbuf 1101 is larger than len (step 2313). Step 2313 is a process for determining whether or not data transmission and reception of which are in progress is left in either the reception buffer or the transmission buffer. If it is determined that right_sbuf 1106 is not larger than left_send 1104, or a difference between right_recv 1103 and left_rbuf 1101 is not larger than len in step 2313, ACK is not returned, and the flow returns to step 1702. Inserting this step realizes a means for not returning ACK when leading data is received.

Further, after it is determined to be negative in step 1711, it is determined whether or not prev_left_recv 1900 is the same as left_pkt, left_recv 1102 is the same as right_recv 1103, and right_recv 1103 is the same as right_pkt (step 2321). If it is determined to be true in step 2321 (the same), prev_left_recv 1900 is incremented by 1 (step 2322). Further, it is determined whether or not prev_left_recv 1900 is the same as right_recv 1103 (step 2323), and, if the step is determined as being true (the same), a value of left_recv 1102-1 is assigned to prev_left_recv 1900 (step 2324). By inserting steps 2321 to 2324, a possibility that the transmission terminal may transmit an RST packet and force to cancel a connection is reduced when packet retransmission from the transmission terminal is repeatedly performed.

ACK is returned (step 2325), and the flow returns step 1702 except for a case where it is determined that right_sbuf 1106 is not larger than left_send 1104, or a difference between right_recv 1103 and left_rbuf 1101 is not larger than len in step 2313.

Figure 21:
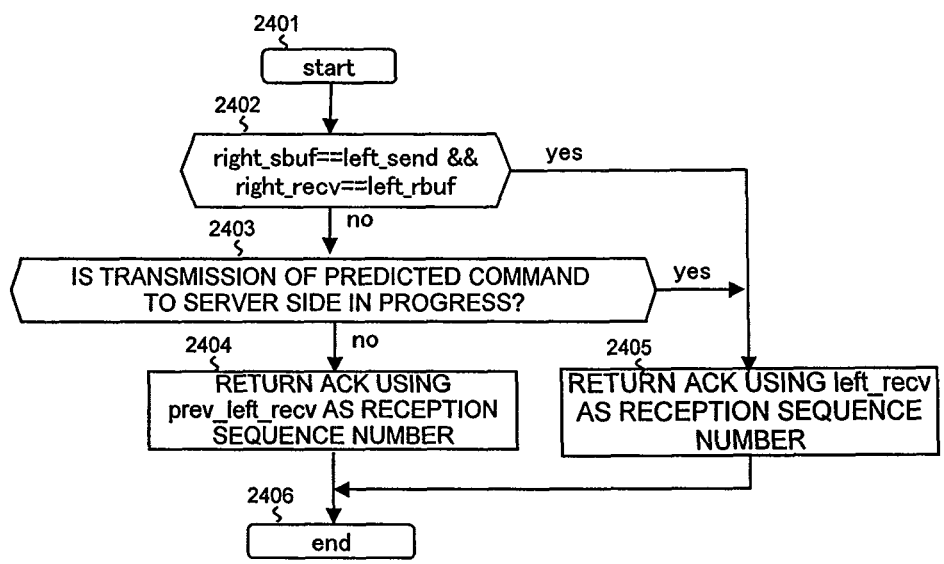
FIG. 21 is a flowchart diagram illustrating returning ACK.

FIG. 21 is a flowchart specifically illustrating step 2325.

When the process in step 2325 starts (step 2401), it is determined whether or not right_sbuf 1106 is the same as left_send 1104, and right_recv 1103 is the same as left_rbuf 1101 (step 2402). Step 2402 is a process for checking that there is no data transmission and reception of which are in progress in the transmission buffer and the reception buffer. If it is determined to be negative, that is, it is determined that data transmission and reception of which are in progress is left, it is determined whether or not transmission of a predicted command to the server side is in progress as shown in FIG. 12 or 13 (step 2403). If it is determined that transmission of a predicted command to the server side is not in progress, ACK is returned using prev_left_recv 1900 as a reception sequence number (step 2404). If it is determined as being true in step 2402 and thus there is no data transmission and reception of which are in progress in the transmission buffer and the reception buffer, or if it is determined as being true in step 2403 and thus it is determined that transmission of the predicted command to the server side is in progress, ACK is returned using left_recv 1102 as a reception sequence number (step 2405).

By using the branch of step 2402, the communication device does not return ACK for the final data to the transmission side until ACK for the final data is received from the reception terminal, and thus mismatch between TCP communication state of the transmission side and TCP communication state of the reception side as described with reference to FIG. 41 does not occur even if failures occur in the communication device. In addition, by using the branch of step 2403, even if the prediction is deviated after the predicted command is transmitted to the server side, ACK for the final data is returned to the server, and thus stopping of a process of the server side as described with reference to FIG. 12 disappears.

Figure 22:
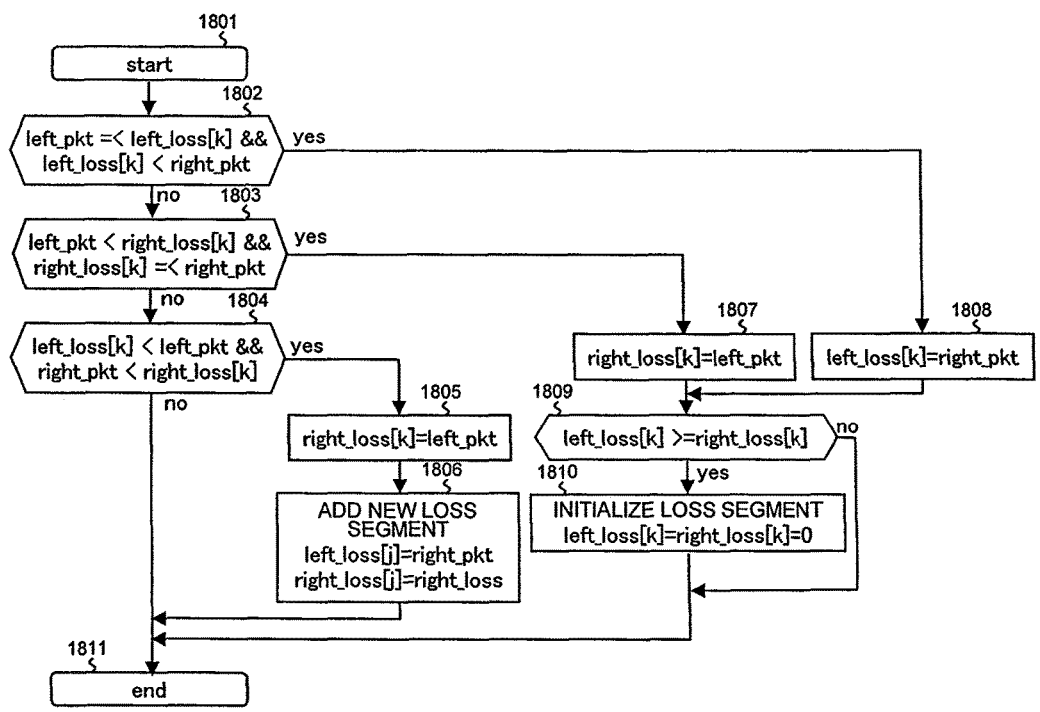
FIG. 22 is a flowchart diagram illustrating updating a lost segment.

FIG. 22 is a flowchart illustrating updating of a loss segment (step 1712).

After the process starts (step 1801), it is determined whether or not left_pkt is equal to or less than left_loss[k], and left_loss[k] is smaller than right_pkt (step 1802). If it is determined that left_pkt is not equal to or less than left_loss [k], and left_loss[k] is not smaller than right_pkt in step 1802, it is determined whether or not left_pkt is smaller than right_loss[k], and right_loss[k] is equal to or less than right_pkt (step 1803). Here, if it is determined that left_pkt is not smaller than right_loss[k], and right_loss[k] is not equal to or less than right_pkt, it is determined whether or not left_loss [k] is smaller than left_pkt, and right_pkt is smaller than right_loss[k] (step 1804). If it is determined that it is true in step 1804, left_pkt is assigned to right_loss[k] (step 1805), then, new loss segments left_loss[j] and right_loss[j] are created, a value of right_pkt is assigned to left_loss[k], and a value of right_loss[k] is assigned to right_loss[k] (1806).

If it is determined that it is true in step 1802, a value of right_pkt is assigned to left_loss[k] (step 1808). If it is determined that it is true in step 1803, a value of left_pkt is assigned to right_loss[k] (step 1807). When steps 1807 and 1808 are completed, it is determined whether or not left_loss [k] is equal to or more than right_loss[k] (step 1809). If it is determined that it is true in step 1809, the loss segments left_loss[k] and right_loss[k] are initialized and deleted (step 1810).

For example, by employing a communication device which arranges received data or retransmits transmitted data by using a standard TCP so as to perform communication between terminals and the communication device, and arranges received data or retransmits transmitted data by using an independent protocol (independent TCP) which does not depend on an RTT or a discarding rate so as to perform communication between communication devices, it is possible to prevent occurrence of a case where transmission is completed in a transmission terminal, and, on the other hand, reception is not completed in a reception terminal when final data is received from the transmission terminal, an ACK packet for acknowledgement is returned, and failures occur immediately thereafter.

(Supplementary Description of Movement of Pointer)

Hereinafter, a supplementary description of movement of the pointer will be made.

A description will now be made of how the pointer is moved when a communication device which returns an ACK packet in which a reception sequence number corresponding to a size of received data is described does not sequentially receive packets from before and thus a loss segment occurs. The description will be made that the communication device moves the pointer of the reception buffer used for TCP communication with a transmission terminal and moves the pointer of the transmission buffer used for TCP communication with a reception terminal.

When a packet with data in which a transmission sequence number is larger than right_recv 1103 is received from the transmission terminal, the communication device changes right_recv 1103 to a sum of the transmission sequence number of the received packet and a data length, and creates a new loss segment recording pointer in which left_loss[0] is set to left_recv 1102 and right_loss[0] is set to a transmission sequence number of the received packet. In addition, an ACK packet for partial acknowledgement (Selective ACK (SACK)) in which a reception sequence number is set to left_recv 1102 and values of right_loss[0] and right_recv 1103 are described in left_edge_1 (2919) and right_edge_1 (2920) of the TCP option header 2916 is sent to the transmission terminal. Successively, in addition, when a packet with data in which a transmission sequence number is larger than right_recv 1103 is received from the transmission terminal, the communication device creates a new loss segment recording pointer in which left_loss[1] is set to right_recv 1103 and right_loss[1] is set to a transmission sequence number of the received packet, and changes right_recv 1103 to a sum of the transmission sequence number of the received packet and a data length. In addition, an ACK packet with partial acknowledgement SACK in which a reception sequence number is set to left_recv 1102, and values of right_loss[0] and left_loss[1] are described in left_edge_1 (2919) and right_edge_1 (2920) of the TCP option header 2916, and values of right_loss[1] and right_recv 1103 are described in left_edge_2 (2921) and right_edge_2 (2922) of the TCP option header 2916 is sent to the transmission terminal. Next, when a retransmitted packet with data in which a transmission sequence number is the same as left_recv 1102, and a sum of the transmission sequence number and a data length is the same as right_loss [0] is received from the transmission terminal, the communication device moves left_recv 1102 to a location of left_loss[1], initializes and deletes the loss segment recording pointers left_loss[0] and right_loss[0], and sends an ACK packet for acknowledgement in which a reception sequence number is set to left_recv 1102 to the transmission terminal. If left_recv 1102 is larger than left_rbuf 1101, data written from left_rbuf 1101 to left_recv 1102 is moved to the transmission buffer using right_sbuf 1106 as a head, and left_rbuf 1101 and right_sbuf 1106 are moved to the right by the size of the moved data.

Next, a description will now be made of how the pointer is moved when a communication device which returns an ACK packet in which a reception sequence number corresponding to a size of received data is described receives ACK from the reception terminal. The description will be made that the communication device moves the pointer of the reception buffer used for TCP communication with a transmission terminal and moves the pointer of the transmission buffer used for TCP communication with a reception terminal.

An initial state is set to the time when the communication device has already sent an extent of amount of data to the reception terminal, thus right_sbuf 1106 is the same as right_send 1105, and right_send 1105 is larger than left_send 1104. When an ACK packet for acknowledgement in which a reception sequence number is larger than left_send 1104 and smaller than right_send 1105 is received from the reception terminal, the communication device changes a value of left_send 1104 to the reception sequence number described in the ACK packet. Further, when the communication device receives an overlapping ACK packet for partial acknowledgement (Selective ACK (SACK)) in which a reception sequence number is the same as a value of left_send 1104, the reception sequence number is the same as that of the ACK packet, a value which is larger than left_send 1104 and smaller than right_send 1105 is described in left_edge_1 (2919) of the TCP option header 2916, and a value of right_send 1105 is described in right_edge_1 (2920) of the TCP option header 2916, a new retransmitted segment recording pointer in which left_rts[0] is set to left_send 1104, and right_rts[0] is set to left_edge_1 (2919) is created. When the retransmitted segment is created, the communication device retransmits data from left_rts[0] to right_rts [0], and initializes and deletes the retransmitted segment recording pointer.

Embodiment 2

Figure 23:
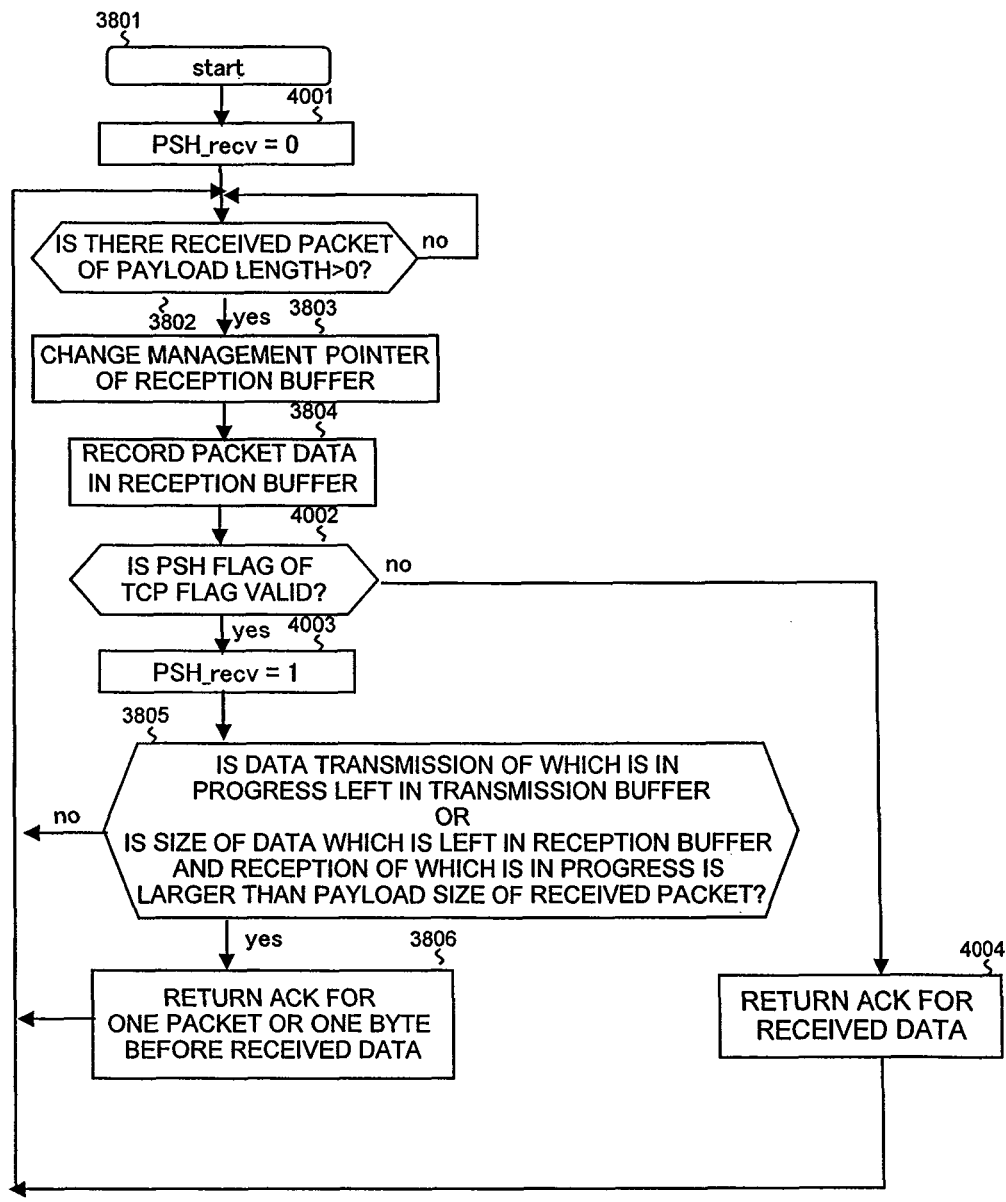
FIG. 23 is a flowchart diagram illustrating process procedures when the reception history update portion 3106 receives data with a payload.
Figure 24:
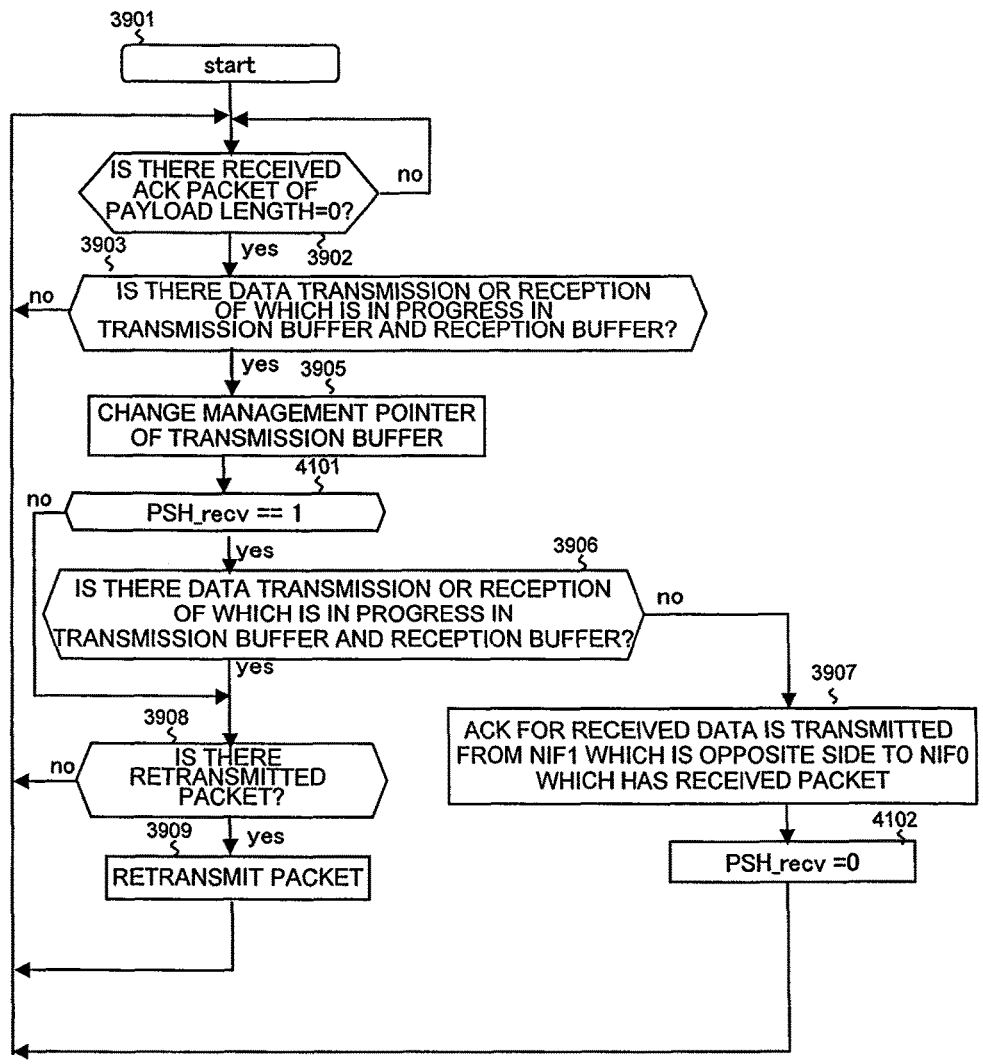
FIG. 24 is a flowchart diagram illustrating process procedures when the TX packet retransmission portion 3104 receives an ACK packet.
Figure 25:
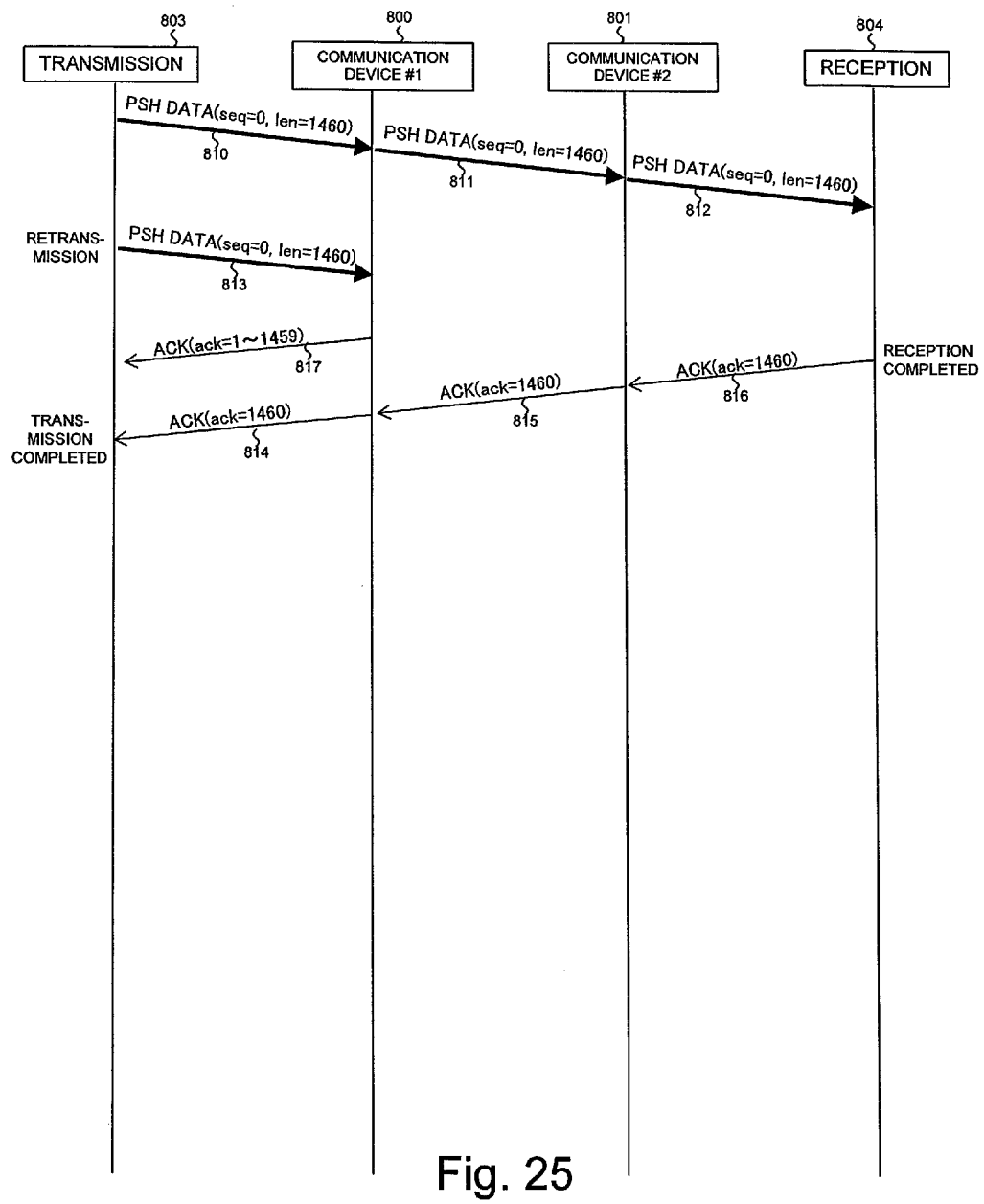
FIG. 25 is a sequence diagram illustrating that ACK is not returned when a communication device 800 receives a packet with a PSH flag.

With reference to FIGS. 23, 24 and 25, and with appropriate reference to the figures related to the above-described embodiment, a description will be made of an embodiment of a communication device 800 which determines whether or not data is final data depending on whether or not a PSH flag is set in a TCP flag of a packet, and returns ACK for one packet or one byte before received data until an ACK packet for the final data arrives from a reception terminal side.

In the present embodiment, the same configuration as that of the device having the block configuration of FIGS. 3 and 4 described in Embodiment 1 is employed. Several processes are added to the processes performed by the reception history update portion 3106 or the TX packet retransmission portion 3104 shown in FIG. 18 or 19, thereby implementing the communication device 800 of the present embodiment.

FIG. 23 is a flowchart diagram illustrating process procedures when the reception history update portion 3106 receives data with a payload. The same process as in FIG. 18 is given the same reference numerals, and description thereof will be omitted.

A new state variable PSH_recv for determining whether or not reception of PSH data is in progress is defined, and a process (step 4001) of assigning 0 to PSH_recv is inserted after step 3801 shown in FIG. 18. In addition, after step 3804, a process (step 4002) of determining whether or not a PSH flag is set in a TCP flag of a received packet is inserted. If it is determined as being true in step 4002, 1 is assigned to PSH_recv (step 4003), and the flow proceeds to step 3805. If it is determined that the PSH flag is not set in the TCP flag of the received packet in step 4002, ACK for the received data is returned in NIF0 in the same manner as in the related art (step 4004), and then the flow returns to step 3802. This process method validates the function of returning ACK, described in Embodiment 1, only when the PSH packet is received.

FIG. 24 is a flowchart diagram illustrating process procedures when the TX packet retransmission portion 3104 receives an ACK packet. The same process as in FIG. 19 is given the same reference numerals, and description thereof will be omitted.

After step 3905 shown in FIG. 19, a process (step 4101) of determining whether or not PSH_recv is 1 is added. If it is determined as being true in step 4101 (PSH_recv is 1), the flow returns to step 3906. If it is determined that it is false in step 4101, the flow skips step 3906 and proceeds to step 3908. In addition, after step 3907, a process (step 4102) of assigning 0 to PSH_recv is added. This process method validates the function of not returning final ACK until an ACK packet for final data arrives from the reception terminal side, described in Embodiment 1, only when a PSH packet is received.

FIG. 25 is a sequence diagram illustrating a case of performing a process in which the device 800 determines whether or not data is final data depending on whether or not a PSH flag is set in a TCP flag 2914 described in a packet by using the process methods of FIGS. 23 and 24, and does not return final ACK until an ACK packet for final data arrives from the reception terminal side only when reception of PSH data is in progress. When a packet 810 with a PSH flag is received from a transmission terminal 803, the communication device #1 (800) determines that the data is final data, and transmits the packet to a communication device #2 as it is without returning ACK (811). In the same manner, the communication device #2 (801) determines that the data is final data, and transmits the packet to a reception terminal (804) as it is without returning ACK (812). The communication device #1 (800) returns ACK in which a value which is 1 to 1459 smaller than the size of the received data is set in a reception sequence number even if a retransmitted packet (813) is received. When ACK packets (816 and 815) for final data in which the size of the received data is set in a reception sequence number are received from the reception terminal side, the communication device #2 (801) and the communication device #1 (800) transmit ACK packets (815 and 814) for the final data to the transmission terminal side.

By using the above-described method, it is possible to prevent state mismatch in which it is determined that reception is not completed in the reception terminal despite it being determined that transmission is completed in the transmission terminal.

Embodiment 3

With reference to FIGS. 26 to 36, and with reference to the figures related to the above-described embodiments, a description will be made of an embodiment in which two communication devices are installed between a transmission terminal and a reception terminal, and communication is performed between the communication devices, using an independent TCP disclosed in Patent Application 1 or further improved than that.

Figure 26:
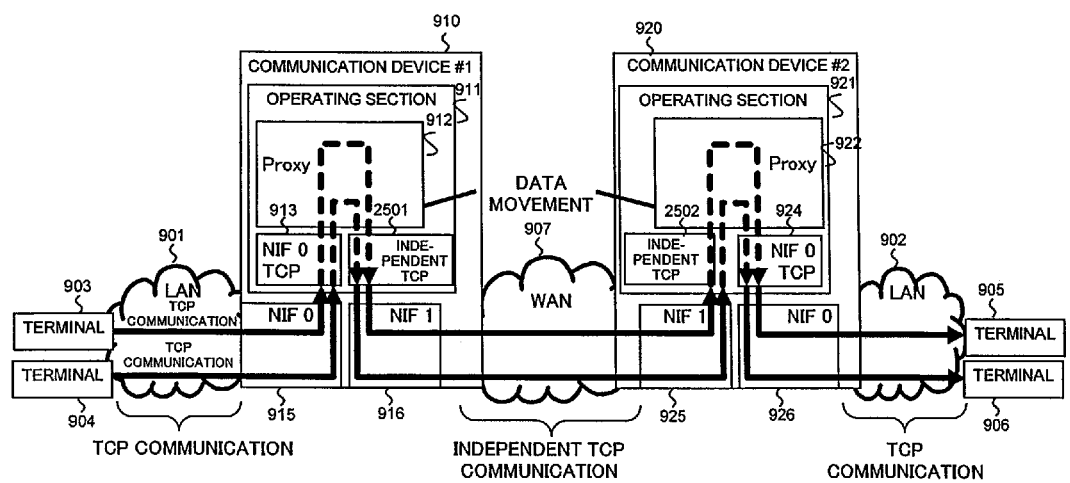
FIG. 26 is a diagram illustrating a system in which the communication devices 910 and 920 are installed in boundaries between the WAN and the LANs, and communication is performed between the communication devices using an independent TCP.

FIG. 26 is a diagram of a system in which FIG. 1 is a base and the TCP modules of the NIF1 side are changed to modules 2501 and 2502 performing the independent TCP process. In the present system, communication is performed using an independent TCP in a WAN 907.

Communication devices 910 and 920 (for example, communication devices) can be mounted by the same block diagram as the block diagram shown in FIG. 3, and the NIF TCP 1008 is changed to independent TCP modules 2501 and 2502.

The communication device of the reception terminal side notifies the communication device of the transmission terminal side of all of discarded locations in detail in a feedback manner, and the communication device of the transmission terminal side retransmits the discarded locations the notification of which is sent from the communication device of the reception terminal side in a feedback manner, and controls a sum total of a data transmission bandwidth and a data retransmission bandwidth for a specific destination based on a retransmission bandwidth or a discarding bandwidth (also referred to as retransmission/discarding bandwidth in some cases) after a reference time point and a transmission bandwidth before the reference time point, thereby securing a communication bandwidth which is not dependent on an RTT or a discarding rate.

FIGS. 27 to 30 are diagrams illustrating three features of the independent TCP. In addition, the independent TCP is also referred to as an RTT And Discard Independent Congestion Control (Radic)-TCP.

Figure 27:
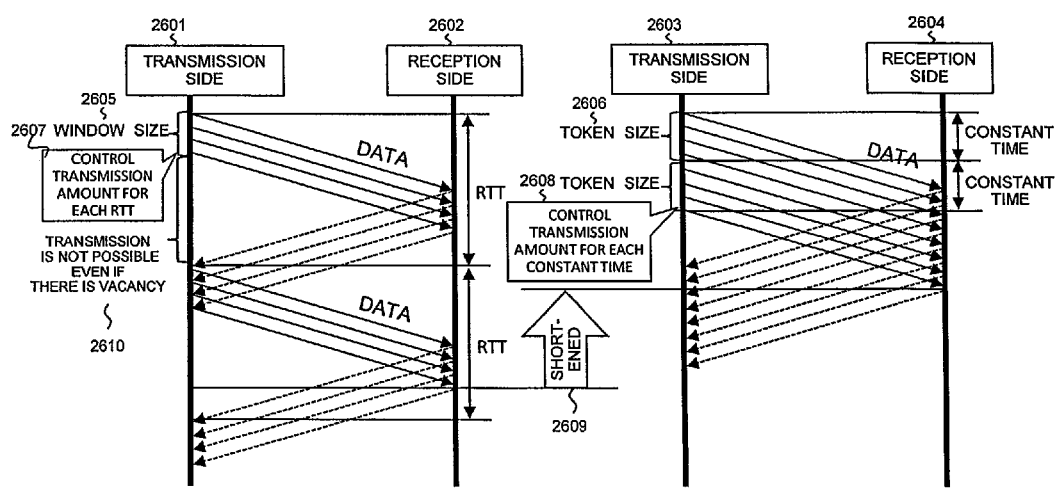
FIG. 27 is a diagram illustrating a bandwidth control method.

FIG. 27 shows a bandwidth control method of a TCP in the related art on the left side as an example of the standard TCP, and a bandwidth control method of the independent TCP disclosed in Patent Application 1 on the right side. In the TCP in the related art, a transmission terminal 2601 controls a window size 2605 in which a transmission amount is set for each RTT (2607) and thereby controls a transmission bandwidth. The transmission bandwidth is expressed by window size/RTT. The bandwidth control using this method has a problem in that, if the RTT increases, time 2610 when transmission is not possible increases even if a line is vacant, and thus a use rate of a line bandwidth is reduced. On the other hand, in the independent TCP, a token size 2606 in which a transmission amount for each specific time is defined is controlled (2608), thereby controlling a transmission bandwidth. The transmission bandwidth is expressed by token size/interval time. Since it is possible to remove time when transmission is not possible even if a line is vacant by using the independent TCP, a use rate of a line bandwidth increases (2609). It is possible to realize bandwidth control which does not depend on an RTT.

Figure 28:
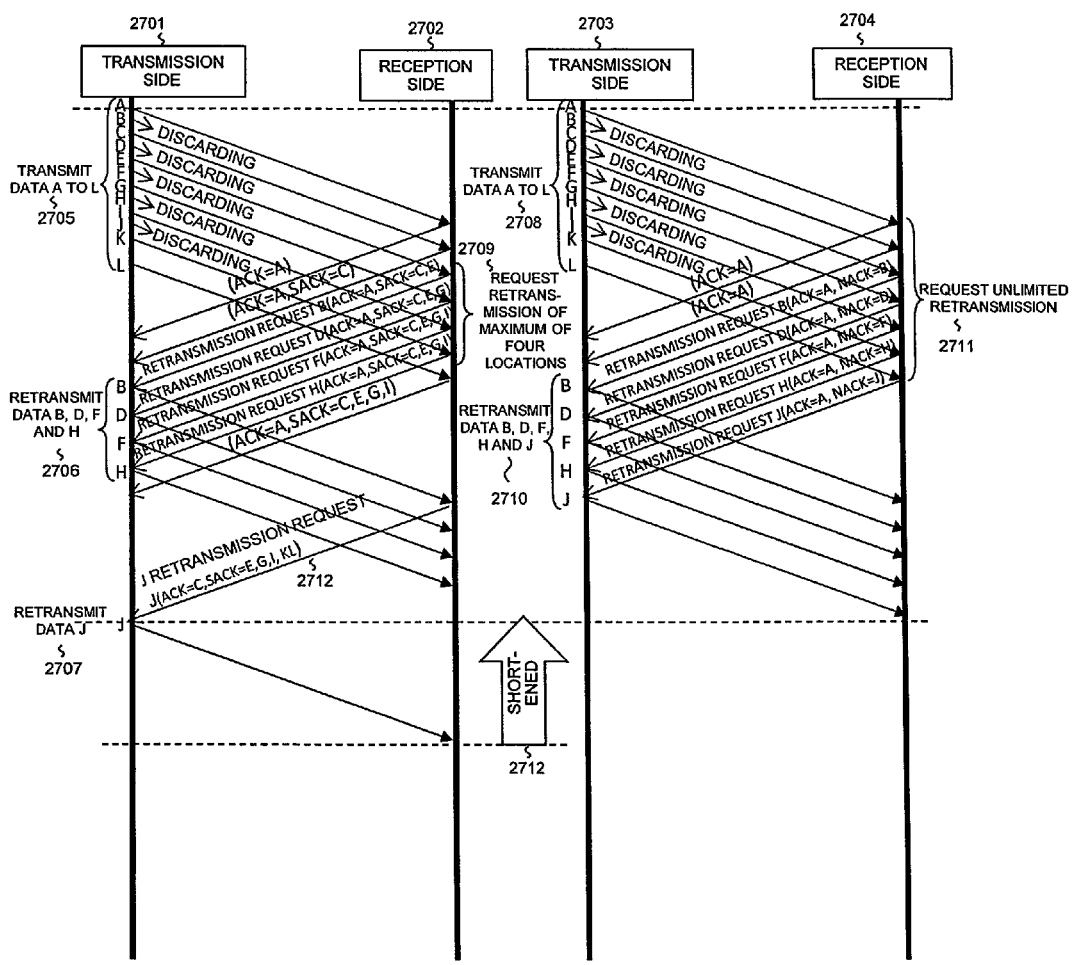
FIG. 28 is a diagram illustrating a retransmission control method.

FIG. 28 shows a retransmission control method of a TCP in the related art on the left side and a retransmission control method of the independent TCP on the right side. In the TCP in the related art, which location is partially received is described in left_edge_1 to 4 (2919, 2921, 2923, and 2925) and right_edge_1 to 4 (2920, 2922, 2924, and 2926) of the TCP option header 2916 of an ACK packet up to four locations, and is used for partial acknowledgement (Selective ACK (SACK)). On the other hand, in the independent TCP, which location is intended to be partially retransmitted is described in left_edge_1 to 4 (2919, 2921, 2923, and 2925) and right_edge_1 to 4 (2920, 2922, 2924, and 2926) of the TCP option header 2916 up to four locations, and is used for partial non-acknowledgement (Negative ACK (NACK)).

In the TCP in the related art, if, among twelve data packets A to L (2705) which are sent from the transmission terminal 2701 to the reception terminal 2702, the packets B, D, F, H, and J are discarded in the middle, reception-completed locations which can be described in the TCP option header 2916 are limited to a maximum of four locations, and thus acknowledgements for the packets sent after I cannot be transmitted to the transmission terminal 2701 at this time (2709). The transmission terminal retransmits the discarded packets B, D, F and H among the packets A to I, by using acknowledgement packets (2709) in which partial acknowledgements of A to I are described (2706). After receiving the retransmitted packets (2706), the transmission terminal 2702 returns acknowledgements in which partial acknowledgements after the packet I are described (2712). After receiving the acknowledgements (2712) in which the partial acknowledgements after the packet I are described, the transmission terminal 2701 can retransmit the packet J discarded after the packet I (2707). On the other hand, in the independent TCP, even if, among twelve data packets A to L (2708) which are sent from the transmission terminal 2703 to the reception terminal 2704, B, D, F, H, and J are discarded in the middle, locations from A to J which are intended to be retransmitted are written in detail in left_edge_1 (2919) and right_edge_1 (2920) of the TCP option header 2916, and then an ACK packet for partial non-acknowledgement (NACK) is returned (2711). Each retransmission request location is written in only a single NACK packet. When the ACK packet (2711) for the partial non-acknowledgement (NACK) is received, the transmission terminal 2703 retransmits the retransmission request locations B, D, F, H and J described in the TCP option header 2916 (2710). Since retransmission is completed at one time even when a lot of losses occur, a communication time is shortened (2712), and thus a bandwidth is improved. In other words, two communication relay devices (communication devices) are installed between the transmission terminal and the reception terminal, and the communication device of the reception terminal side notifies the communication device of the transmission terminal side of all of discarded locations in detail in a feedback manner. For example, the communication device of the transmission terminal side retransmits the discarded locations the notification of which is sent from the communication device of the reception terminal side in a feedback manner, and increases and decreases a sum total of a data transmission bandwidth and a data retransmission bandwidth for a specific destination based on a retransmission bandwidth or a discarding bandwidth after a reference time point and a transmission bandwidth before the reference time point. Thereby, it is possible to realize communication which is not dependent on a discarding rate.

Figure 29:
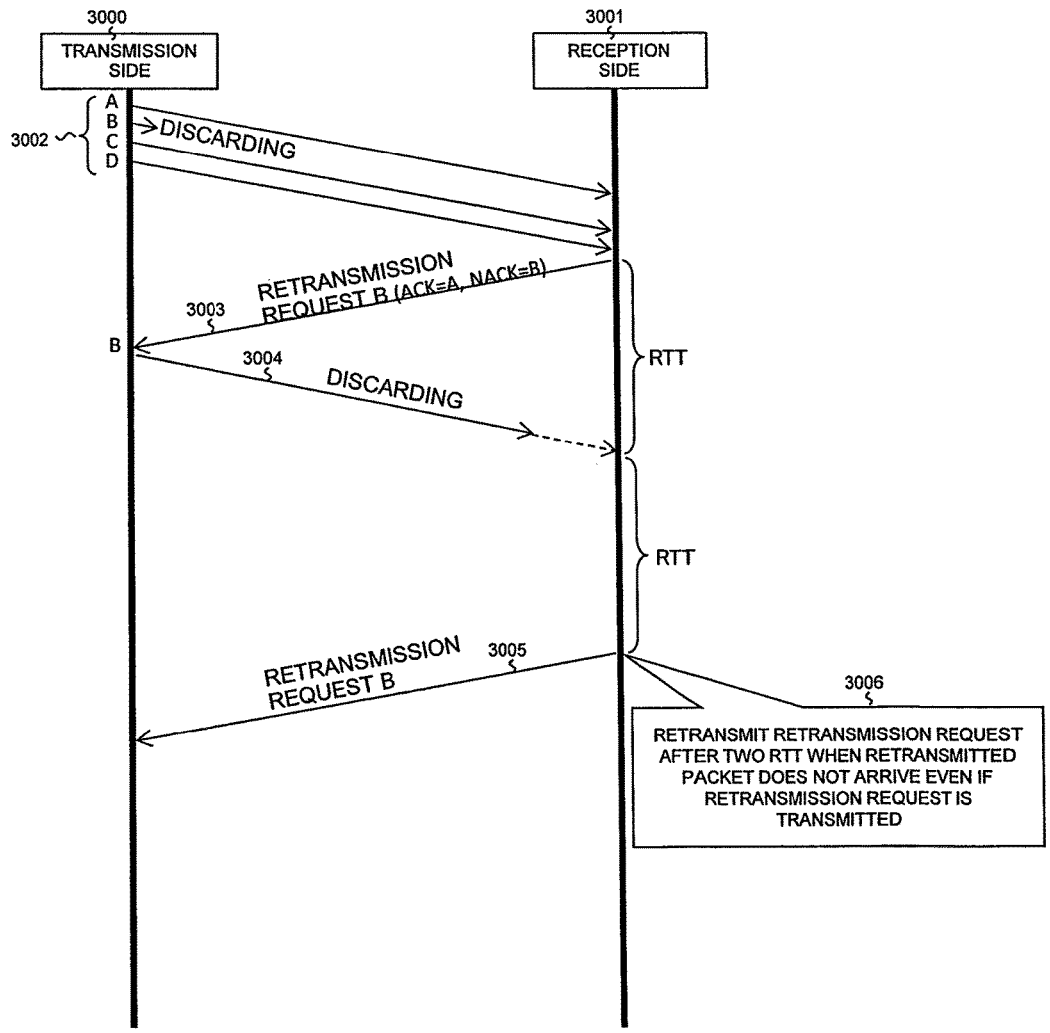
FIG. 29 is a diagram illustrating a method of retransmitting a partial non-acknowledgement NACK packet.

In addition, as shown in FIG. 29, there is a case where a packet which is retransmitted according to an ACK packet for partial non-acknowledgement (NACK) is discarded. It is assumed that packets A to D are transmitted from a transmission terminal 3000 (3002), the packet B is discarded, and the packet B (3004) retransmitted according to an ACK packet (3003) for partial non-acknowledgement (NACK) in which the packet B is described in left_edge_1 (2919) and right_edge_1 (2920) of the TCP option header 2916 is discarded again. In this case, if the retransmitted packet B (3004) does not arrive, for example, even after waiting for two RTTs, a reception terminal 3001 transmits an ACK packet (3005) for partial non-acknowledgement (NACK) for requesting retransmission of the packet B again (3006). This retransmission method is realized by recording the ACK returning time acked_time 1901 shown in FIG. 7 in correlation with the reception buffer management pointer left/right_loss 1107. When a difference between the ACK returning time acked_time 1901 and a current time point exceeds two RTTs, an ACK packet for partial non-acknowledgement (NACK) for requesting retransmission of the discarded location left/right_loss 1107 which is exceeded is retransmitted.

Figure 30:
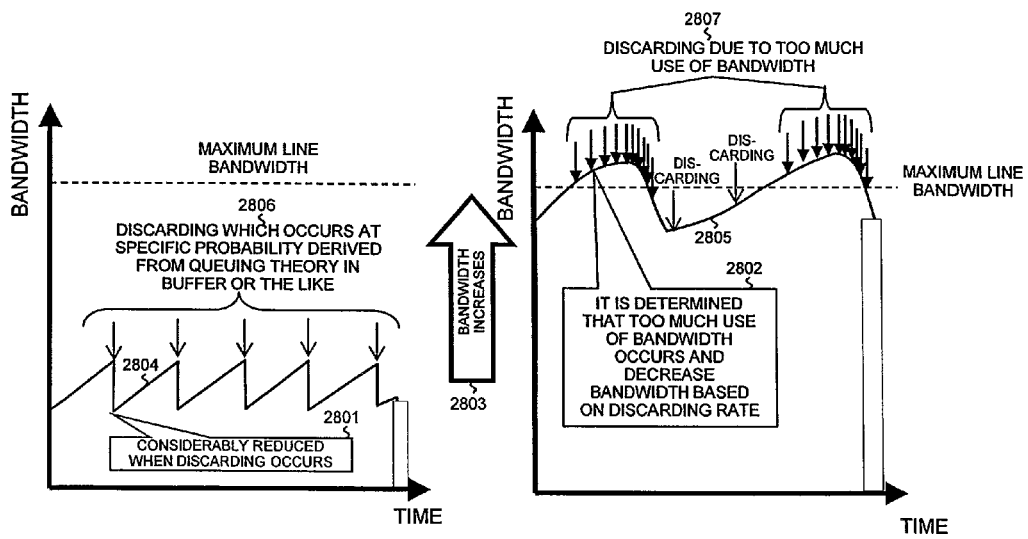
FIG. 30 is a diagram illustrating a congestion control method.

FIG. 30 shows a congestion control method in the related art on the left side and a congestion control method of the independent TCP on the right side. In the TCP in the related art, even if packet discarding occurs only once, a control bandwidth is considerably reduced (2801). In a communication line, discarding occurs at a constant probability derived from a queuing theory in a buffer or the like, even if a line use rate does not reach 100% (2806). For this reason, in the TCP in the related art, there are cases where a bandwidth is reduced (2804) before a line use rate reaches 100%, and thus 100% of a line bandwidth cannot be entirely used. On the other hand, in the independent TCP, if a discarding/retransmission rate transitions constantly, it is determined that discarding merely occurs at a constant probability derived from the queuing theory, and a bandwidth increases. If the discarding/retransmission rate starts to increase, for example, it is determined that too much use of the line bandwidth occurs, and a control bandwidth is reduced so as to be smaller than a control bandwidth one RTT before on the basis of the most recent discarding/retransmission bandwidth and a control bandwidth one RTT therebefore. Since the control bandwidth is controlled so as to increase and decrease around the line bandwidth, the line bandwidth can be entirely used closely to 100%.

In addition, here, the transmission bandwidth indicates an input bandwidth observed for each shaper in a distribution portion 3208 which distributes packets to the shapers 3209. Further, the control bandwidth indicates a practical output bandwidth from the shapers 3209.

Figure 31:
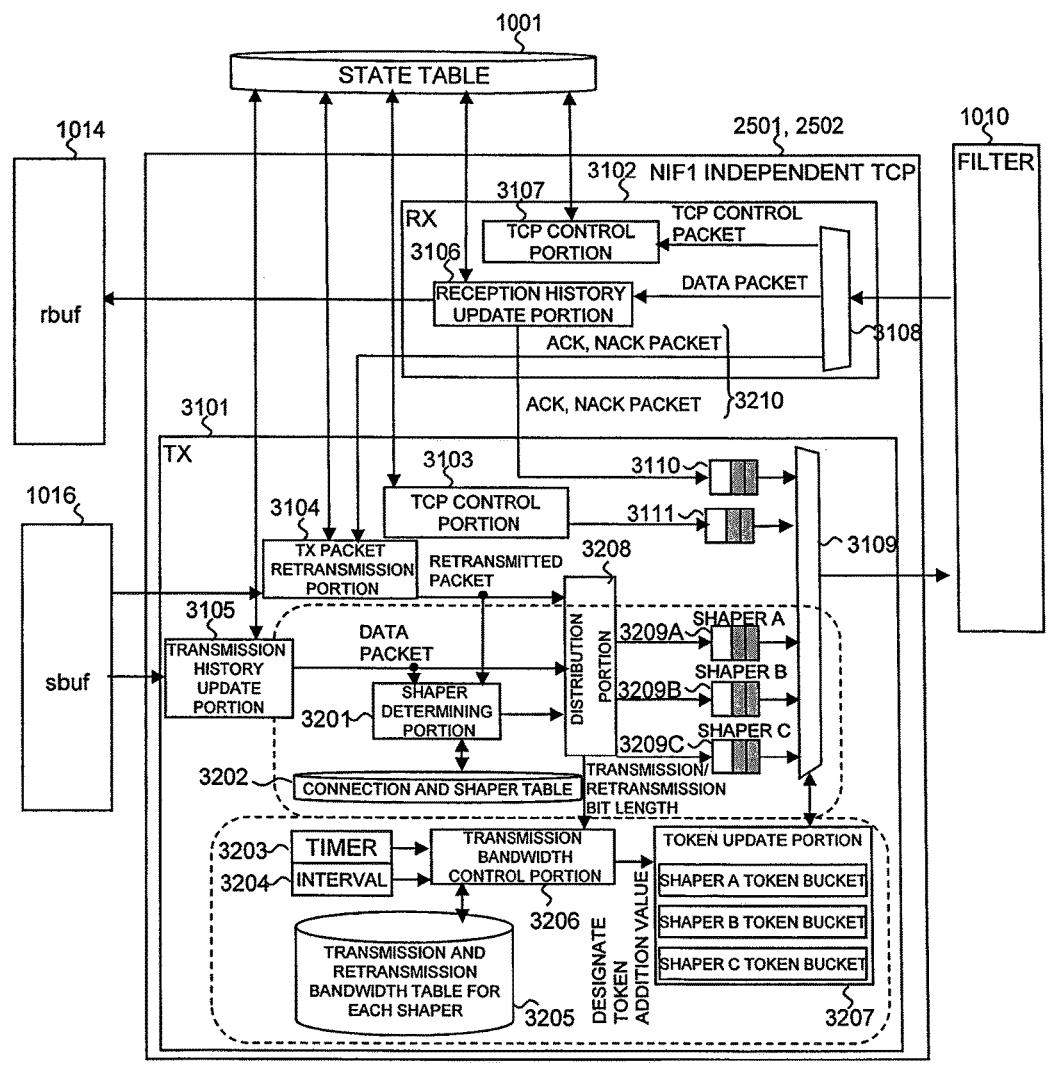
FIG. 31 is a block diagram of an independent TCP unit 1008 in the communication device.

FIG. 31 is a block diagram for realizing the independent TCP mounted in the TCP modules 2501 and 2502 blocks of the NIF1 side. A block diagram for realizing the standard TCP mounted in the TCP module 1007 block of the NIF0 side may use the same block diagram as shown in FIG. 4.

First, when the TCP block 1007 (913/924) realizing the standard TCP is described, as shown in FIG. 4, the TCP block 1007 includes an RX unit 3102 which performs a reception process and a TX unit 3101 which performs a transmission process. The RX unit 3102 includes a packet analysis portion 3108 which divides a received packet into a TCP control packet, a packet with data, and an ACK packet/an SACK packet for partial acknowledgement, a TCP control portion 3107 which changes the TCP state 1003 of the state table 1001 on the basis of a received TCP control packet, and a reception history update portion 3106 which changes the buffer management pointer 1005 of the state table 1001 and returns an ACK packet or an ACK packet with partial acknowledgement SACK on the basis of the transmission sequence number SEQ 2912 and the reception sequence number ACK 2913 of a received data packet. A change of the buffer management pointer 1005 by the reception history update portion 3106 employs the method described in Embodiment 1.

The TX unit 3101 includes a TCP control portion 3103 which transmits a TCP control packet by using the TCP state 1004 of the state table 1001, a TX packet retransmission portion 3104 which changes the buffer management pointer 1005 of the state table 1001 on the basis of a received ACK packet, reads data from the transmission buffer 1015 by using the received ACK packet with partial acknowledgement SACK, and retransmits a packet, the transmission history update portion 3105 which transmits a packet of data read from the transmission buffer 1015 and changes the buffer management pointer 1005 of the state table 1001, and a multiplexer 3109 and buffers 3110 to 3113 which aggregate and output an ACK/SACK packet a TCP control packet, a retransmitted packet, and a data packet in a FIFO manner.

The TCP blocks 2501 and 2502 realizing the independent TCP are realized by changing outputs from some blocks of the RX unit 3102 and adding some blocks to inside of the TX unit 3101 on the basis of the TCP block 1007 realizing the standard TCP, as shown in FIG. 31. First, the packet analysis portion 3108 changes an ACK packet/a SACK packet for partial acknowledgement to an ACK packet/ACK packet for partial non-acknowledgement (NACK) 3210 which are output to the TX packet retransmission portion 3104. Similarly, an ACK packet/a SACK packet for partial acknowledgement of the reception history update portion 3106 are changed to an ACK packet/ACK packet for partial non-acknowledgement (NACK) 3210 which are output to the buffer 3110. The ACK and SACK packets are changed to ACK and NACK packets, the changed packets are sent, and thereby the TX unit 3101 can immediately retransmit a discarded location.

The TX unit 3101 includes, unlike in FIG. 4, a shaper determining portion 3201 which determines to which shaper a packet is assigned using header information of a transmitted packet and a retransmitted packet, a connection and shaper table 3202 which defines a destination shaper for each connection information piece, a distribution portion 3208 which assigns a packet on the basis of a determination result of the shaper determining portion 3201, and shapers A to C (3209). With the configuration, it is possible to perform bandwidth control based on RTT-independent token.

In addition, the TX unit 3101 additionally includes a timer 3203 which outputs a current time point, an interval storage portion 3204 which defines an interval time, a transmission bandwidth control portion 3206 which controls a transmission bandwidth for each shaper, a transmission and retransmission bandwidth table 3205 for each shaper in which statistical information of a transmission bandwidth or a retransmission bandwidth for each shaper is recorded, and a token update portion 3207 which controls an allowable transmission amount per interval time.

When a control bandwidth described in the transmission and retransmission bandwidth table 3205 for each shaper is changed, the transmission bandwidth control portion 3206 notifies the token update portion 3207 of the new changed control bandwidth. The token update portion 3207 determines whether or not a packet can be transmitted from each shaper 3209 by using a token bucket algorithm, and instructs the aggregation portion 3109 such that a packet is transmitted from the shaper 3209 determined as being capable of transmitting the packet. With this configuration, it is possible to perform congestion control based on a retransmission ratio.

In the token bucket algorithm, when a predefined token is accumulated in a token bucket per unit time and reaches a transmitted packet length, the packet is allowed to be transmitted. Further, a token of the same size as the transmitted packet length is reduced from the token bucket at the same time as the transmission of the packet. The token update portion 3207 determines a value of the token added to the token bucket on the basis of a control bandwidth the transmission bandwidth control portion 3206 of which notifies.

Through the above-described control by the transmission bandwidth control portion 3206, it is possible to realize a bandwidth control based on the token size of FIG. 27.

FIG. 32 shows a format of the connection and shaper table 3202 for defining a shaper used for each TCP connection. In the connection and shaper table 3202, identification information of a corresponding shaper is described for each connection information piece including a transmission source IP/subnet, a destination IP/subnet, a transmission source port number, and a destination port number. The shaper determining portion 3201 finds an entry of the connection and shaper table 3202 having the connection information which conforms to the IP addresses 2907 and 2908 described in the IP header of a received packet and the port numbers 2910 and 2911 described in the TCP header, and instructs the distribution portion 3208 such that the packet is output to the shaper described in the entry.

Figure 33:
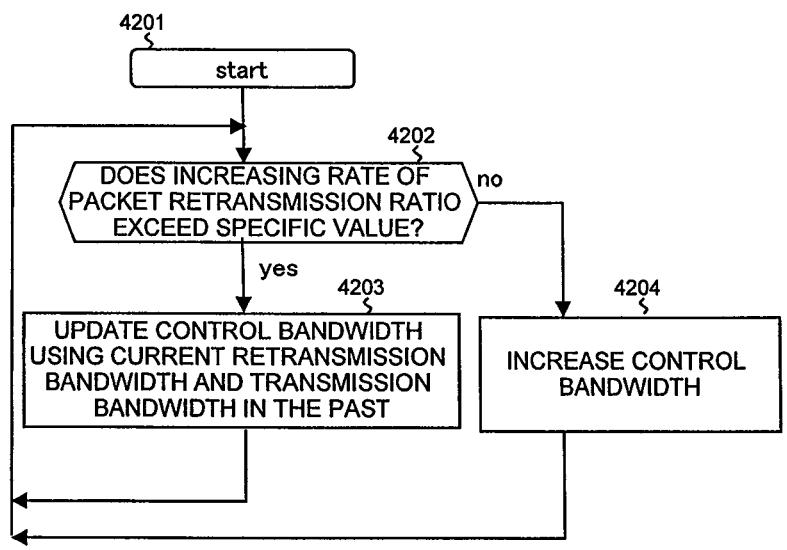
FIG. 33 is a conceptual flowchart illustrating that a transmission bandwidth control portion 3206 updates a control bandwidth.

FIG. 33 is a conceptual flowchart illustrating that the transmission bandwidth control portion 3206 updates a control bandwidth.

When the process starts (step 4201), the transmission bandwidth control portion 3206 (also the same for the following) determines whether or not an increasing rate of a packet retransmission ratio (=retransmission bandwidth/control bandwidth) exceeds a specific value (step 4202). If the increasing rate exceeds the specific value, a control bandwidth is updated using a current retransmission bandwidth and an old control bandwidth (step 4203). If the increasing rate does not exceed the specific value, the control bandwidth increases (step 4204).

FIG. 34 shows a format of the transmission and retransmission bandwidth table 3205 for each shaper. The transmission and retransmission bandwidth table 3205 for each shaper records a transmission bandwidth and a control bandwidth before an old reference time point, a transmission bandwidth, a retransmission bandwidth, and a control bandwidth before a reference time point, a reference time point, and, a transmission bit integrated value, a retransmission bit integrated value, and a control bandwidth after a reference time point. For example, the distribution portion 3208 which distributes a packet to the shaper may notify the transmission bandwidth control portion 3206 of a transmission bit number and a retransmission bit number, and the transmission bandwidth control portion 3206 may write the transmission bit integrated value and the retransmission bit integrated value in the transmission and retransmission bandwidth table 3205 for each shaper.

Figure 35:
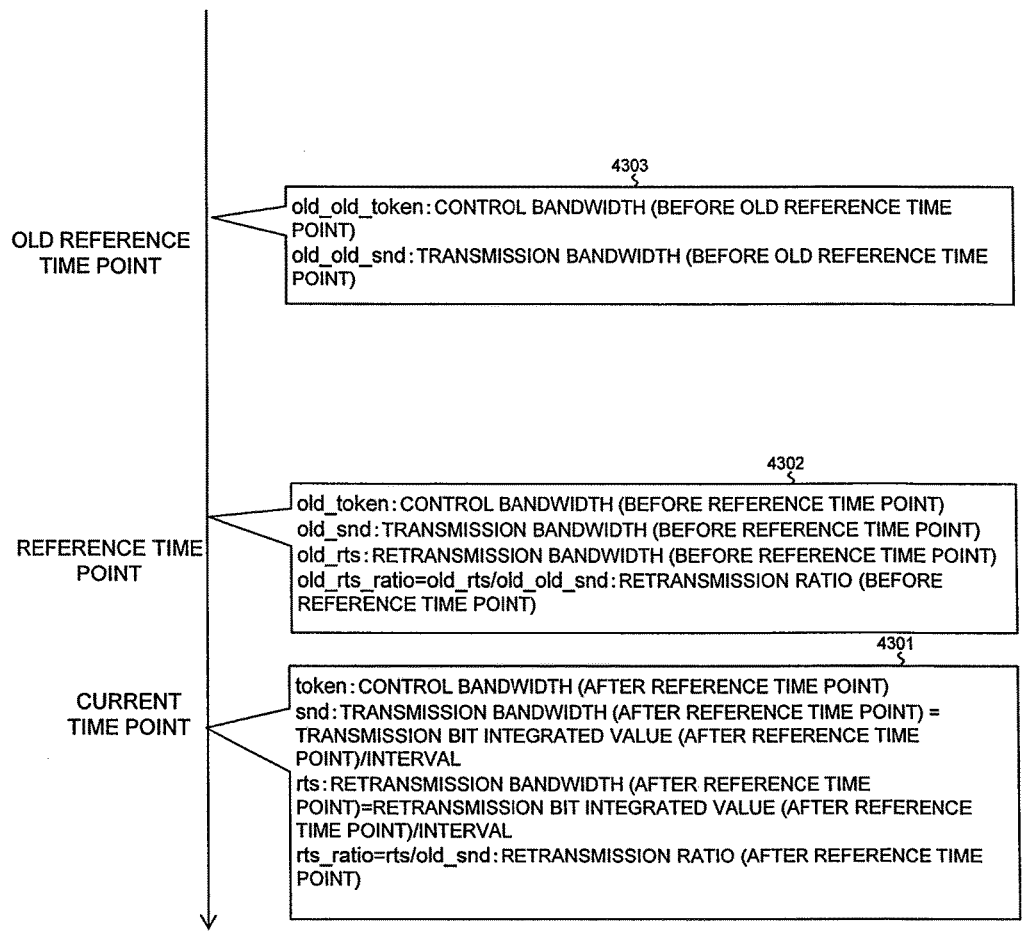
FIG. 35 is a conceptual diagram illustrating meanings of values held by a transmission and retransmission bandwidth table 3205 for each shaper.

FIG. 35 is a conceptual diagram illustrating meanings of values held by the transmission and retransmission bandwidth table 3205 for each shaper. The passage of time is shown from the top to the bottom. As indicated by the reference numeral 4301 of FIG. 35, a control bandwidth after a reference time point indicates a control bandwidth (indicated by token in the present embodiment) at a current time point. A transmission bandwidth after the reference time point indicates a transmission bandwidth at the current time point (indicated by snd in the present embodiment), and is obtained by dividing the transmission bit integrated value after the reference time point by an interval. A retransmission bandwidth after the reference time point indicates a retransmission bandwidth (indicated by rts in the present embodiment) at the current time point, and is obtained by dividing the retransmission bit integrated value after the reference time point by an interval. As indicated by the reference numeral 4302 of FIG. 35, a control bandwidth, a transmission bandwidth, and a retransmission bandwidth before the reference time point indicate a control bandwidth, a transmission bandwidth, and a retransmission bandwidth (indicated by old_token, old_snd, and old_rts in the present embodiment) until right before the reference time point (from the current reference time point until before an interval time). In addition, as indicated by the reference numeral 4303 of FIG. 35, a reference time point which is used one step before the reference time point which is currently being used is referred to as an old reference time point, and, a control bandwidth, a transmission bandwidth, and a retransmission bandwidth before the old reference time point indicate a control bandwidth, a transmission bandwidth, and a retransmission bandwidth (indicated by old_old_token, old_old_snd, and old_old_rts in the present embodiment) until right before the old reference time point (from the old reference time point until before a further interval time; and, two interval times before the current reference time point). As indicated by the reference numeral 4302 of FIG. 35, the retransmission ratio old_rts_ratio before the reference time point is obtained by old_rts/old_old_snd. In addition, as indicated by the reference numeral 4301 of FIG. 35, the current retransmission ratio rts_ratio after the reference time point is obtained by its/old_snd on the basis of the current retransmission bandwidth its and the transmission bandwidth before the reference time point.

Figure 36:
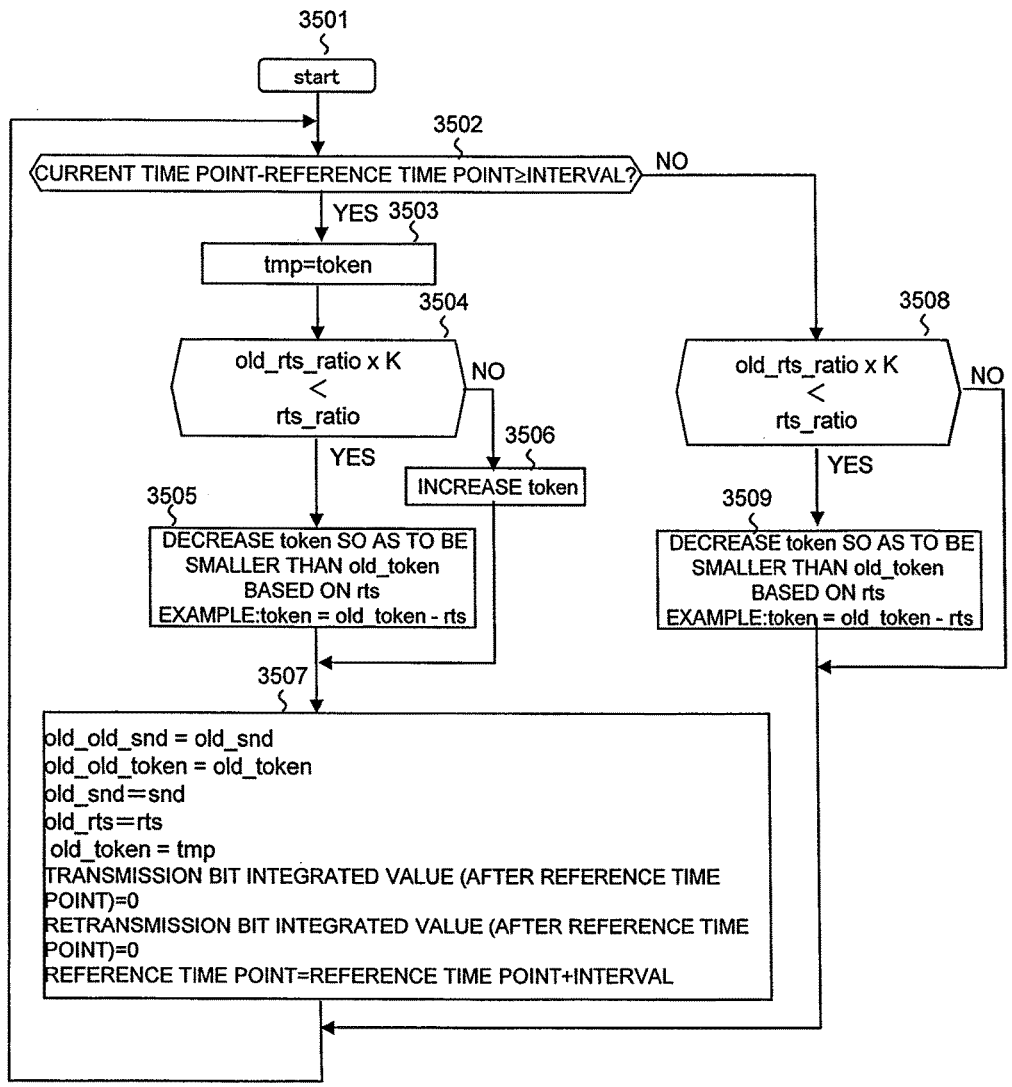
FIG. 36 is a flowchart diagram illustrating updating a control bandwidth.

FIG. 36 is a flowchart diagram illustrating that the transmission bandwidth control portion 3206 changes a control bandwidth by using the values described in the transmission and retransmission bandwidth table 3205 for each shaper.

When the process starts (step 3501), the transmission bandwidth control portion 3206 (also the same for the following) first determines whether or not a difference between a current time point output by the timer 3203 and a reference time point described in the transmission and retransmission bandwidth table 3205 is equal to or more than an interval 3204 (step 3502). As the interval time, a measured RTT or the like may be used. If it is determined to be true in step 3502, a value of the control bandwidth (after the reference time point) token is set to tmp (step 3503). In addition, for example, it is determined whether or not a retransmission ratio (after the reference time point) rts_ratio obtained by retransmission bit integrated value (after the reference time point)/interval/transmission bandwidth (before the reference time point) is larger than K (where K is a predefined coefficient equal to or more than 1) times of an old retransmission ratio (before the reference time point) old_rts_ratio obtained by retransmission bandwidth (before the reference time point)/transmission bandwidth (before the old reference time point) (step 3504). If it is determined that the retransmission ratio is larger than K times of the old retransmission ratio, it is determined that the retransmission ratio increases, and a value of the control bandwidth (after the reference time point) token is reduced using the retransmission bandwidth rts, so as to be smaller than a value of the control bandwidth (before the reference time point) old_token. For example, the control bandwidth (after the reference time point) token is set to the control bandwidth (before the reference time point) old_token—the retransmission bandwidth (after the reference time point) rts (step 3505). If it is determined that it is false in step 3504, the control bandwidth (after the reference time point) token increases (step 3506). When step 3505 and step 3506 are completed, the transmission bandwidth (before the reference time point) old_snd is updated to the transmission bandwidth (after the reference time point) snd, the retransmission bandwidth (before the reference time point) old_rts is updated to the retransmission bandwidth (after the reference time point) rts, the reference time point is updated to the reference time point+an interval, the transmission bit integrated value (after the reference time point) is set to 0, the retransmission bit integrated value (after the reference time point) is set to 0, the control bandwidth (before the old reference time point) old_old_token is updated to the control bandwidth (before the reference time point) old_token, the transmission bandwidth (before the old reference time point) old_old_snd is updated to the transmission bandwidth (before the reference time point) old_snd, and the control bandwidth (before the reference time point) old_token is set to tmp. The respective values are stored in the transmission and retransmission bandwidth table 3205 (step 3507).

On the other hand, if it is determined to be false in step 3502, in the same manner as in step 3504, it is determined whether or not a retransmission ratio (after the reference time point) rts_ratio obtained by retransmission bit integrated value (after the reference time point)/interval/transmission bandwidth (before the reference time point) is larger than K (where K is a predefined coefficient equal to or more than 1) times of an old retransmission ratio (before the reference time point) old_rts_ratio obtained by retransmission bandwidth (before the reference time point)/transmission bandwidth (before the old reference time point) (step 3508). If the retransmission ratio is larger than K times of the old retransmission ratio, it is determined for example that the retransmission ratio increases, and, in the same manner as in step 3505, a value of the control bandwidth (after the reference time point) token is reduced using the retransmission bandwidth rts, so as to be smaller than a value of the control bandwidth (before the reference time point) old_token. For example, the control bandwidth (after the reference time point) token is set to the control bandwidth (before the reference time point) old_token—the retransmission bandwidth (after the reference time point) rts (step 3509).

By using the method in which the transmission bandwidth control portion 3206 updates a control bandwidth, it is possible to reduce a control bandwidth so as to be smaller than a control bandwidth one RTT before on the basis of the most recent discarding/retransmission bandwidth shown in FIG. 30 and a control bandwidth one RTT therebefore. Since the control bandwidth is updated so as to increase or decrease around a line bandwidth, the line bandwidth can be entirely used closely to 100%.

By using the above-described means, it is possible to realize communication which is not dependent on an RTT or a discarding rate even between terminals which can perform only the standard TCP communication.

Embodiment 4

Mainly based on FIGS. 37 to 40, with appropriate reference to the figures related to the above-described embodiments, a description will be made of an embodiment in which two communication devices are installed between terminals, TCP communication between the terminals is divided into three TCP communications including TCP communication between the terminal and the communication device, TCP communication between the communication devices, and TCP communication between the communication device and the terminal, and the ACK returning method disclosed in Embodiment 1 is employed while using a standard TCP in the TCP communication between the terminal and the communication device and using an independent TCP disclosed in Patent Application 1 or a further improved than that in the TCP communication between the communication devices, of the two TCP communications relayed by each communication device. In the two TCP communications relayed by each communication device, retransmission of transmitted data and arrangement of received data are independently performed.

In the present embodiment, the system shown in FIG. 26 and the communication device (for example, a communication device) having the blocks shown in FIG. 3 are used, and, in a TCP module of the communication device, a terminal side uses the standard TCP module having the blocks shown in FIG. 4, and an opposite communication device side uses the independent TCP module having the blocks shown in FIG. 31 (refer to FIG. 26). In addition, the reception history update portion 3106 performs updating of a buffer management pointer and returning of an ACK packet by using the methods described with reference to FIGS. 22, 14 to 21, and 18 and 19 in Embodiment 1.

Figure 37:
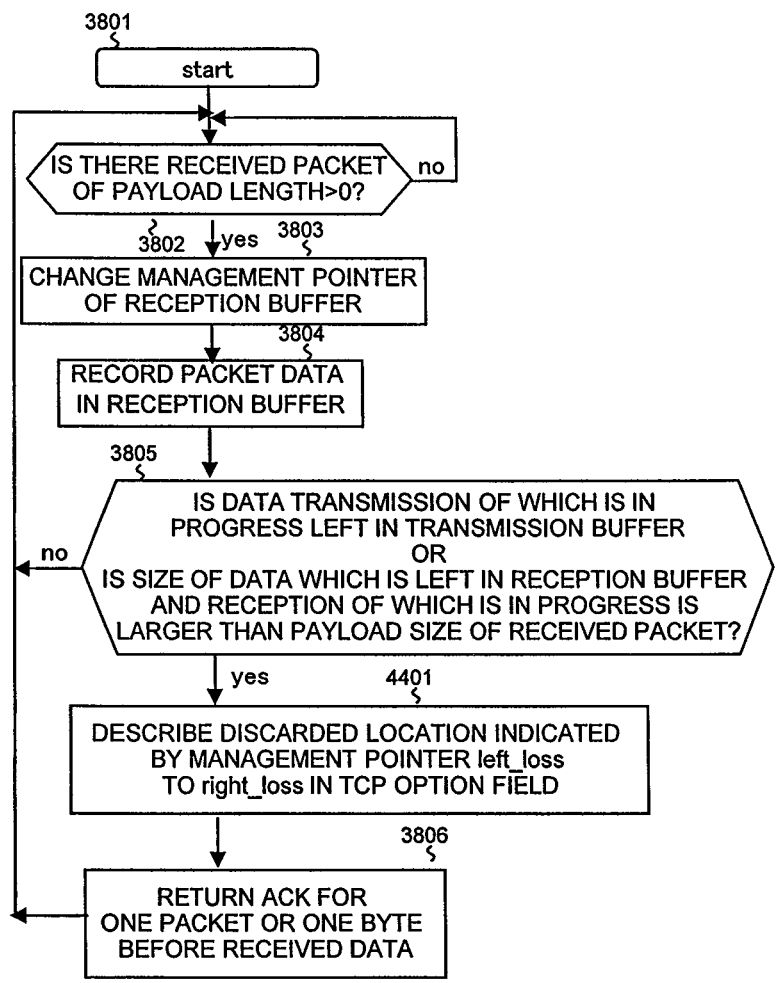
FIG. 37 is a flowchart illustrating a process performed by the reception history update portion 3106 of the NIF0 TCP module 1007 in Embodiment 4.

In addition, as shown in FIG. 37, returning of an ACK packet for partial non-acknowledgement (Negative ACK (NACK)) in which a discarded location is described is realized by adding a process (step 4401) of describing the discarded location indicated by the management pointer right/left_loss 1107 in right/left_edge_1 to 4 (2919 to 2926) of the TCP option field before the process (step 3806) of returning ACK, to the process shown in the flowchart diagram of FIG. 18. The other steps are the same as those of FIG. 18 and are given the same reference numerals, and description thereof will be omitted.

Figure 38:
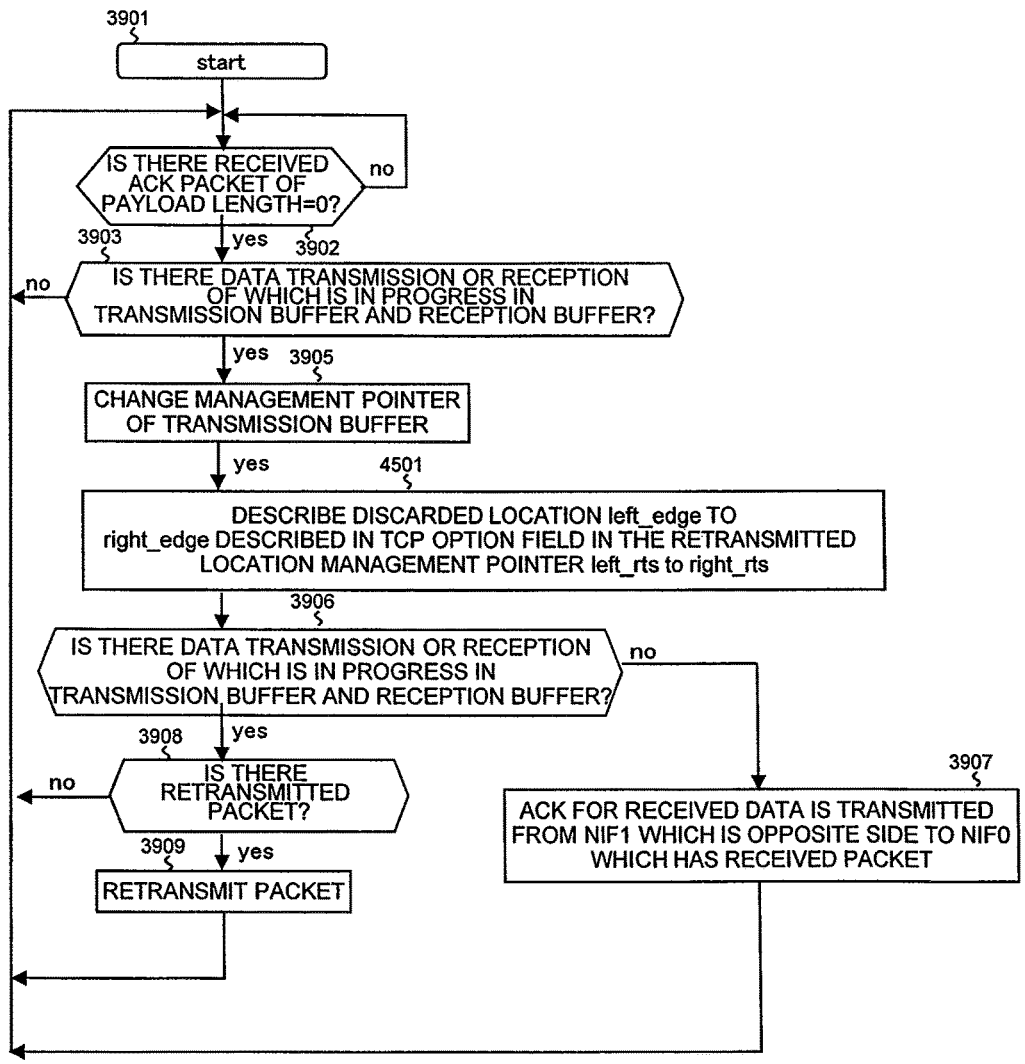
FIG. 38 is a flowchart illustrating a process performed by the TX packet retransmission portion 3104 of the NIF0 TCP module 1007 in Embodiment 4.

In addition, as shown in FIG. 38, immediate retransmission of a discarded location is realized when an ACK packet for partial non-acknowledgement (Negative ACK (NACK)) in which the discarded location is described is received, by adding a process (step 4501) of describing a value described in right/left_edge_1 to 4 (2919 to 2926) of the TCP option field in the retransmitted location management pointer right/left_rts 1108 after the process (step 3905) of changing the management pointer of the reception buffer, to the process shown in the flowchart diagram of FIG. 19.

The reception history update portion 3106 realizes, as shown in FIG. 37, returning of an ACK packet for partial non-acknowledgement (Negative ACK (NACK)) in which a discarded location is described by adding a process (step 4401) of describing the discarded location indicated by the management pointer right/left_loss 1107 in right/left_edge_1 to 4 (2919 to 2926) of the TCP option field before the process (step 3805) of returning ACK, to the process shown in the flowchart diagram of FIG. 18.

In addition, the reception history update portion 3106 records a time point when each management pointer right/left_loss 1107 of a discarded location is described in the TCP option field and an ACK packet is returned, and does not return the ACK packet in which the management pointer right/left_loss 1107 is described in the TCP option field until a difference between a current time point and the returning time point of the ACK packet reaches a specific time or more. Thereby, it is possible to return the ACK packet in which the discarded location is described again, in a case where a retransmitted packet does not arrive even after a specific time has elapsed, shown in FIG. 29.

In addition, the TX packet retransmission portion 3104 realizes, as shown in FIG. 38, immediate retransmission of a discarded location when an ACK packet for partial non-acknowledgement (Negative ACK (NACK)) in which the discarded location is described is received, by adding a process (step 4501) of describing a value described in right/left_edge_1 to 4 (2919 to 2926) of the TCP option field in the retransmitted location management pointer right/left_rts 1108 and retransmitting data in a range described in the retransmitted location management pointer right/left_rts 1108 after the process (step 3905) of changing the management pointer of the reception buffer, to the process shown in the flowchart diagram of FIG. 19.

Through the above-described control by the reception history update portion 3106 and the TX packet retransmission portion 3104, it is possible to realize immediate retransmission of all of discarded locations of FIG. 28.

Figure 39:
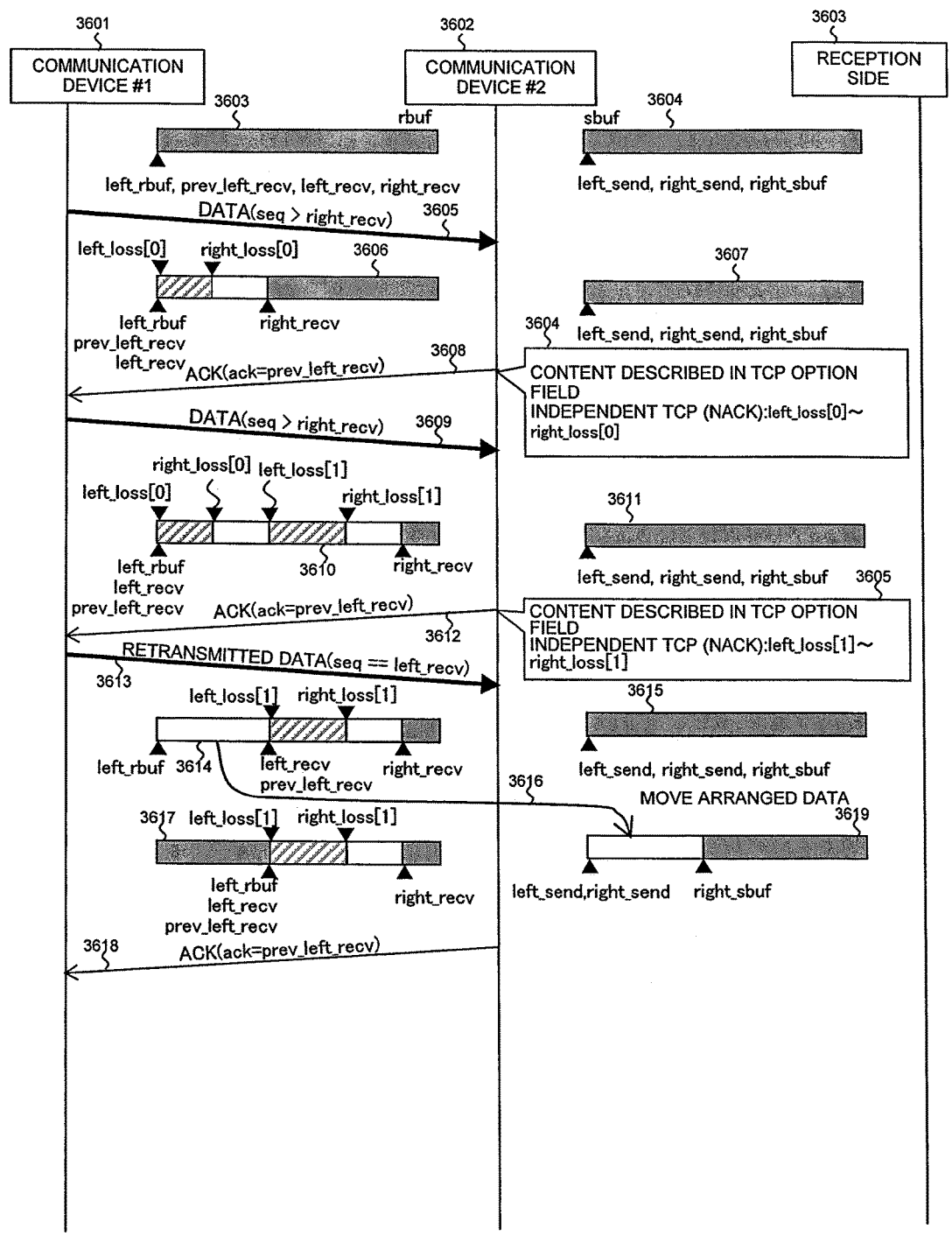
FIG. 39 is a sequence diagram illustrating an example of how the pointer moves and what kind of ACK packet is returned when a loss segment occurs in communication using an independent TCP between communication devices in a case of employing Embodiment 4.

FIG. 39 is a sequence diagram illustrating an example of how a pointer is moved and what kind of ACK packet is returned when a loss segment occurs in communication using the independent TCP between communication devices in a case of employing the present embodiment. The figure shows a movement of a pointer of a reception buffer 3603 used for independent TCP communication between the communication device #2 (3602) (corresponding to the above-described communication device 920) and a communication device #1 (3601) (corresponding to the above-described communication device 910) and a movement of a pointer of a transmission buffer 3604 used for standard TCP communication between the communication device 3602 and a reception terminal 3603.

When a packet 3605 with data in which a transmission sequence number is larger than right_recv 1103 is received from the communication device #1 (3601), the communication device #2 (3602) changes right_recv 1103 to a sum of the transmission sequence number of the received packet and a data length, and creates a new loss segment recording pointer in which left_loss[0] is set to left_recv 1102 and right_loss[0] is set to a transmission sequence number of the received packet (3606). In addition, an ACK packet 3608 for partial non-acknowledgement (Negative ACK (NACK)) in which a reception sequence number is set to prev_left_recv 1102 and values of left_loss[0] and right_loss[0] are described (3604) in left_edge_1 (2919) and right_edge_1 (2920) of the TCP option header 2916 is sent to the communication device #1 (3601). Successively, in addition, when a packet 3609 with data in which a transmission sequence number is larger than right_recv 1103 is received from the communication device #1 (3601), the communication device #2 (3602) creates a new loss segment recording pointer in which left_loss[1] is set to right_recv 1103 and right_loss[1] is set to a transmission sequence number of the received packet, and changes right_recv 1103 to a sum of the transmission sequence number of the received packet and data length (3610). In addition, an ACK packet 3612 for a partial non-acknowledgement (NACK) in which a reception sequence number is set to prev_left_recv 1102, and values of left_loss[1] and right_loss[1] are described (3605) in left_edge_1 (2919) and right_edge_1 (2920) of the TCP option header 2916 is sent to the communication device #1 (3601). Next, when a retransmitted packet 3613 with data in which a transmission sequence number is the same as left_recv 1102, and a sum of the transmission sequence number and a data length is the same as right_loss[0] is received from the communication device #1 (3601), the communication device #2 (3602) moves left_recv 1102 to a location of left_loss[1], initializes and deletes the loss segment recording pointers left_loss[0] and right_loss[0] (3614), and sends an ACK packet 3618 for acknowledgement in which a reception sequence number is set to prev_left_recv 1102 to the communication device #1 (3601). If left_recv 1102 is larger than left_rbuf 1101, data written from left_rbuf 1101 to left_recv 1102 is moved to the transmission buffer 3615 using right_sbuf 1106 as ahead (3616), and left_rbuf 1101 and right_sbuf 1106 are moved to the right by the size of the moved data (3617 and 3619).

Figure 40:
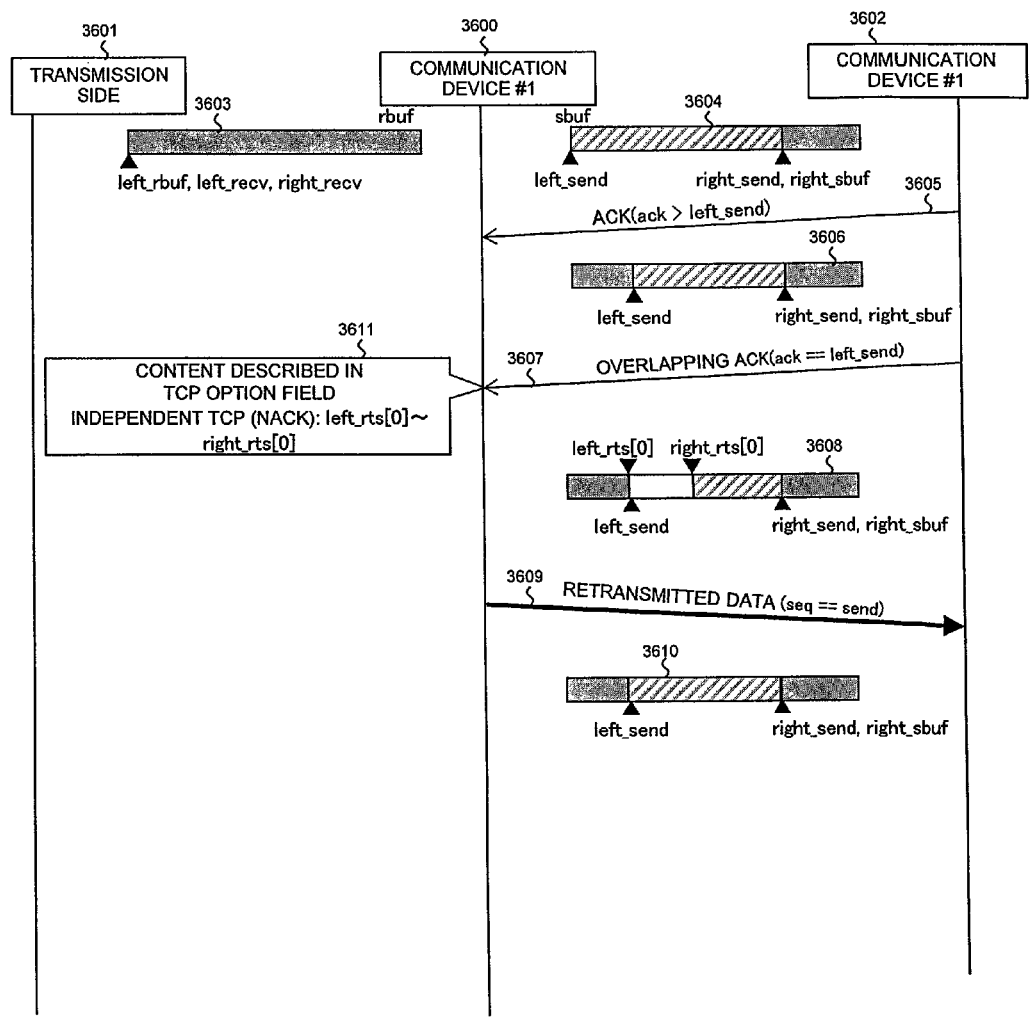
FIG. 40 is a sequence diagram illustrating how the pointer moves when a communication device #1 (3600) receives NACK from a communication device #2 (3602) in a case of employing Embodiment 4.

FIG. 40 is a sequence diagram illustrating how the pointer is moved when a communication device #1 (3600) receives NACK from a communication device #2 (3602). The figure shows a movement of a pointer of the reception buffer 3603 used for TCP communication between the communication device #1 (3600) and a transmission terminal 3601 and a movement of a pointer of the transmission buffer 3604 used for independent TCP communication between the communication device #1 (3600) and the communication device #2 (3602).

An initial state is set to the time when the communication device #1 (3600) has already sent an extent of amount of data to the communication device #2 (3602), thus right_sbuf 1106 is the same as right_send 1105, and right_send 1105 is larger than left_send 1104 (3604). When an ACK packet 3605 for acknowledgement in which a reception sequence number is larger than left_send 1104 and smaller than right_send 1105 is received from the communication device #2 (3602), the communication device #1 (3600) changes a value of left_send 1104 to the reception sequence number described in the ACK packet 3605 (3606). Further, when the communication device #1 (3600) receives an overlapping ACK packet (3607) for partial non-acknowledgement (NACK) in which a reception sequence number is the same as a value of left_send 1104, the reception sequence number is the same as that of the ACK packet 3605, a value of left_send 1104 is described in left_edge_1 (2919) of the TCP option header 2916, a value which is larger than left_send 1104 and smaller than right_send 1105 is described in right_edge_1 (2920) of the TCP option header 2916 (3611), a new retransmitted segment recording pointer in which left_rts[0] is set to left_edge_1 (2919), and right_rts[0] is set to right_edge_1 (2920) is created (3608). When the retransmitted segment is created, the communication device #1 (3600) retransmits data from left_rts[0] to right_rts[0] (3609), and initializes and deletes the retransmitted segment recording pointer (3610).

By using the above-described means, it is possible to realize communication which is not dependent on an RTT or a discarding rate even between terminals which can perform only the standard TCP communication. In addition, even if either one of the communication devices fails, it is possible to prevent occurrence of a case where transmission is completed in the transmission terminal, and, on the other hand, reception is not completed in the reception terminal.

[Modified Examples]

Hereinafter, with reference to FIGS. 42 to 48, a description will be made of a modified example regarding the bandwidth control by the transmission control portion of the communication device related to FIGS. 30 to 36. The following is an example in which the transmission bandwidth control portion 3206 controls an increase and a decrease in a control bandwidth which is an amount of packets which are held in the buffer 3209 or the retransmission buffer 3110 for each shaper and are sent to a network, on the basis of retransmission circumstances at a current time point in a predetermined period and transmission circumstances in a predetermined period in the past, particularly, the retransmission circumstances.

Figure 42:
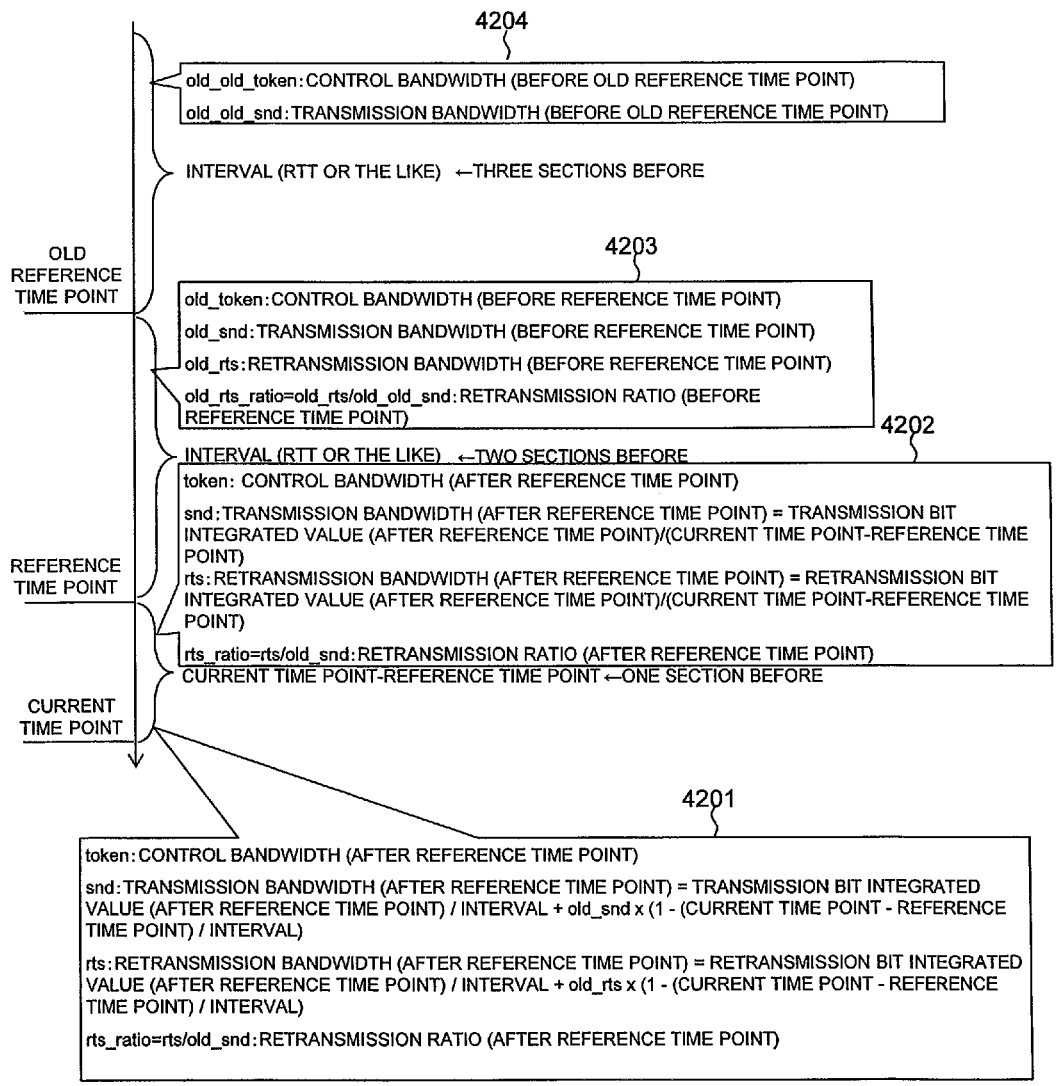
FIG. 42 is a conceptual diagram illustrating meanings of values held by a transmission and retransmission bandwidth table 3205 for each shaper.

FIG. 42 is a diagram illustrating a modified example of FIG. 35 illustrating meanings of the values held by the transmission and retransmission bandwidth table 3205 for each shaper. The passage of time is shown from the top to the bottom. As indicated by the reference numerals 4201 and 4202 of FIG. 42, a control bandwidth after a reference time point corresponds to a control bandwidth (indicated by token in the present embodiment) at a current time point. A transmission bandwidth after the reference time point corresponds to a transmission bandwidth at the current time point (indicated by snd in the present embodiment). The transmission bandwidth after the reference time point may be obtained by the transmission bandwidth control portion 3206 through a case (4202) where the transmission bit integrated value after the reference time point is divided by a difference between the current time point and the reference time point, and a case (4201) where a value obtained by dividing the transmission bit integrated value after the reference time point by an interval is added to a multiplication value of the transmission bandwidth old_snd after the reference time point and (1−(current time point−reference time point)/interval).

A retransmission bandwidth after the reference time point corresponds to a retransmission bandwidth (indicated by its in the present embodiment) at the current time point. In this case, the retransmission bandwidth after the reference time point may be obtained by the transmission bandwidth control portion 3206 through a case (4202) where the retransmission bit integrated value after the reference time point is divided by a difference between the current time point and the reference time point, and a case (4201) where a value obtained by dividing the retransmission bit integrated value after the reference time point by an interval is added to a multiplication value of the retransmission bandwidth old_rts after the reference time point and (1−(current time point−reference time point)/interval). As indicated by the reference numeral 4203 of FIG. 42, a control bandwidth, a transmission bandwidth, and a retransmission bandwidth before the reference time point correspond to a control bandwidth, a transmission bandwidth, and a retransmission bandwidth (indicated by old_token, old_snd, and old_rts in the present embodiment) until right before the reference time point (from the current reference time point until before an interval time).

In addition, as indicated by the reference numeral 4204 of FIG. 42, a reference time point which is used one step before the reference time point which is currently being used is referred to as an old reference time point, and, a control bandwidth, a transmission bandwidth, and a retransmission bandwidth before the old reference time point indicate a control bandwidth, a transmission bandwidth, and a retransmission bandwidth (indicated by old_old_token, old_old_snd, and old_old_rts in the present embodiment) until right before the old reference time point (from the old reference time point until before a further interval time; and, two interval times before the current reference time point). As indicated by the reference numeral 4203 of FIG. 42, the retransmission ratio old_rts_ratio before the reference time point is obtained by old_rts/old_old_snd. In addition, as indicated by the reference numeral 4201 or 4202 of FIG. 42, the current retransmission ratio rts_ratio after the reference time point is obtained by rts/old_snd on the basis of the current retransmission bandwidth rts and the transmission bandwidth before the reference time point. For differentiation of the time, the time from the current time point to the reference time point is referred to as one section before, the time from the reference time point to the old reference time point is referred to as two sections before, and the time before the old reference time point is referred to as three sections before. The interval may use a measured RTT or a fixed value.

Figure 43:
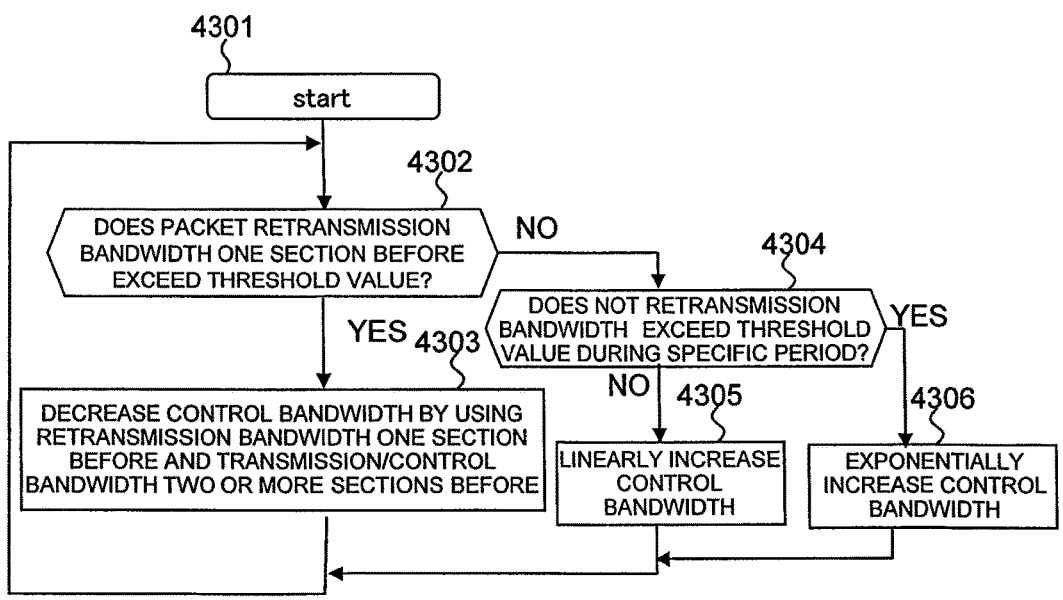
FIG. 43 is a flowchart illustrating that a transmission bandwidth control portion 3206 updates a control bandwidth by using information of a retransmission bandwidth.
Figure 44:
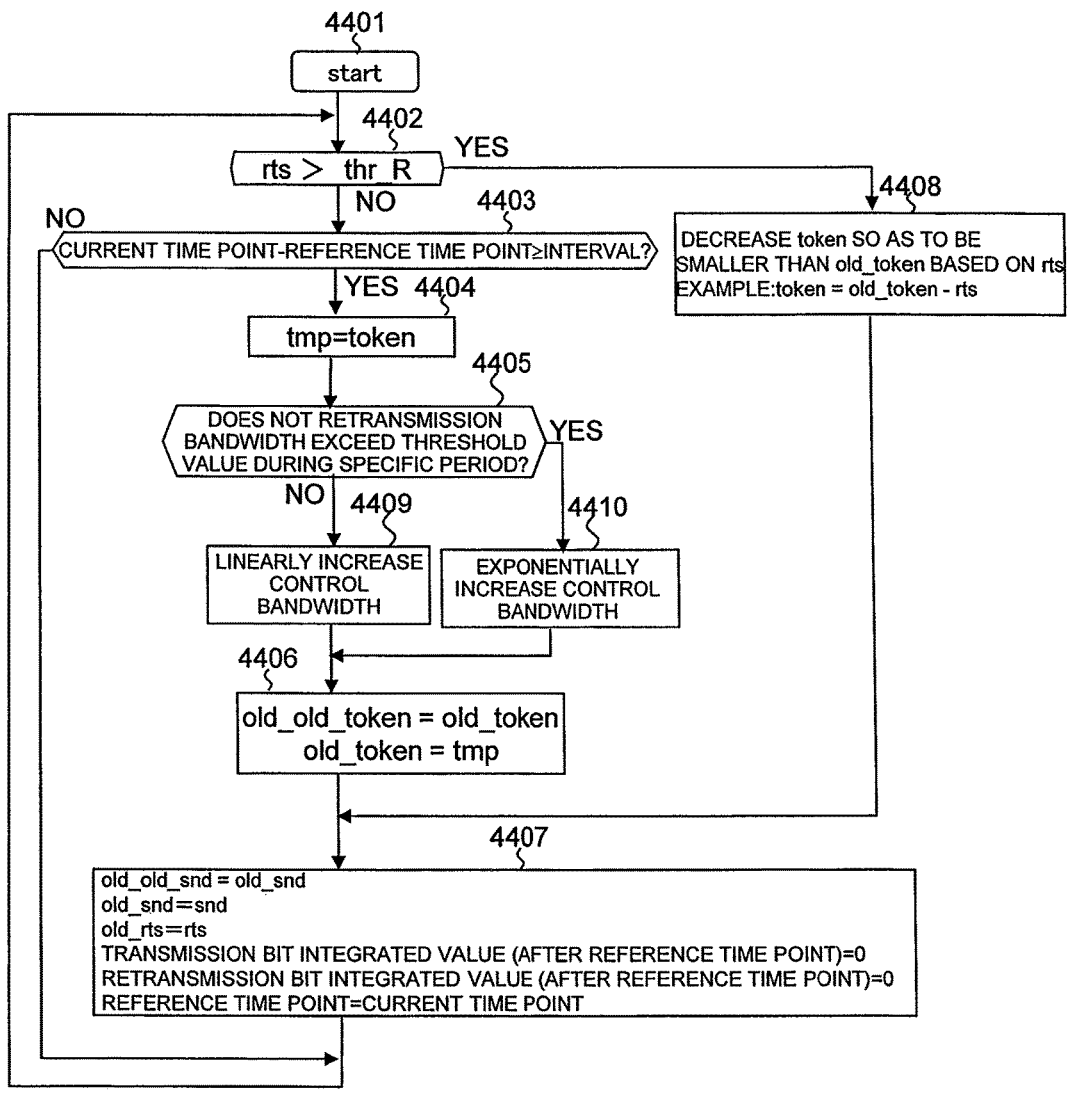
FIG. 44 is a flowchart diagram specifically illustrating the update of a control bandwidth in FIG. 43.

With reference to FIGS. 43 and 44, a description will be made of an example in which the transmission bandwidth control portion 3206 controls an increase and a decrease in a control bandwidth on the basis of a retransmission bandwidth one section before and use circumstances of a bandwidth two or more sections before as a modified example of FIG. 33.

FIG. 43 shows an example in which the transmission bandwidth control portion 3206 updates a control bandwidth by using the values described in the transmission and retransmission bandwidth table 3205 for each shaper.

When the process starts (step 4301), the transmission bandwidth control portion 3206 (also the same for the following) determines whether or not a packet retransmission bandwidth rts one section before exceeds a threshold value (step 4302). If the packet retransmission bandwidth rts exceeds the threshold value, the transmission bandwidth control portion 3206 decreases the control bandwidth by using the retransmission bandwidth one section before and transmission and control bandwidths two or more sections before (step 4303). As a result of step 4303, a data flow rate to the WAN side corresponding to a single shaper from the TX unit 3101 decreases from the communication device.

On the other hand, if the packet retransmission bandwidth rts does not exceed the threshold value, the flow proceeds to step 4304, and the transmission bandwidth control portion 3206 performs control for increasing the control bandwidth. First, it is determined whether or not the retransmission bandwidth does not exceed a threshold value during a specific period (step 4304). For example, the specific period corresponds to one predetermined section or a plurality of predetermined sections before two or more sections in the past. In relation to a retransmission bandwidth for each predetermined section in the past, a column of a retransmission bandwidth before the old reference time point is provided in the transmission and retransmission bandwidth table 3205 shown in FIG. 34 for each section, and the transmission bandwidth control portion 3206 manages retransmission circumstances. In step 4304, the transmission bandwidth control portion 3206 determines whether or not a retransmission bandwidth does not exceed a threshold value during a specific period by referring to the information of the retransmission bandwidth of one or more predetermined sections of the retransmission bandwidth column before the old reference time point. In this case, the threshold value in step 4302 and the threshold value in step 4306 may be different from each other.

Alternatively, a time point when a bandwidth decreases lastly may be held in step 4303, and the transmission bandwidth control portion may determine whether or not a predetermined period has elapsed by comparing the time point when a bandwidth decreases lastly with a current time point. Since the process of reducing a bandwidth (step 4303) is performed when the retransmission bandwidth exceeds the threshold value at a process time point of FIG. 43, the time point when the bandwidth decreases is held in the transmission and retransmission bandwidth table, and thereby it is possible to perform determination in step 4304 by using the information such as the threshold value in step 4302.

In a case of YES as a result of step 4304, the transmission bandwidth control portion 3206 exponentially increases the control bandwidth (step 4305). As a result of step 4305, a data flow rate to the WAN side corresponding to a single shaper from the TX unit 3101 increases from the communication device. On the other hand, in a case of NO, the transmission bandwidth control portion 3206 linearly increases the control bandwidth (step 4306). A packet held in the buffer 3209 for each shaper is sent to the network on the basis of the new control bandwidth which has increased in step 4605 or 4606.

The increase in the bandwidth in step 4306 is controlled so as to be smoother than the increase in the bandwidth in step 4305, and thus a data flow rate to the WAN side corresponding to a single shaper from the TX unit 3101 from the communication device increases so as to be smoother than in step 4305. In steps 4304 to 4306, it is determined that competition with other communications may possibly occur until a predetermined time has elapsed after the retransmission bandwidth becomes lower than the threshold value, and thus the bandwidth linearly and slowly increases. On the other hand, if a state in which the retransmission bandwidth is lower than the threshold value lasts during a specific time, it is determined that competition with other communications does not occur, and thus the bandwidth exponentially and rapidly increases. As above, an increasing rate of a control bandwidth is controlled depending on retransmission occurrence circumstances during a specific period before two or more sections, and thereby it is possible to perform bandwidth control so as not to put pressure on other communication bandwidths.

In addition, a method of increasing a bandwidth in steps 4305 and 4306 is not limited to the exponential increase and the linear increase. For example, as a result of step 4302, an increasing control bandwidth size when a retransmission bandwidth is equal to or less than a threshold value during a specific period may be twice or three times the increasing control bandwidth size when the retransmission bandwidth exceeds the threshold value during the specific period. In other words, in steps 4305 and 4306, in a case of increasing a control bandwidth, the transmission bandwidth control portion 3206 controls an increasing rate of the control bandwidth on the basis of a retransmission bandwidth two or more sections before, and thereby suppresses the increasing rate of the control bandwidth when the retransmission bandwidth reaches the threshold value as compared with a case where the retransmission bandwidth in the past is lower than the threshold value during the specific period. In addition, the transmission bandwidth control portion 3206 may control whether a bandwidth increases smoothly or rapidly depending on the number of times in which the retransmission bandwidth exceeds the threshold value during the specific period. Further, the transmission bandwidth control portion may control whether a bandwidth increases smoothly or rapidly depending on the number of times in which a bandwidth decreases during the specific period.

Through the processes shown in FIG. 43, bandwidth control based on transmission, control and retransmission bandwidths over two or more sections and bandwidth control for not putting pressure on other communication bandwidths can coexist.

FIG. 44 is a flowchart diagram illustrating that the transmission bandwidth control portion 3206 sets a control bandwidth using the values described in the transmission and retransmission bandwidth table 3205 for each shaper as a more detailed description of FIG. 43.

When the process starts (step 4401), the transmission bandwidth control portion 3206 (also the same for the following) determines whether or not the retransmission bandwidth rts after the reference time point is larger than a predefined threshold value thr_R (step 4402). If the retransmission bandwidth rts is larger than the predefined threshold value, the transmission bandwidth control portion 3206 determines a new control bandwidth (after the reference time point) token so as to be smaller than the control bandwidth old_token before the reference time point, using the retransmission bandwidth rts after the reference time point (step 4408). For example, old_token-rts is set to the new control bandwidth (after the reference time point) token (step 4408). If the retransmission bandwidth rts after the reference time point is not larger than the predefined threshold value in step 4402, the transmission bandwidth control portion 3206 determines whether or not a difference between the current time point and the reference time point is equal to or more than an interval (step 4403). If it is determined that the difference between the current time point and the reference time point is not equal to or more than the interval, the flow returns to step 4402.

If it is determined that it is true in step 4403, the transmission bandwidth control portion 3206 sets a value of the control bandwidth (after the reference time point) token to tmp (step 4404). Successively, the transmission bandwidth control portion 3206 increases control bandwidth (after the reference time point) token. The transmission bandwidth control portion 3206 determines whether or not the retransmission bandwidth does not exceed the threshold value during the specific period (step 4405). In a case of YES, the transmission bandwidth control portion 3206 exponentially increases the control bandwidth (step 4410). In a case of NO, the transmission bandwidth control portion 3206 linearly increases the control bandwidth (step 4409).

Next, the transmission bandwidth control portion 3206 sets the control bandwidth (before the old reference time point) old_old_token to the control bandwidth (before the reference time point) old_token, sets the control bandwidth (before the reference time point) old_token to tmp, and stores the respective values in the transmission and retransmission bandwidth table 3205 (step 4406). After step 4406 or step 4408 is performed, the transmission bandwidth control portion 3206 sets the transmission bandwidth (before the old reference time point) old_old_snd to the transmission bandwidth (before the reference time point) old_snd, the transmission bandwidth (before the reference time point) old_snd to the transmission bandwidth (after the reference time point) snd, the retransmission bandwidth (before the reference time point) old_rts to the retransmission bandwidth (after the reference time point) rts, the reference time point to the reference time point+an interval, the transmission bit integrated value (after the reference time point) to 0, the retransmission bit integrated value (after the reference time point) to 0, and the reference time point to the current time point, and stores the respective values in the transmission and retransmission bandwidth table 3205 (step 4407). After step 4407, the flow returns to step 4402. In steps 4405, 4409 and 4410, it is determined that competition with other communications may possibly occur until a predetermined time has elapsed after the retransmission bandwidth becomes lower than the threshold value, and thus the bandwidth linearly and slowly increases. On the other hand, if a state in which the retransmission bandwidth is lower than the threshold value lasts during a specific time, it is determined that competition with other communications does not occur, and thus the bandwidth exponentially and rapidly increases. Thereby, it is possible to perform bandwidth control so as not to put pressure on other communication bandwidths. Further, through the processes shown in FIG. 44, bandwidth control based on transmission, control and retransmission bandwidths over two or more sections and bandwidth control for not putting pressure on other communication bandwidths can coexist.

Figure 45:
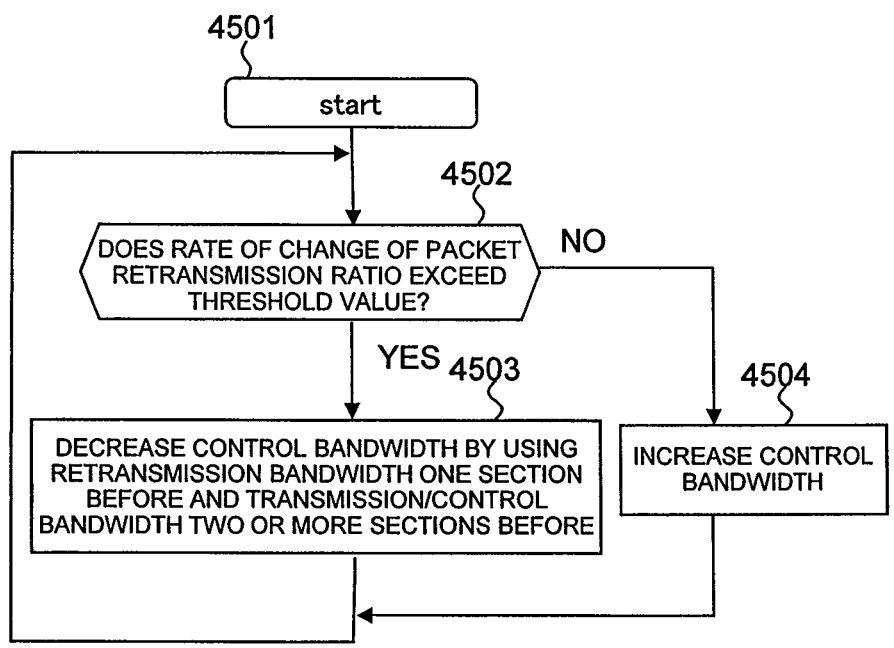
FIG. 45 is a flowchart illustrating that the transmission bandwidth control portion 3206 updates a control bandwidth by using a rate of change of a retransmission ratio.
Figure 46:
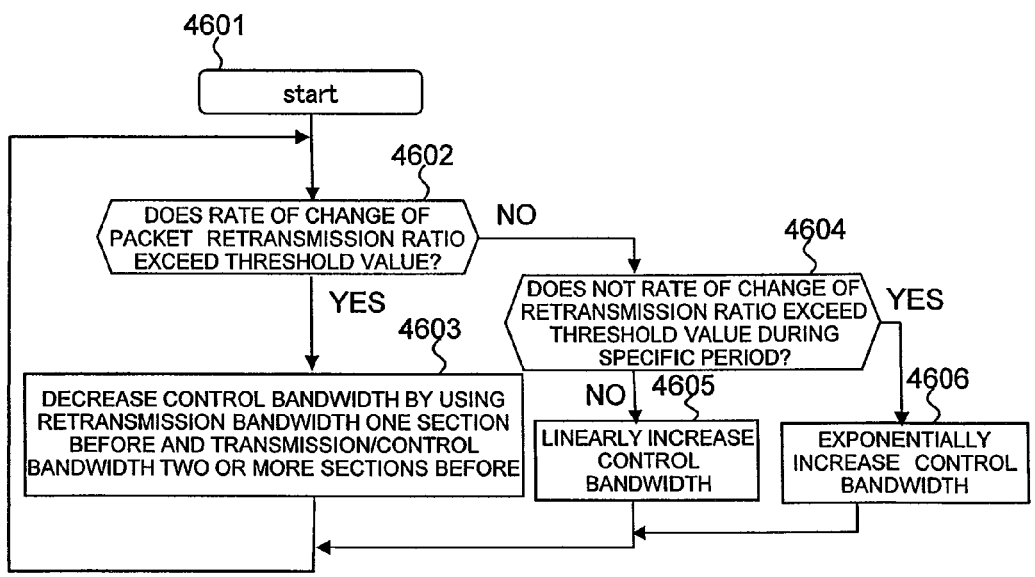
FIG. 46 is a flowchart illustrating that the transmission bandwidth control portion 3206 updates a control bandwidth by using a rate of change of a retransmission ratio so as to increase or decrease the control bandwidth.
Figure 47:
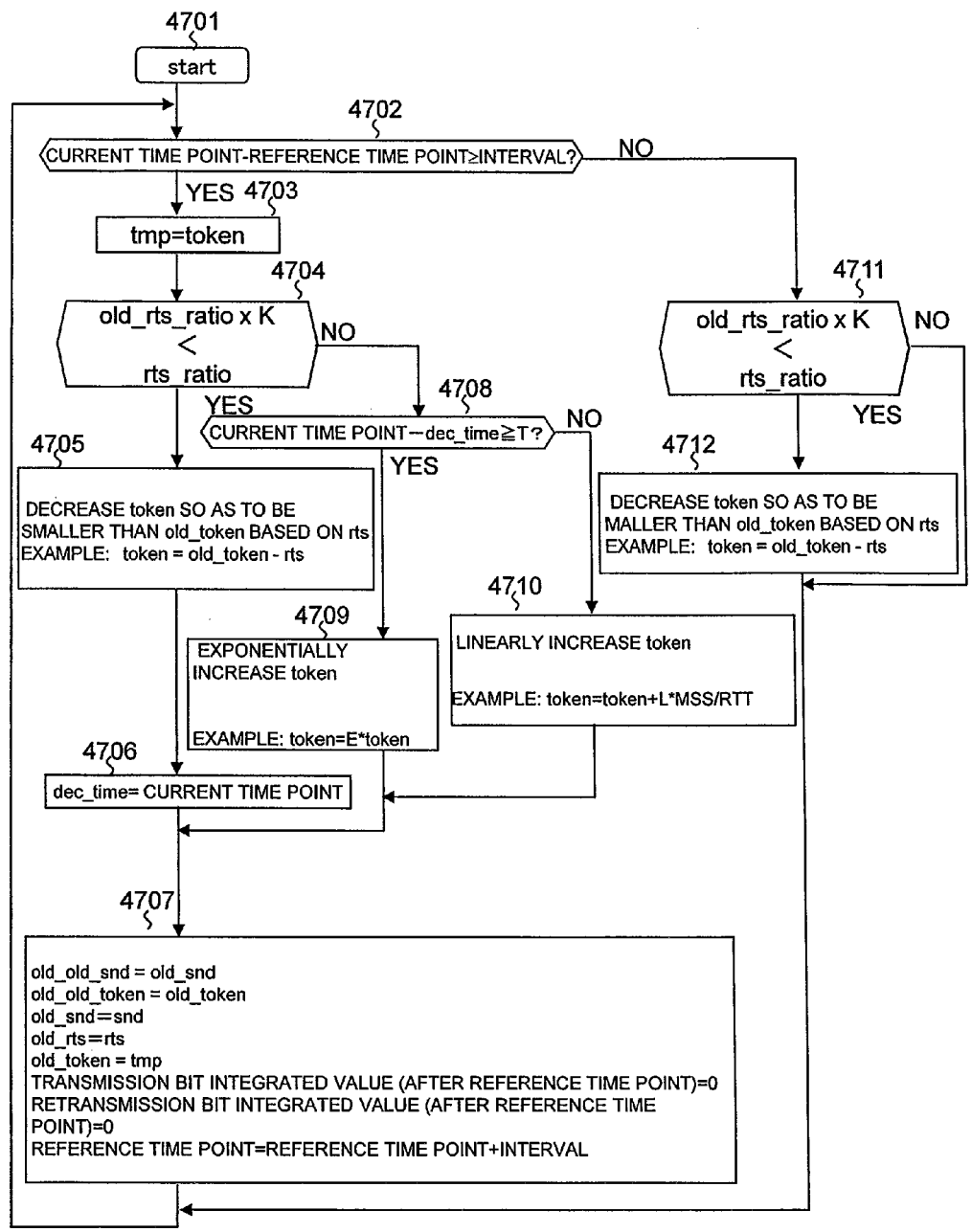
FIG. 47 is a flowchart diagram specifically illustrating the update of a control bandwidth in FIG. 46.

With reference to FIGS. 45, 46 and 47, a description will be made of an example in which the transmission bandwidth control portion 3206 controls a control bandwidth on the basis of a rate of change of a retransmission ratio over a plurality of sections.

FIG. 45 shows a process in which the transmission bandwidth control portion 3206 updates a control bandwidth using the values described in the transmission and retransmission bandwidth table 3205 for each shaper as a modified example of FIG. 33.

When the process starts (step 4501), the transmission bandwidth control portion 3206 (also the same for the following) determines whether or not a rate of change (rts_ratio/old_rts_ratio) of a packet retransmission ratio exceeds a threshold value (step 4502). If the rate of change exceeds the threshold value, the control bandwidth decreases using the retransmission bandwidth one section before and transmission and control bandwidths two or more sections before (step 4503). If the rate of change does not exceed the threshold value, the control bandwidth increases (step 4504). Thereby, it is possible to perform bandwidth control based on transmission, control and retransmission bandwidths over two or more sections, and a rate of change of a retransmission ratio.

FIG. 46 is a flowchart diagram illustrating that the transmission bandwidth control portion 3206 updates a control bandwidth using the values described in the transmission and retransmission bandwidth table 3205 for each shaper as a modified example of FIG. 45, and, particularly, a case of increasing a bandwidth will be described mainly.

When the process starts (step 4601), steps 4602 and 4603 respectively correspond to steps 4502 and 4503 of FIG. 45.

If the rate of change (rts_ratio/old_rts_ratio) of the packet retransmission ratio does not exceed the threshold value as a result of step 4602, the transmission bandwidth control portion 3206 determines whether or not the rate of change of the retransmission ratio does not exceed a threshold value during a specific period in the past (step 4604).

Alternatively, the transmission bandwidth control portion 3206 may hold a time point when a bandwidth decreases lastly in step 4603, and the transmission bandwidth control portion 3206 may determine whether or not a predetermined period has elapsed by comparing the time point when a bandwidth decreases lastly with a current time point. Since the process of reducing a bandwidth (step 4603) is performed when the retransmission bandwidth exceeds the threshold value at a process time point of FIG. 46, the time point when the bandwidth decreases is managed, and thereby it is possible to perform determination in step 4604 by using the information such as the threshold value in step 4602.

In addition, the specific period corresponds to one or a plurality of predetermined sections before two or more sections in the past. In relation to a retransmission bandwidth for each predetermined section in the past, a column of a packet retransmission bandwidth is provided in the transmission and retransmission bandwidth table 3205 shown in FIG. 34 for each section, and the transmission bandwidth control portion 3206 may mange a rate of change of packet retransmission. In step 4604, the transmission bandwidth control portion 3206 determines whether or not a rate of change of retransmission does not exceed a threshold value during a specific period by referring to the transmission and retransmission bandwidth table 3205. In this case, the threshold value in step 4604 and the threshold value in step 4602 may be different from each other.

If the rate of change of the retransmission ratio does not exceed the threshold value during the specific period, the transmission bandwidth control portion 3206 exponentially increases the control bandwidth (step 4606). If it is determined that the rate of change of the retransmission ratio does not exceed the threshold value during the specific period in step 4604, the transmission bandwidth control portion 3206 linearly increases the control bandwidth (step 4605). If the control bandwidth increases in steps 4605 and 4606, the new control bandwidth is stored in the table 3205, and a packet held in the buffer 3209 for each shaper is sent to the network on the basis of the new control bandwidth.

In the same manner as in step 4305 or 4306 of FIG. 43, the increase in the bandwidth in step 4606 is controlled so as to be smoother than the increase in the bandwidth in step 4605, and, as a result of step 4606, a data flow rate to the WAN side corresponding to a single shaper from the TX unit 3101 from the communication device increases so as to be smoother than in step 4605.

Thereby, bandwidth control based on transmission, control and retransmission bandwidths over two or more sections, and a rate of change of a retransmission ratio, and bandwidth control for not putting pressure on other communication bandwidths can coexist. In other words, it is determined that competition with other communications may possibly occur until a predetermined time has elapsed after an increasing rate of a discarding rate becomes lower than the threshold value, and thus the bandwidth linearly and slowly increases. On the other hand, if a state in which an increasing rate of a discarding rate is lower than the threshold value lasts during a specific time, it is determined that competition with other communications does not occur, and thus the bandwidth exponentially and rapidly increases.

Thereby, it is possible to perform bandwidth control so as not to put pressure on other communication bandwidths.

In the same manner as in FIG. 43, an increasing rate of a control bandwidth is controlled depending on retransmission occurrence circumstances during a specific period before two or more sections, and thereby it is possible to perform bandwidth control so as not to put pressure on other communication bandwidths in FIG. 46 as well.

In addition, a method of increasing a bandwidth in steps 4605 and 4606 is not limited to the exponential increase and the linear increase. For example, as a result of step 4602, an increasing control bandwidth size when a rate of change of retransmission is equal to or less than a threshold value during a specific period may be twice or three times the increasing control bandwidth size when a rate of change of retransmission exceeds the threshold value during the specific period. In other words, in steps 4305 and 4306, in a case of increasing a control bandwidth, the transmission bandwidth control portion 3206 may control an increasing rate of the control bandwidth on the basis of a rate of change of a retransmission ratio two or more sections before, and thereby suppress the increasing rate of the control bandwidth when reaching the threshold value as compared with a case where the rate of change of a retransmission ratio in the past is lower than the threshold value during the specific period.

In addition, the transmission bandwidth control portion 3206 may determine whether a bandwidth increases smoothly or rapidly depending on the number of times in which the rate of change of a retransmission ratio exceeds the threshold value during the specific period without using step 4604.

FIG. 47 shows a process in which the transmission bandwidth control portion 3206 updates a control bandwidth as a specific example of FIG. 46.

When the process starts (step 4701), the transmission bandwidth control portion 3206 (also the same for the following) first determines whether or not a difference between a current time point output by the timer 3203 and a reference time point described in the transmission and retransmission bandwidth table 3205 is equal to or more than an interval 3204 (step 4702). As the interval time, a measured RTT may be used, or a predefined value may be used. If it is determined that it is true in step 4702, the transmission bandwidth control portion 3206 sets a value of the control bandwidth (after the reference time point) token is set to tmp (step 4703). In addition, for example, it is determined whether or not the retransmission ratio (after the reference time point) rts_ratio is larger than K (where K is a predefined coefficient equal to or more than 1) times of the old retransmission ratio (before the reference time point) old_rts_ratio (step 4704). If it is determined that the retransmission ratio is larger than K times of the old retransmission ratio, the transmission bandwidth control portion 3206 determines that the retransmission ratio increases, and decreases a value of the control bandwidth (after the reference time point) token by using the retransmission bandwidth rts, so as to be smaller than a value of the control bandwidth (before the reference time point) old_token. For example, the control bandwidth (after the reference time point) token is set to the control bandwidth (before the reference time point) old_token—the retransmission bandwidth (after the reference time point) rts (step 4705). In addition, the current time point is assigned to dec_time as a time point when the bandwidth decreases lastly (step 4706).

If it is determined that it is false in step 4704, the transmission bandwidth control portion 3206 linearly or exponentially increases the control bandwidth (after the reference time point) token. It is determined whether or not a difference between the current time point and the time point dec_time when the bandwidth decreases lastly is larger than a predefined threshold value T (step 4708). The threshold value T may be a dynamic variable value which is proportional to an RTT and a token. If it is determined that it is true in step 4708, the token exponentially increases (step 4709). For example, the token may be set to E*token by using a predefined value E (step 4709). The value E may be a value defined using the token. If it is determined that it is false in step 4708, the token linearly increases (step 4710). For example, the token may be set to token+L*MSS/RTT by using a predefined value L (step 4710). MSS stands for Maximum Segment Size. When steps 4706, 4709 and 4710 are completed, the transmission bandwidth (before the old reference time point) old_old_snd is updated to the transmission bandwidth (before the reference time point) old_snd, the transmission bandwidth (before the reference time point) old_snd is updated to the transmission bandwidth (after the reference time point) snd, the retransmission bandwidth (before the reference time point) old_rts is updated to the retransmission bandwidth (after the reference time point) rts, the reference time point is updated to the reference time point+an interval, the transmission bit integrated value (after the reference time point) is set to 0, the retransmission bit integrated value (after the reference time point) is set to 0, the control bandwidth (before the old reference time point) old_old_token is updated to the control bandwidth (before the reference time point) old_token, and the control bandwidth (before the reference time point) old_token is set to tmp. The respective values are recorded in the transmission and retransmission bandwidth table 3205 (step 4707).

If it is determined that it is false in step 4702, in the same manner as in step 4704, the transmission bandwidth control portion 3206 determines whether or not the retransmission ratio (after the reference time point) rts_ratio is larger than K (where K is a predefined coefficient equal to or more than 1) times of the old retransmission ratio (before the reference time point) old_rts_ratio (step 4711). If it is determined that the retransmission ratio is larger than K times of the old retransmission ratio, it is determined that, for example, the retransmission ratio increases, and a value of the control bandwidth (after the reference time point) token is reduced using the retransmission bandwidth rts, so as to be smaller than a value of the control bandwidth (before the reference time point) old_token in the same manner as in step 3505. For example, the control bandwidth (after the reference time point) token is set to the control bandwidth (before the reference time point) old_token—the retransmission bandwidth (after the reference time point) its (step 4712). When step 4712 is completed, the flow returns to step 4702. Thereby, bandwidth control based on transmission, control and retransmission bandwidths over two or more sections, and a rate of change of a retransmission ratio, and bandwidth control for not putting pressure on other communication bandwidths can coexist.

According to FIGS. 46 and 47, the transmission bandwidth control portion 3206 monitors a rate of change of a retransmission ratio of a retransmitted packet which takes up packets sent from the TX unit 3101 on the basis of a control bandwidth which is set at a current time point in a first period. If the rate of change reaches a predetermined threshold value as a result of monitoring, the control bandwidth decreases so as to reduce an amount of the sent packets, and packets are read from the buffer 3209 according to the control bandwidth. In addition, if the rate of change of a retransmission ratio does not reach the threshold value after a predetermined time has elapsed as a result of monitoring, the transmission bandwidth control portion 3206 increases the control bandwidth so as to increase an amount of sent packets, and reads packets from the buffer 3209 according to the control bandwidth. In addition, in a case of increasing the control bandwidth, the transmission bandwidth control portion 3206 controls to what extent the control bandwidth increases based on transition of the control bandwidth for each first period in the past. For example, if a period between a time point when the control bandwidth decreases and a current time point is larger than the first period and a predefined period has elapsed, an increasing amount is controlled as compared with a case where the predefined period has not elapsed.

According to FIGS. 43 to 47, the transmission bandwidth control portion 3206 updates a control bandwidth for limiting an amount of packets sent from the TX unit 3101 for each interval corresponding to an RTT or the like. The transmission bandwidth control portion monitors retransmission circumstances for each first period which is an interval according to sending of a retransmitted packet, and determines whether a control bandwidth increases or decreases based on the retransmission circumstances. As the retransmission circumstances to be a monitored target, for example, a retransmission bandwidth corresponding to an amount of retransmitted packets occurring in the first period, or comparison of an amount of retransmitted packets occurring in the first period with an amount of retransmitted packets occurring in a period before the first period including a monitoring time point, is exemplified.

In a case of decreasing a control bandwidth, the transmission bandwidth control portion 3206 determines a decreased bandwidth size on the basis of transmission circumstances in the past, retransmission circumstances, or a set control bandwidth rather than the first period including the monitoring time point, thereby decreasing the control bandwidth.

On the other hand, in a case of increasing a control bandwidth, the transmission bandwidth control portion 3206 refers to an interval between a time point when the control bandwidth decreases and a current time point, and performs control for making an increased control bandwidth size larger when the interval is long than when the interval is short.

With the above-described configuration or the process, the communication device can perform precise bandwidth control on the basis of retransmission circumstances in the first period and transmission circumstances in the past. In addition, by precisely increasing and decreasing a bandwidth, it is possible to prevent pressure on other communication bandwidths.

In addition, by using the method in which the transmission bandwidth control portion 3206 updates a control bandwidth, it is possible to decrease or increase the control bandwidth so as to be smaller than a control bandwidth one RTT before on the basis of a retransmission bandwidth in a first period of a current time point and a first time period therefore, for example, a control bandwidth and a retransmission bandwidth one RTT before. Since a control bandwidth increases or decreases around a line bandwidth, the line bandwidth can be effectively used.

Hereinafter, sequence diagrams will be described mainly based on between communication devices which perform data communication related to FIG. 9 with reference to FIGS. 48 to 53.

Figure 48:
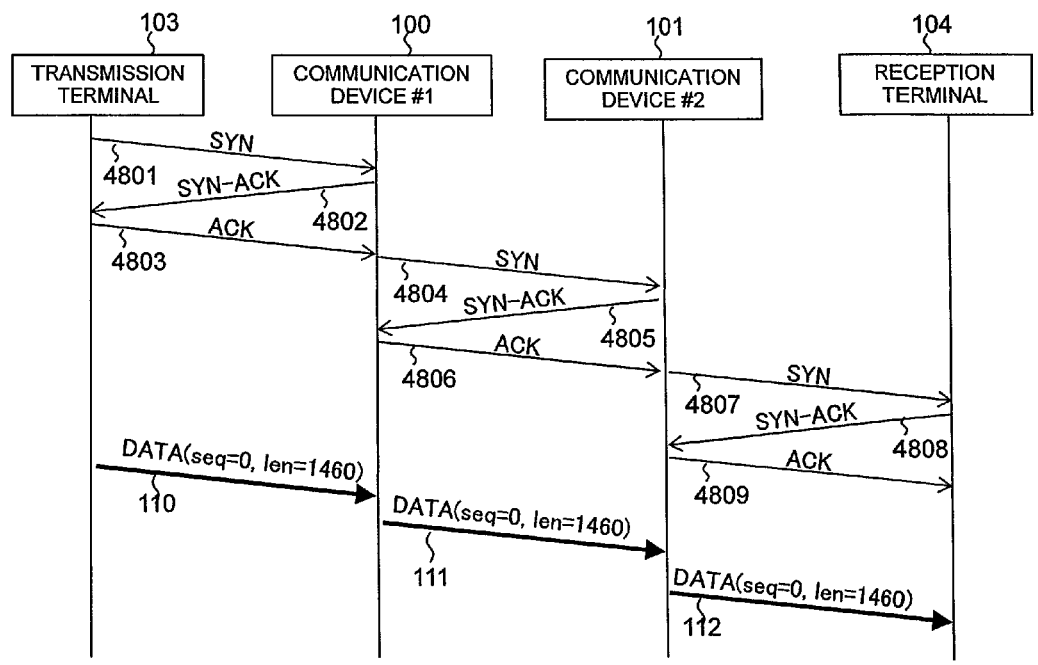
FIG. 48 is a sequence diagram illustrating that a TCP connection is established before the data communication shown in FIG. 9 is performed.

FIG. 48 is a sequence diagram illustrating that a TCP connection is established before the data communication shown in FIG. 9 is performed. First, the transmission terminal 103 exchanges SYN 4801, SYN-ACK 4802, and ACK 4803 with the communication device #1 100 so as to establish a connection. Next, the communication device #1 100 exchanges SYN 4804, SYN-ACK 4805, and ACK 4806 with the communication device #2 101 so as to establish a connection. Finally, the communication device #2 101 exchanges SYN 4807, SYN-ACK 4808, and ACK 4809 with the reception terminal 104 so as to establish a connection. The transmission terminal 103 starts transmitting data in the same manner as in FIG. 9 after establishing the connection between the transmission terminal 103 and the communication device #1 100.

Figure 49:
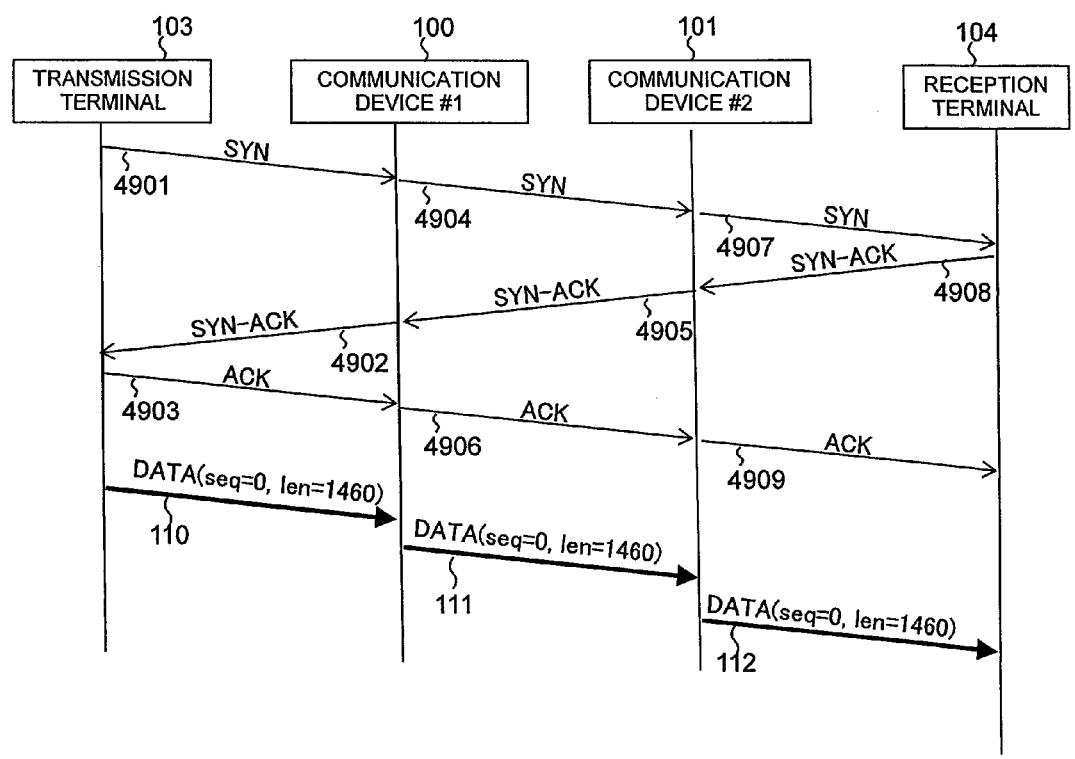
FIG. 49 is a sequence diagram illustrating that a TCP connection is established before the data communication shown in FIG. 9 is performed.

FIG. 49 is another sequence diagram illustrating a TCP connection is established before the data communication shown in FIG. 9 is performed. SYN (4901, 4904, and 4907) is sent from the transmission terminal 103 to the reception terminal 104 via the communication device #1 100 and the communication device #2 101. Next, SYN-ACK (4908, 4905, and 4902) is sent from the reception terminal 104 to the transmission terminal 103 via the communication device #2 101 and the communication device #1 100. Finally, ACK (4903, 4906, and 4909) is sent from the transmission terminal 103 to the reception terminal 104 via the communication device #1 100 and the communication device #2 101. Thereafter, the transmission terminal 103 starts transmitting data in the same manner as in FIG. 9.

Figure 50:
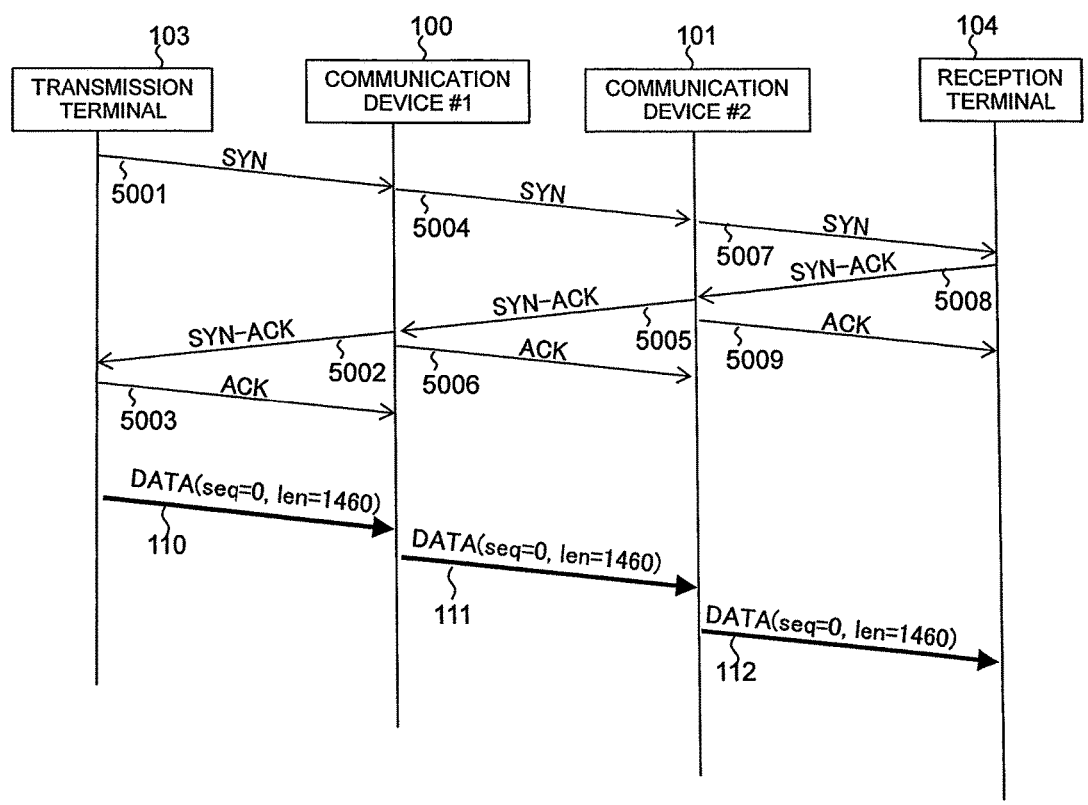
FIG. 50 is a sequence diagram illustrating that a TCP connection is established before the data communication shown in FIG. 9 is performed.

FIG. 50 is another sequence diagram illustrating a TCP connection is established before the data communication shown in FIG. 9 is performed. SYN (5001, 5004, and 5007) is sent from the transmission terminal 103 to the reception terminal 104 via the communication device #1 100 and the communication device #2 101. Next, SYN-ACK (5008, 5005, and 5002) is sent from the reception terminal 104 to the transmission terminal 103 via the communication device #2 101 and the communication device #1 100. When SYN-ACK 5008 is received, the communication device #2 101 returns ACK 5009. When SYN-ACK 5005 is received, the communication device #1 100 returns ACK 5006. When SYN-ACK 5002 is received, the transmission terminal 103 returns ACK 5003. Thereafter, the transmission terminal 103 starts transmitting data in the same manner as in FIG. 9.

Figure 51:
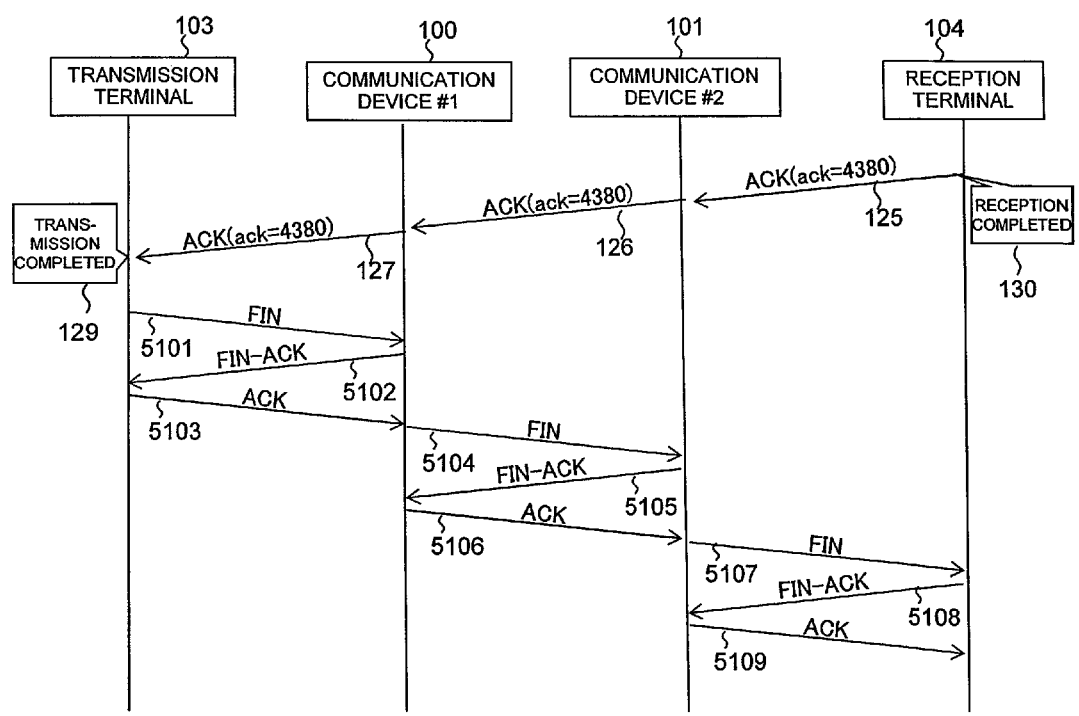
FIG. 51 is a sequence diagram illustrating that a TCP connection is cancelled after the data communication shown in FIG. 9 is performed.

FIG. 51 is a sequence diagram illustrating the TCP connection is canceled after the data communication shown in FIG. 9 is performed. First, the transmission terminal 103 exchanges FIN 5101, FIN-ACK 5102, and ACK 5103 with the communication device #1 100 so as to cancel the connection. Next, the communication device #1 100 exchanges FIN 5104, FIN-ACK 5105, and ACK 5106 with the communication device #2 101 so as to establish the connection. Finally, the communication device #2 101 exchanges FIN 5107, FIN-ACK 5108, and ACK 5109 with the reception terminal 104 so as to cancel the connection.

Figure 52:
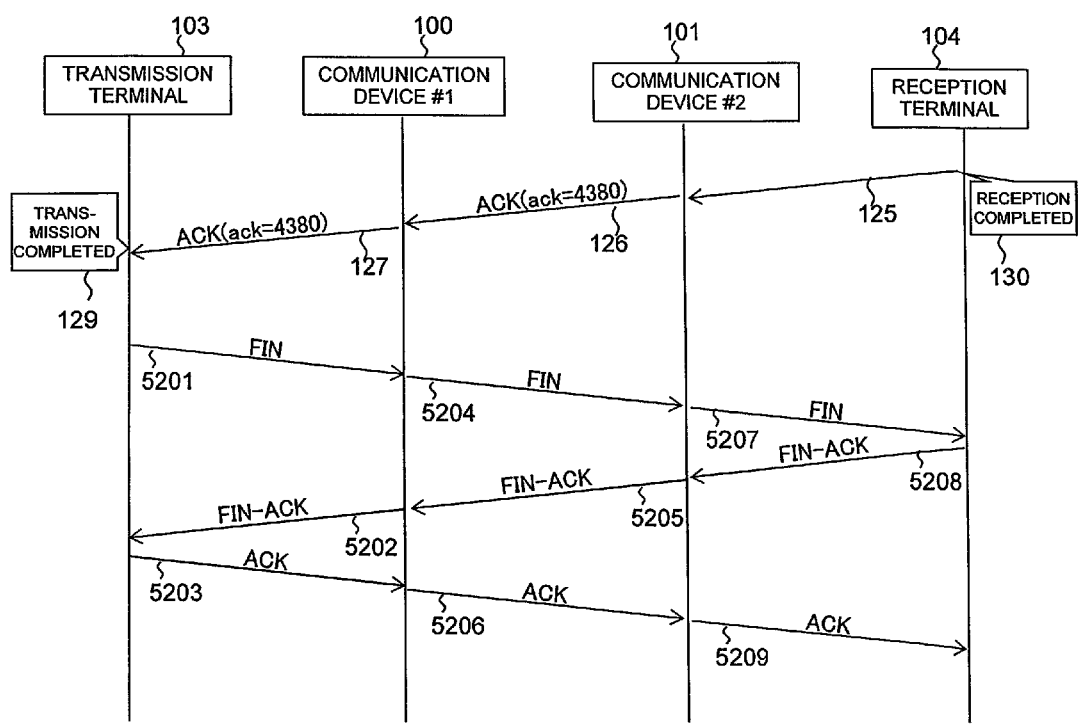
FIG. 52 is a sequence diagram illustrating that a TCP connection is cancelled after the data communication shown in FIG. 9 is performed.

FIG. 52 is another sequence diagram illustrating the TCP connection is canceled after the data communication shown in FIG. 9 is performed. FIN (5201, 5204, and 5207) is sent from the transmission terminal 103 to the reception terminal 104 via the communication device #1 100 and the communication device #2 101. Next, FIN-ACK (5208, 5205, and 5202) is sent from the reception terminal 104 to the transmission terminal 103 via the communication device #2 101 and the communication device #1 100. Finally, ACK (5203, 5206, and 5209) is sent from the transmission terminal 103 to the reception terminal 104 via the communication device #1 100 and the communication device #2 101.

Figure 53:
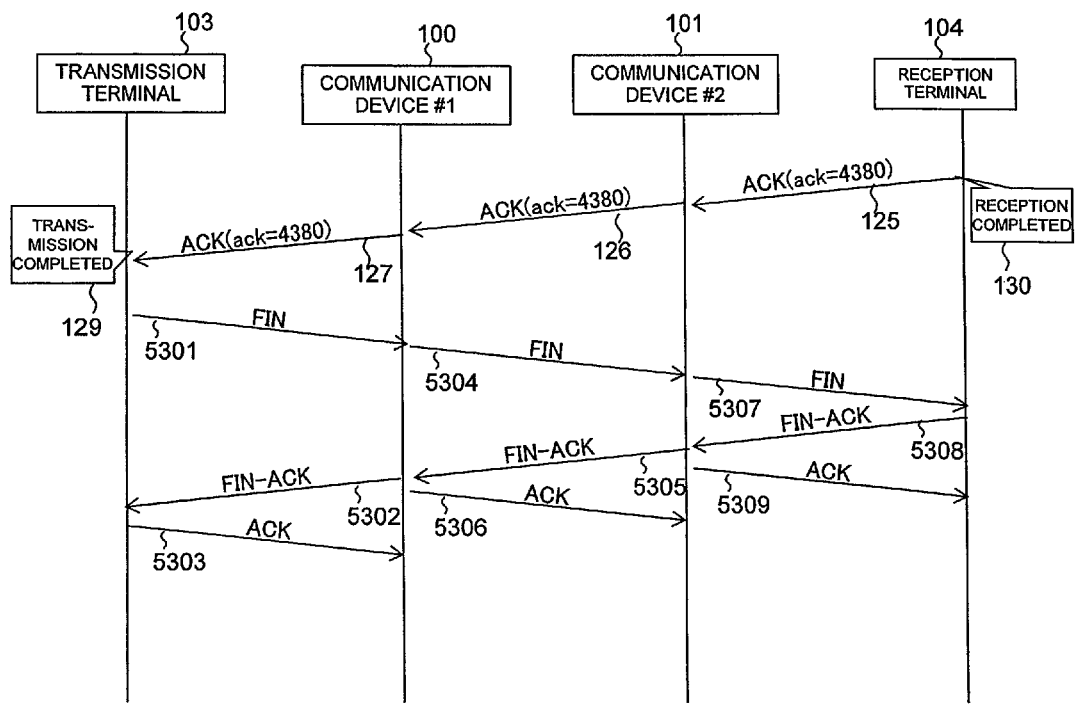
FIG. 53 is a sequence diagram illustrating that a TCP connection is cancelled after the data communication shown in FIG. 9 is performed.

FIG. 53 is another sequence diagram illustrating the TCP connection is canceled after the data communication shown in FIG. 9 is performed. FIN (5301, 5304, and 5307) is sent from the transmission terminal 103 to the reception terminal 104 via the communication device #1 100 and the communication device #2 101. Next, FIN-ACK (5308, 5305, and 5302) is sent from the reception terminal 104 to the transmission terminal 103 via the communication device #2 101 and the communication device #1 100. When FIN-ACK 5308 is received, the communication device #2 101 returns ACK 5309. When FIN-ACK 5305 is received, the communication device #1 100 returns ACK 5306. When FIN-ACK 5302 is received, the transmission terminal 103 returns ACK 5303.

As described above, according to FIGS. 9, and 48 to 53, after the TCP connections are established between the terminals, the communication devices relay data communication between the transmission side and the reception side, and control timing when ACK is returned to the transmission side terminal. A description has been made of an example in which the transmission side receives ACK regarding the data communication, and thereby the transmission side performs a process of canceling the TCP connections.

INDUSTRIAL APPLICABILITY

The present invention is applicable to, for example, a communication device and a communication system which relay communication between terminals.

REFERENCE SIGNS LIST

103, 903 And 904 Terminal
104, 905 And 906 Terminal
110 Flow Of Data
100 And 910 Communication Device
101 And 920 Communication Device
900, 901, 902 And 907 Network
1000 Proxy Module

The invention claimed is:

1. A communication device which relays a data communication comprising,
   a transmission buffer for a first data communication between the communication device and a network, the transmission buffer being configured to store data which waits for an acknowledgement and transmission of the data which waits for acknowledgement is in progress;
   a reception buffer for a second data communication between a transmission terminal and the communication device, the reception buffer being configured to store data which waits for arrangement and reception of the data which waits for arrangement is in progress, and configured to have a first pointer indicating a head of received data, at least one second pointer indicating a boundary between arranged data and unarranged data, and a third pointer for recording a value of a latest one of the at least one second pointer; and
   an operating section configured to return an acknowledgement for a packet with data previously received at least one data reception step before a present data reception step or an acknowledgement for data before final data, when a packet with data is received in the second data communication in the present data reception step, wherein the acknowledgement includes reception sequence numbers which are values of the latest ones of the at least one second pointer indicating the boundary between arranged data and unarranged data as recorded on the third pointer of the reception buffer.

2. The communication device according to claim 1,
wherein the operating section is configured to return an acknowledgement for the packet with data received at least one step before or an acknowledgement for the data before the final data when the packet with data is received in the second data communication in a state in which (i) there is data which waits for an acknowledgement and transmission of the data which waits for an acknowledgement is in progress in the first data communication, or (ii) there is data which waits for arrangement and reception of the data which waits for arrangement is in progress in the second data communication, wherein the acknowledgement includes reception sequence numbers which are values recorded on the third pointer of the reception buffer.

3. The communication device according to claim 2,
wherein the operating section is configured not to return an acknowledgement when a packet with data is received in the second data communication in a state in which (i) there is no data which waits for an acknowledgement and there is no data the transmission of which is in progress in the first data communication, and (ii) there is no data which waits for arrangement and there is no data the reception of which is in progress in the second data communication.

4. The communication device according to claim 1,
wherein the operating section is configured to determine whether or not there is data which waits for an acknowledgement and transmission of the data which waits for acknowledge is in progress in the first data communication by referring to the transmission buffer, and to determine whether or not there is data which waits for arrangement and reception of the data which waits for arrangement is in progress by referring to the reception buffer in the second data communication.

5. The communication device according to claim 4,
wherein the operating section is configured to return an acknowledgement for data after data for which an acknowledgement was returned at a previous time and before the final data, when a packet with data which is the same as a packet with data received at the previous time is received in the second data communication in a state in which there is data which waits for arrangement and reception of the data which waits for arrangement is in progress in the second data communication.

6. The communication device according to claim 4,
wherein the operating section is configured to return an acknowledgement for data after data for which an acknowledgement was returned at a previous time and before the final data, when a packet with data which is the same as a packet with data received at the previous time is received in the second data communication in a state in which there is data which waits for an acknowledgement and transmission of the data which waits for acknowledgement is in progress in the first data communication.

7. The communication device according to claim 1,
wherein the operating section is configured, in a state in which (i) there is data which waits for an acknowledgement and transmission of the data which waits for acknowledgement is in progress in the first data communication and (ii) there is no data which waits for arrangement and there is no data the reception of which is in progress in the second data communication, to return an acknowledgement for final data received in the second data communication at a timing when an acknowledgement is received and thus there is no data which waits for an acknowledgement and there is no data the transmission of which is in progress in the first data communication.

8. The communication device according to claim 1, wherein the operating section is configured to return an end data packet acknowledgement for a data packet located at the end among data packets received in the second data communication at a timing when a data packet with a PSH flag is received, and, then, an acknowledgement is received and thus there is no data which waits for an acknowledgement and there is no data the transmission of which is in progress in the first data communication.

9. The communication device according to claim 1, wherein the data communication is a TCP communication.

10. A communication system having a communication device which relays a data communication, the communication system including a first communication device which comprises:
  a transmission buffer for a first data communication between the first communication device and a network, the transmission buffer being configured to store data which waits for an acknowledgement and transmission of the data which waits for acknowledge is in progress;
  a reception buffer for a second data communication between a transmission terminal and the first communication device, the reception buffer being configured to store data which waits for arrangement and reception of the data which waits for arrangement is in progress, and configured to have a first pointer indicating a head of received data, at least one second pointer indicating a boundary between arranged data and unarranged data, and a third pointer for recording a value of a latest one of the at least one second pointer; and
  an operating section configured to return an acknowledgement for a packet with data previously received at least one data reception step before a present data reception step or an acknowledgement for data before final data, when a packet with data is received in the second data communication in the present data reception step, wherein the acknowledgement includes reception sequence numbers which are values of the latest ones of the at least one second pointer indicating the boundary between arranged data and unarranged data as recorded on the third pointer of the reception buffer.

11. The communication system according to claim 10, wherein the operating section of the first communication device is configured to return an acknowledgement for the packet with data previously received at least one data reception step before a present data reception step or an acknowledgement for the data before the final data when the packet with data is received in the second data communication in the present data reception step, in a state in which (i) there is data which waits for an acknowledgement and transmission of the data which waits for acknowledgement is in progress in the first data communication, or (ii) there is data which waits for arrangement and reception of the data which waits for arrangement is in progress in the second data communication, wherein the acknowledgement includes reception sequence numbers which are values recorded on the third pointer of the reception buffer.

12. The communication system according to claim 10, wherein the operating section of the first communication device is configured not to return an acknowledgement when a packet with data is received in the second data communication in a state in which (i) there is no data which waits for an acknowledgement and there is no data the transmission of is in progress in the first data communication, and (ii) there is no data which waits for arrangement and there is no data the reception of which is in progress in the second data communication.

13. The communication system according to claim 10, wherein the operating section of the first communication device is configured to determine whether or not there is data which waits for an acknowledgement and transmission of the data which waits for acknowledgement is in progress in the first data communication by referring to the transmission buffer, and to determine whether or not there is data which waits for arrangement and reception of the data which waits for arrangement is in progress by referring to the reception buffer in the second data communication.

14. The communication system according to claim 10, comprising:
  a second communication device connected with the first communication device via the network,
  wherein the first communication device relays the second data communication, and
  wherein the second communication device relays the first data communication.

15. The communication system according to claim 10, wherein the operating section of the first communication device is configured, in a state in which (i) there is data which waits for an acknowledgement and transmission of the data which waits for acknowledgement is in progress in the first data communication and (ii) there is no data which waits for arrangement and there is no data the reception of which is in progress in the second data communication, to return an acknowledgement for final data received in the second data communication at a timing when an acknowledgement is received and thus there is no data which waits for an acknowledgement and there is no data the transmission of which is in progress in the first data communication.

16. A method of controlling a communication of a communication device which relays a data communication, the method comprising:
  storing data, which waits for an acknowledgement and transmission of the data which waits for acknowledge is in progress, in a transmission buffer for a first data communication between the communication device and a network;
  storing data, which waits for arrangement and reception of the data which waits for arrangement is in progress, in a reception buffer for a second data communication between a transmission terminal and the communication device, the reception buffer having a first pointer indicating a head of received data, at least one second pointer indicating a boundary between arranged data and unarranged data, and a third pointer for recording a value of a latest one of the at least one second pointer; and
  returning an acknowledgement, by an operating section, for a packet with data previously received at least one data reception step before a present data reception step or an acknowledgement for data before final data, when a packet with data is received in the second data communication in the present data reception step, wherein the acknowledgement includes reception sequence numbers which are values of the latest ones of the at least one second pointer indicating the boundary between arranged data and unarranged data as recorded on the third pointer of the reception buffer.

17. The method according to claim 16, further comprising:

returning an acknowledgement for the packet with data received at least one step before or an acknowledgement for the data before the final data when the packet with data is received in the second data communication in a state in which (i) there is data which waits for an acknowledgement and transmission of the data which waits for an acknowledgement is in progress in the first data communication, or (ii) there is data which waits for arrangement and reception of the data which waits for arrangement is in progress in the second data communication, wherein the acknowledgement includes reception sequence numbers which are values recorded on the third pointer of the reception buffer.

18. The method according to claim 16, further comprising:

not returning an acknowledgement when a packet with data is received in the second data communication in a state in which (i) there is no data which waits for an acknowledgement and there is no data the transmission of which is in progress in the first data communication, and (ii) there is no data which waits for arrangement and there is no data the reception of which is in progress in the second data communication.

19. The method according to claim 16, further comprising:

in a state in which (i) there is data which waits for an acknowledgement and transmission of the data which waits for acknowledgement is in progress in the first data communication and (ii) there is no data which waits for arrangement and there is no data the reception of which is in progress in the second data communication, returning an acknowledgement for final data received in the second data communication at a timing when an acknowledgement is received and thus there is no data which waits for an acknowledgement and there is no data the transmission of which is in progress in the first data communication.

20. The method according to claim 16, further comprising:

returning an end data packet acknowledgement for a data packet located at the end among data packets received in the second data communication at a timing when a data packet with a PSH flag is received, and, then, an acknowledgement is received and thus there is no data which waits for an acknowledgement and there is no data the transmission of which is in progress in the first data communication.

* * * * *